US012777113B2

(12) United States Patent
Shen et al.

(10) Patent No.: US 12,777,113 B2
(45) Date of Patent: Oct. 27, 2026

(54) METHOD FOR SHARING CELLULAR CAPABILITY, DEVICE, READABLE STORAGE MEDIUM, AND PROGRAM PRODUCT

(71) Applicant: HUAWEI TECHNOLOGIES CO., LTD., Shenzhen (CN)

(72) Inventors: Fusheng Shen, Shanghai (CN); Yinyuan Jia, Shanghai (CN); Zhifeng Wang, Shanghai (CN); Yingxiong Zhang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 264 days.

(21) Appl. No.: 18/692,686

(22) PCT Filed: Sep. 8, 2022

(86) PCT No.: PCT/CN2022/117860
§ 371 (c)(1),
(2) Date: Mar. 15, 2024

(87) PCT Pub. No.: WO2023/040750
PCT Pub. Date: Mar. 23, 2023

(65) Prior Publication Data

US 2024/0364802 A1 Oct. 31, 2024

(30) Foreign Application Priority Data

Sep. 17, 2021 (CN) ......................... 202111095221.8

(51) Int. Cl.
*H04M 1/72403* (2021.01)
*G06F 3/04817* (2022.01)
*H04W 88/04* (2009.01)

(52) U.S. Cl.
CPC .... *H04M 1/72403* (2021.01); *G06F 3/04817* (2013.01); *H04W 88/04* (2013.01)

(58) Field of Classification Search
CPC ........... H04M 1/72403; H04M 1/7243; H04M 1/724; H04M 1/72412; H04M 1/72436;
(Continued)

(56) References Cited

U.S. PATENT DOCUMENTS 9,635,711 B1 4/2017 Govindassamy
2007/0121869 A1 5/2007 Gorti et al.
(Continued)

FOREIGN PATENT DOCUMENTS

CN 102572584 A 7/2012
CN 103051796 A 4/2013
(Continued)

OTHER PUBLICATIONS

CN 102576264 A), Tanaka, Input/output Device, Movable Device And Information Display Device, Jul. 2012, pp. 1-55 (Year: 2012).*
(Continued)

*Primary Examiner* — Keith Ferguson
(74) *Attorney, Agent, or Firm* — Fish & Richardson P.C.

(57) ABSTRACT

This application relates to sharing a cellular capability between terminal devices. In an implementation, a method includes: A first device establishes a transmission channel to a second device, where the first device shares a cellular capability with the second device through the transmission channel. The second device implements a cellular communication function by using the cellular capability of the first device. The first device displays a first banner which indicates that the first device is sharing the cellular capability. The second device displays a cellular indication icon based on a cellular status of the first device, and the cellular indication icon in response to determining that the sharing of
(Continued)

the cellular capability between the first device and the second device ends.

25 Claims, 58 Drawing Sheets

(58) Field of Classification Search
CPC ............. H04M 1/72445; H04W 88/04; H04W 88/022; G06F 3/04817; G06F 3/0481; G06F 3/048; G06F 3/0482; G06F 3/0484; G06F 3/04842
See application file for complete search history.

(56) References Cited

U.S. PATENT DOCUMENTS

| | | | |
|---|---|---|---|
| 2008/0019333 A1 | 1/2008 | Kharia et al. | |
| 2011/0053640 A1* | 3/2011 | Bennett ............. | H04M 1/72412 455/556.1 |
| 2015/0065084 A1 | 3/2015 | Sheikh Naziruddin et al. | |
| 2015/0156676 A1 | 6/2015 | Yoon et al. | |
| 2016/0191688 A1 | 6/2016 | Chalouhi et al. | |
| 2016/0192344 A1 | 6/2016 | Tiger | |
| 2019/0380065 A1 | 12/2019 | Kim et al. | |
| 2020/0304941 A1 | 9/2020 | Cohen et al. | |
| 2021/0250339 A1 | 8/2021 | Chumura | |

FOREIGN PATENT DOCUMENTS

| | | | |
|---|---|---|---|
| CN | 103051797 | A | 4/2013 |
| CN | 103491217 | A | 1/2014 |
| CN | 103973860 | A | 8/2014 |
| CN | 104539790 | A | 4/2015 |
| CN | 104770055 | A | 7/2015 |
| CN | 104935741 | A | 9/2015 |
| CN | 105634862 | A | 6/2016 |
| CN | 107105097 | A | 8/2017 |
| CN | 108206993 | A | 6/2018 |
| CN | 111050377 | A | 4/2020 |
| CN | 111131607 | A | 5/2020 |
| CN | 118489266 | B | 2/2025 |
| WO | 2015180126 | A1 | 12/2015 |
| WO | 2017003871 | A1 | 1/2017 |
| WO | 2019043391 | A1 | 3/2019 |

OTHER PUBLICATIONS

WO 2021036735 A1), Zhang et al., User Interface Display Method and Electronic Device, Mar. 2021, pp. 1-45 (Year: 2021).*

International Search Report and Written Opinion in International Appln. No. PCT/CN2022/117860, mailed on Nov. 1, 30, 2022, 17 pages (with English translation).

Extended European Search Report in European Appln. No. 22869119.2, mailed on Nov. 18, 2024, 9 pages.

* cited by examiner

TO FIG. 4(b)-2

CONT. FROM FIG. 4(b)-1

TO FIG. 4(c)-2

CONT.
FROM

CONT. FROM FIG. 5(a)-2

TO FIG. 5(b)-2

CONT. FROM FIG. 5(b)-2

TO FIG. 6(a)-2

CONT. FROM FIG. 6(a)-2

TO FIG. 6(b)-2

CONT. FROM FIG. 6(b)-2

CONT. FROM FIG. 6(c)-2

CONT. FROM FIG. 7(a)-1

TO FIG. 7(a)-3

CONT. FROM FIG. 7(a)-2

CONT. FROM FIG. 7(b)-2

TO FIG. 8(a)-2

CONT. FROM FIG. 8(a)-2

TO FIG. 8(b)-2

CONT. FROM FIG. 8(b)-2

TO FIG. 8(c)-2

CONT. FROM FIG. 8(c)-2

TO FIG. 14B

CONT. FROM FIG. 14B

METHOD FOR SHARING CELLULAR CAPABILITY, DEVICE, READABLE STORAGE MEDIUM, AND PROGRAM PRODUCT

CROSS-REFERENCE TO RELATED APPLICATIONS

This application is a National Stage of International Application No. PCT/CN2022/117860, filed on Sep. 8, 2022, which claims priority to Chinese Patent Application No. 202111095221.8, filed on Sep. 17, 2021. Both of the aforementioned applications are hereby incorporated by reference in their entireties.

TECHNICAL FIELD

This application relates to the field of terminal technologies, and in particular, to a method for sharing a cellular capability, a device, a readable storage medium, and a program product.

BACKGROUND

Electronic devices not only are diverse, but also play an important role in people's daily life. An increasing quantity of users have a plurality of electronic devices, for example, have a mobile phone, a tablet computer, a smart screen, a personal computer, and the like. To improve use efficiency, data sharing, function sharing, and the like between devices gradually become a mainstream trend.

Currently, a cellular capability of a mobile phone may be shared with another device (for example, a tablet computer, a personal computer, or a smart screen that cannot implement a cellular communication function) by using a hotspot or a wireless fidelity (wireless fidelity, Wi-Fi) local area network, so that the another device can implement cellular communication functions such as accessing the Internet, making a call, and sending an SMS message by using the cellular capability of the mobile phone. However, after the mobile phone ends cellular capability sharing, a usage record (for example, a call record or an SMS message record) is usually retained on the another device. As a result, information privacy of the mobile phone cannot be ensured.

SUMMARY

This application provides a method for sharing a cellular capability, a device, a readable storage medium, and a program product, to effectively protect information privacy and security.

According to a first aspect, this application provides a method for sharing a cellular capability. The method includes: A first device establishes a transmission channel to a second device, where the first device shares a cellular capability with the second device through the transmission channel, and the second device implements a cellular communication function by using the cellular capability of the first device; the first device sends function synchronization information to the second device through the transmission channel, where the function synchronization information is used to synchronize, to the second device, a first service function that is allowed to be shared in the cellular communication function; the second device sets a first icon corresponding to the first service function from an unavailable state to an available state; and the second device sets the first icon from the available state to the unavailable state when cellular capability sharing between the first device and the second device ends.

According to the method for sharing a cellular capability provided in this application, the second device may dynamically load, based on whether the cellular capability sharing is performed, an icon corresponding to the cellular communication function, so that the icon indicates available during the cellular capability sharing, and indicates unavailable after the sharing ends. In this way, it is ensured that a user cannot view, on the second device during a non-sharing period, record information corresponding to the cellular communication function. Therefore, information security and privacy are protected to an extent.

Optionally, the function synchronization information further indicates that the cellular capability of the first device is available or unavailable. That the second device sets a first icon corresponding to the first service function from an unavailable state to an available state includes: When the second device determines, based on the function synchronization information, that the cellular capability of the first device is available, the second device sets the first icon from the unavailable state to the available state.

In an embodiment, the cellular capability of the first device may be unavailable because the first device is in arrears. Therefore, based on this optional manner, the second device can learn, in time based on an indication of the first device, whether the cellular capability of the first device is available, and determine whether to load the first icon. This avoids a case in which the user continuously tries to perform cellular communication by using the second device because the cellular capability of the first device is still used to perform the cellular communication function when the cellular capability of the first device is unavailable. Therefore, operation efficiency of the user is improved.

Optionally, the unavailable state is a hidden state or a grayed-out display state, and when the first icon is in the grayed-out display state, the second device does not respond to an operation on the first icon; or the available state is a normal display state, and when the first icon is in the normal display state, the second device responds to an operation on the first icon.

Optionally, after the first device sends the function synchronization information to the second device through the transmission channel, the method further includes: The first device synchronizes first record information with the second device through the transmission channel, where the first record information includes a usage record of the first service function on the first device and a usage record of the first service function on the second device.

In this optional manner, the usage record on the first device includes a usage record generated during the cellular capability sharing and a usage record stored before the cellular capability sharing. Based on this optional manner, in one aspect, the user may quickly view and use the first record information on the second device, to improve operation efficiency. In another aspect, the first device may also update a complete usage record in real time, so that the user can subsequently view the complete usage record on the first device after the cellular capability sharing ends.

Optionally, when the cellular capability sharing between the first device and the second device ends, the second device deletes record information that corresponds to the first service function and that is stored on the second device.

Based on this optional manner, when the second device is a device used by a plurality of users, information security and privacy can be further ensured.

Optionally, after the first device establishes the transmission channel to the second device, the method further includes: The first device sends cellular status information of the first device to the second device, the second device displays a cellular status indication icon based on the cellular status information, and when the cellular capability sharing between the first device and the second device ends, the second device cancels displaying the cellular status indication icon.

Based on this optional manner, the second device can completely share the cellular capability of the first device, and fully sense a cellular status of the first device, so that the user can intuitively learn the cellular status of the first device, and can start and execute some applications that require a secure environment.

Optionally, the first device exchanges, with the second device through a radio interface layer RIL, cellular signaling corresponding to the first service function.

Optionally, that a first device establishes a transmission channel to a second device includes: When the first device and the second device meet a preset condition, the first device establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a second aspect, this application provides a method for sharing a cellular capability, applied to a first device. The method includes: The first device establishes a transmission channel to a second device, where the first device shares a cellular capability with the second device through the transmission channel; and the first device sends function synchronization information to the second device through the transmission channel, where the function synchronization information is used to synchronize, to the second device, a first service function that is allowed to be shared in the cellular communication function.

Optionally, the function synchronization information further indicates that the cellular capability of the first device is available or unavailable.

Optionally, after the first device sends the function synchronization information to the second device through the transmission channel, the method further includes: The first device synchronizes first record information with the second device through the transmission channel, where the first record information includes a usage record of the first service function on the first device and a usage record of the first service function on the second device.

Optionally, after the first device establishes the transmission channel to the second device, the method further includes: The first device sends cellular status information of the first device to the second device, where the cellular status information is used by the second device to display a cellular status indication icon.

Optionally, the first device exchanges, with the second device through a radio interface layer RIL, cellular signaling corresponding to the first service function.

Optionally, that a first device establishes a transmission channel to the second device includes: When the first device and the second device meet a preset condition, the first device establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a third aspect, this application provides a method for sharing a cellular capability, applied to a second device. The method includes: A first device establishes a transmission channel to the second device, where the second device implements a cellular communication function by using a cellular capability shared by the first device through the transmission channel; the second device receives, through the transmission channel, function synchronization information sent by the first device, where the function synchronization information is used to synchronize, to the second device, a first service function that is allowed to be shared in the cellular communication function; the second device sets a first icon corresponding to the first service function from an unavailable state to an available state; and the second device sets the first icon from the available state to the unavailable state when cellular capability sharing between the first device and the second device ends.

Optionally, the function synchronization information further indicates that the cellular capability of the first device is available or unavailable. That the second device sets a first icon corresponding to the first service function from an unavailable state to an available state includes: When the second device determines, based on the function synchronization information, that the cellular capability of the first device is available, the second device sets the first icon from the unavailable state to the available state.

Optionally, the unavailable state is a hidden state or a grayed-out display state, and when the first icon is in the grayed-out display state, the second device does not respond to an operation on the first icon; or the available state is a normal display state, and when the first icon is in the normal display state, the second device responds to an operation on the first icon.

Optionally, after the second device receives, through the transmission channel, the function synchronization information sent by the first device, the method further includes: The first device synchronizes first record information with the second device through the transmission channel, where the first record information includes a usage record of the first service function on the first device and a usage record of the first service function on the second device.

Optionally, when the cellular capability sharing between the first device and the second device ends, the second device deletes record information that corresponds to the first service function and that is stored on the second device.

Optionally, after the first device establishes the transmission channel to the second device, the method further includes: The second device receives cellular status information of the first device sent by the first device; the second device displays a cellular status indication icon based on the cellular status information; and when the cellular capability sharing between the first device and the second device ends, the second device cancels displaying the cellular status indication icon.

Optionally, the first device exchanges, with the second device through a radio interface layer RIL, cellular signaling corresponding to the first service function.

Optionally, that a first device establishes a transmission channel to a second device includes: When the first device and the second device meet a preset condition, the first device establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a fourth aspect, this application provides an apparatus, used in a first device. The apparatus includes:

a processing unit, configured to establish a transmission channel to a second device, where the first device shares a cellular capability with the second device through the transmission channel; and a transmission unit, configured to send function synchronization information to the second device through the transmission channel, where the function synchronization information is used to synchronize, to the second device, a first service function that is allowed to be shared in a cellular communication function.

Optionally, the function synchronization information further indicates that the cellular capability of the first device is available or unavailable.

Optionally, the transmission unit is further configured to: after sending the function synchronization information to the second device through the transmission channel, synchronize first record information with the second device through the transmission channel, where the first record information includes a usage record of the first service function on the first device and a usage record of the first service function on the second device.

Optionally, the transmission unit is further configured to: after the transmission channel to the second device is established, send cellular status information of the first device to the second device, where the cellular status information is used by the second device to display a cellular status indication icon.

Optionally, the transmission unit is further configured to exchange, with the second device through a radio interface layer RIL, cellular signaling corresponding to the first service function.

Optionally, that the processing unit establishes the transmission channel to the second device includes: When the processing unit determines that the first device and the second device meet a preset condition, the processing unit establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device, the preset condition is that the first device and the second device determine, in a code scanning manner, that sharing of the cellular capability is allowed; or the preset condition is that the first device establishes UWB communication with the second device.

According to a fifth aspect, this application provides an apparatus, used in a second device, and including:

a processing unit, configured to establish a transmission channel to a first device, where the second device implements a cellular communication function by using a cellular capability shared by the first device through the transmission channel; and a transmission unit, configured to receive function synchronization information sent by the first device through the transmission channel, where the function synchronization information is used to synchronize, to the second device, a first service function that is allowed to be shared in the cellular communication function.

The processing unit is further configured to: set a first icon corresponding to the first service function from an unavailable state to an available state, and when cellular capability sharing between the first device and the second device ends, set the first icon from the available state to the unavailable state.

Optionally, the function synchronization information further indicates that the cellular capability of the first device is available or unavailable. That the processing unit sets the first icon corresponding to the first service function from the unavailable state to the available state specifically includes: When the processing unit determines, based on the function synchronization information, that the cellular capability of the first device is available, the processing unit sets the first icon from the unavailable state to the available state.

Optionally, the unavailable state is a hidden state or a grayed-out display state, and when the first icon is in the grayed-out display state, the processing unit does not respond to an operation on the first icon; or the available state is a normal display state, and when the first icon is in the normal display state, the processing unit responds to an operation on the first icon.

Optionally, the transmission unit is further configured to: after receiving the function synchronization information sent by the first device through the transmission channel, synchronize first record information with the second device through the transmission channel, where the first record information includes a usage record of the first service function on the first device and a usage record of the first service function on the second device.

Optionally, the processing unit is further configured to: when the cellular capability sharing between the first device and the second device ends, delete record information that corresponds to the first service function and that is stored on the second device.

Optionally, the transmission unit is further configured to receive cellular status information of the first device sent by the first device.

The processing unit is further configured to: display a cellular status indication icon based on the cellular status information received by the transmission unit; and when the cellular capability sharing between the first device and the second device ends, cancel displaying the cellular status indication icon.

Optionally, the transmission unit is further configured to exchange, with the first device through a radio interface layer RIL, cellular signaling corresponding to the first service function.

Optionally, that the processing unit establishes the transmission channel to the first device includes: When the processing unit determines that the first device and the second device meet a preset condition, the processing unit establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a sixth aspect, this application provides an electronic device. The electronic device is configured to:

establish a transmission channel to a second device, where the electronic device shares a cellular capability with the second device through the transmission channel, and send function synchronization information to the second device through the transmission channel, where the function synchronization information is used to synchronize, to the second device, a first service function that is allowed to be shared in a cellular communication function.

Optionally, the function synchronization information further indicates that the cellular capability of the electronic device is available or unavailable.

Optionally, the electronic device is further configured to: after sending the function synchronization information to the second device through the transmission channel, synchronize first record information with the second device through the transmission channel, where the first record information includes a usage record of the first service function on the electronic device and a usage record of the first service function on the second device.

Optionally, the electronic device is further configured to: after establishing the transmission channel to the second device, send cellular status information of the electronic device to the second device, where the cellular status information is used by the second device to display a cellular status indication icon.

Optionally, the electronic device is further configured to exchange, with the second device through a radio interface layer RIL, cellular signaling corresponding to the first service function.

Optionally, that the electronic device establishes the transmission channel to the second device includes: When the electronic device and the second device meet a preset condition, the electronic device establishes the transmission channel to the second device. The preset condition is that the second device is a device that is determined by the electronic device and that is allowed to share the cellular capability, and the electronic device and the second device are within a preset range; the preset condition is that a OneHop operation is triggered between the electronic device and the second device; the preset condition is that the electronic device and the second device determine, in a code scanning manner, that sharing of the cellular capability is allowed; or the preset condition is that the electronic device establishes UWB communication with the second device.

According to a seventh aspect, this application provides an electronic device. The electronic device is configured to:

establish a transmission channel to a first device, where the electronic device implements a cellular communication function by using a cellular capability shared by the first device through the transmission channel; receive function synchronization information sent by the first device through the transmission channel, where the function synchronization information is used to synchronize, to the electronic device, a first service function that is allowed to be shared in the cellular communication function; set a first icon corresponding to the first service function from an unavailable state to an available state; and set the first icon from the available state to the unavailable state when cellular capability sharing between the first device and the electronic device ends.

Optionally, the function synchronization information further indicates that the cellular capability of the first device is available or unavailable. That the electronic device sets the first icon corresponding to the first service function from the unavailable state to the available state specifically includes: When determining, based on the function synchronization information, that the cellular capability of the first device is available, the electronic device sets the first icon from the unavailable state to the available state.

Optionally, the unavailable state is a hidden state or a grayed-out display state, and when the first icon is in the grayed-out display state, the electronic device does not respond to an operation on the first icon; or the available state is a normal display state, and when the first icon is in the normal display state, the electronic device responds to an operation on the first icon.

Optionally, the electronic device is further configured to: after receiving the function synchronization information sent by the first device through the transmission channel, synchronize first record information with the first device through the transmission channel, where the first record information includes a usage record of the first service function on the first device and a usage record of the first service function on the electronic device.

Optionally, the electronic device is further configured to: when the cellular capability sharing between the first device and the electronic device ends, delete record information that corresponds to the first service function and that is stored on the second device.

Optionally, the electronic device is further configured to: after establishing the transmission channel to the first device, receive cellular status information of the first device sent by the first device; display a cellular status indication icon based on the cellular status information; and when the cellular capability sharing between the first device and the electronic device ends, cancel displaying the cellular status indication icon.

Optionally, the electronic device is further configured to exchange, with the first device through a radio interface layer RIL, cellular signaling corresponding to the first service function.

Optionally, that the electronic device establishes the transmission channel to the first device includes: When the electronic device and the first device meet a preset condition, the electronic device establishes the transmission channel to the first device. The preset condition is that the electronic device is a device that is determined by the first device and that is allowed to share the cellular capability, and the first device and the electronic device are within a preset range; the preset condition is that a OneHop operation is triggered between the first device and the electronic device; the preset condition is that the first device and the electronic device determine, in a code scanning manner, that sharing of the cellular capability is allowed; or the preset condition is that the first device establishes UWB communication with the electronic device.

According to an eighth aspect, this application provides a communication system, including the apparatus according to the fourth aspect and the apparatus according to the fifth aspect, or including the electronic device according to the sixth aspect and the electronic device according to the seventh aspect.

According to a ninth aspect, this application provides a computer-readable storage medium. The computer-readable storage medium stores a computer program. When the computer program is executed by a processor, the method according to any one of the second aspect or the optional manners of the second aspect is implemented.

According to a tenth aspect, this application provides a computer-readable storage medium. The computer-readable storage medium stores a computer program. When the computer program is executed by a processor, the method according to any one of the third aspect or the optional manners of the third aspect is implemented.

According to an eleventh aspect, this application provides a computer program product. The program product includes a program. When the program is run on an electronic device, the electronic device is enabled to implement the method according to any one of the second aspect or the optional manners of the second aspect.

According to a twelfth aspect, this application provides a computer program product. The program product includes a program. When the program is run on an electronic device, the electronic device is enabled to implement the method according to any one of the third aspect or the optional manners of the third aspect.

It may be understood that, for beneficial effects of the second aspect to the twelfth aspect, refer to related descriptions in the first aspect. Details are not described herein again.

According to a thirteenth aspect, this application provides a method for sharing a cellular capability. The method includes: A first device establishes a transmission channel to a second device, where the first device shares a cellular capability with the second device through the transmission channel, and the second device implements a cellular communication function by using the cellular capability of the first device; the first device sends cellular status information of the first device to the second device; the second device displays a cellular status indication icon based on the cellular status information; and when cellular capability sharing between the first device and the second device ends, the second device cancels displaying the cellular status indication icon.

Currently, when the first device shares the cellular capability with the second device, the devices are connected by using Bluetooth, Wi-Fi, a dedicated chip, or the like. Therefore, the second device usually cannot sense a cellular status of the first device, for example, a standard of a primary banner and/or a secondary banner of the first device, strength of a cellular signal, and a cellular status whether a Voice over Long-Term Evolution (Voice over Long-Term Evolution, VOLTE) HD call is enabled. In one aspect, when the second device cannot successfully perform the cellular communication function, a user may not be able to determine whether a connection between the first device and the second device is faulty or cellular signal quality of the first device is faulty. In another aspect, if some applications that need to run in a secure environment (that is, a cellular data traffic environment) are installed on the second device, these applications cannot be started because the second device does not have a cellular capability.

Based on the method for sharing a cellular capability provided in this application, the second device can completely share the cellular capability of the first device, and fully sense the cellular status of the first device, so that the user can intuitively learn the cellular status of the first device, and can start and execute some applications that require a secure environment.

According to a fourteenth aspect, this application provides a method for sharing a cellular capability, applied to a first device. The method includes: The first device establishes a transmission channel to a second device, where the first device shares a cellular capability with the second device through the transmission channel; and the first device sends cellular status information of the first device to the second device, where the cellular status information is used by the second device to display a cellular status indication icon.

According to a fifteenth aspect, this application provides a method for sharing a cellular capability, applied to a second device. The method includes: A first device establishes a transmission channel to the second device, where the second device implements a cellular communication function by using a cellular capability shared by the first device through the transmission channel; the second device receives cellular status information of the first device sent by the first device; the second device displays a cellular status indication icon based on the cellular status information; and when cellular capability sharing between the first device and the second device ends, the second device cancels displaying the cellular status indication icon.

In the thirteenth aspect to the fifteenth aspect, optionally, that the first device establishes the transmission channel to the second device includes. When the first device and the second device meet a preset condition, the first device establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a sixteenth aspect, this application provides an apparatus, used in a first device, and including:

- a processing unit, configured to establish a transmission channel to a second device, where the first device shares a cellular capability of the first device with the second device through the transmission channel; and
- a transmission unit, configured to send cellular status information of the first device to the second device, where the cellular status information is used by the second device to display a cellular status indication icon.

Optionally, that the processing unit establishes the transmission channel to the second device includes: When the processing unit determines that the first device and the second device meet a preset condition, the processing unit establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to a seventeenth aspect, this application provides an apparatus, used in a second device, and including:

- a processing unit, configured to establish a transmission channel to a first device, where the second device implements a cellular communication function by using a cellular capability shared by the first device through the transmission channel; and a transmission unit, configured to receive cellular status information of the first device sent by the first device.

The processing unit is further configured to: display a cellular status indication icon based on the cellular status information; and when cellular capability sharing between the first device and the second device ends, cancel displaying the cellular status indication icon.

Optionally, that the processing unit establishes the transmission channel to the first device includes:

When the processing unit determines that the first device and the second device meet a preset condition, the processing unit establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

According to an eighteenth aspect, this application provides an electronic device. The electronic device has a cellular capability, and the electronic device is configured to:

establish a transmission channel to a second device, where the electronic device shares a cellular capability with the second device through the transmission channel; and send cellular status information of a first device to the second device, where the cellular status information is used by the second device to display a cellular status indication icon.

Optionally, that the electronic device establishes the transmission channel to the second device includes: When the electronic device and the second device meet a preset condition, the electronic device establishes the transmission channel to the second device. The preset condition is that the second device is a device that is determined by the electronic device and that is allowed to share the cellular capability, and the electronic device and the second device are within a preset range; the preset condition is that a OneHop operation is triggered between the electronic device and the second device; the preset condition is that the electronic device and the second device determine, in a code scanning manner, that sharing of the cellular capability is allowed; or the preset condition is that the electronic device establishes UWB communication with the second device.

According to a nineteenth aspect, this application provides an electronic device. The electronic device does not have a cellular capability, and the electronic device is configured to:

establish a transmission channel to a first device, where the electronic device implements a cellular communication function by using a cellular capability shared by the first device through the transmission channel; receive cellular status information of the first device sent by the first device; display a cellular status indication icon based on the cellular status information; and when cellular capability sharing between the first device and the electronic device ends, cancel displaying the cellular status indication icon.

Optionally, that the electronic device establishes the transmission channel to the first device includes: When the electronic device and the first device meet a preset condition, the electronic device establishes the transmission channel to the first device. The preset condition is that the electronic device is a device that is determined by the first device and that is allowed to share the cellular capability, and the first device and the electronic device are within a preset range; the preset condition is that a OneHop operation is triggered between the first device and the electronic device; the preset condition is that the first device and the electronic device determine, in a code scanning manner, that sharing of the cellular capability is allowed; or the preset condition is that the first device establishes UWB communication with the electronic device.

According to a twentieth aspect, this application provides a communication system, including the apparatus according to the sixteenth aspect and the apparatus according to the seventeenth aspect, or including the electronic device according to the eighteenth aspect and the electronic device according to the nineteenth aspect.

According to a twenty-first aspect, this application provides a computer-readable storage medium. The computer-readable storage medium stores a computer program. When the computer program is executed by a processor, the method according to any one of the fourteenth aspect or the optional manners of the fourteenth aspect is implemented.

According to a twenty-second aspect, this application provides a computer-readable storage medium. The computer-readable storage medium stores a computer program. When the computer program is executed by a processor, the method according to any one of the fifteenth aspect or the optional manners of the fifteenth aspect is implemented.

According to a twenty-third aspect, this application provides a computer program product. The program product includes a program. When the program is run on an electronic device, the electronic device is enabled to implement the method according to any one of the fourteenth aspect or the optional manners of the fourteenth aspect.

According to a twenty-fourth aspect, this application provides a computer program product. The program product includes a program. When the program is run on an electronic device, the electronic device is enabled to implement the method according to any one of the fifteenth aspect or the optional manners of the fifteenth aspect.

It may be understood that, for beneficial effects of the fourteenth aspect to the twenty-fourth aspect, refer to related descriptions in the thirteenth aspect. Details are not described herein again.

BRIEF DESCRIPTION OF DRAWINGS

FIG. 5(*a*)-1 to FIG. 5(*b*)-3, FIG. 6(*a*)-1 to FIG. 6(*c*)-3, FIG. 7(*a*)-1 to FIG. 7(*b*)-3, and FIG. 8(*a*)-1 to FIG. 8(*c*)-3 are schematic diagrams of scenarios in which an icon is loaded dynamically according to an embodiment of this application;

DESCRIPTION OF EMBODIMENTS

To ensure privacy of user information, this application provides a method for sharing a cellular capability, to protect user information and improve user experience by dynamically loading an icon.

The following describes the technical solutions in embodiments of this application with reference to the accompanying drawings in embodiments of this application.

The method for sharing a cellular capability provided in this application is applied to a communication system that includes a network side device, a first device, and a second device. The first device is a device having a cellular capability, namely, an electronic device provided with a subscriber identity module (subscriber identity module, SIM) banner, for example, a mobile phone. The SIM banner may be a physical SIM banner, an embedded SIM (embedded SIM, eSIM) banner, a virtual SIM banner, or the like.

The second device is a device that does not have a cellular capability, for example, an electronic device without a modem, or an electronic device that has a modem but is not provided with a SIM banner. For example, the second device may be a Wi-Fi only (Wi-Fi only) PAD, a PC, a smart screen, or the like, or may be a mobile phone without a SIM banner, or may be a vehicle-mounted device.

The cellular capability refers to a capability for implementing a cellular communication function (for example, a communication function implemented based on a cellular network, like a call function, an SMS message function, a data service function, an Internet access function, and a network slicing function) through the SIM banner. After the first device and the second device establish a transmission channel by using a device connection, the first device may share the cellular capability with the second device through the transmission channel, so that the second device can implement the cellular communication function by using the cellular capability of the first device.

Figure 1:
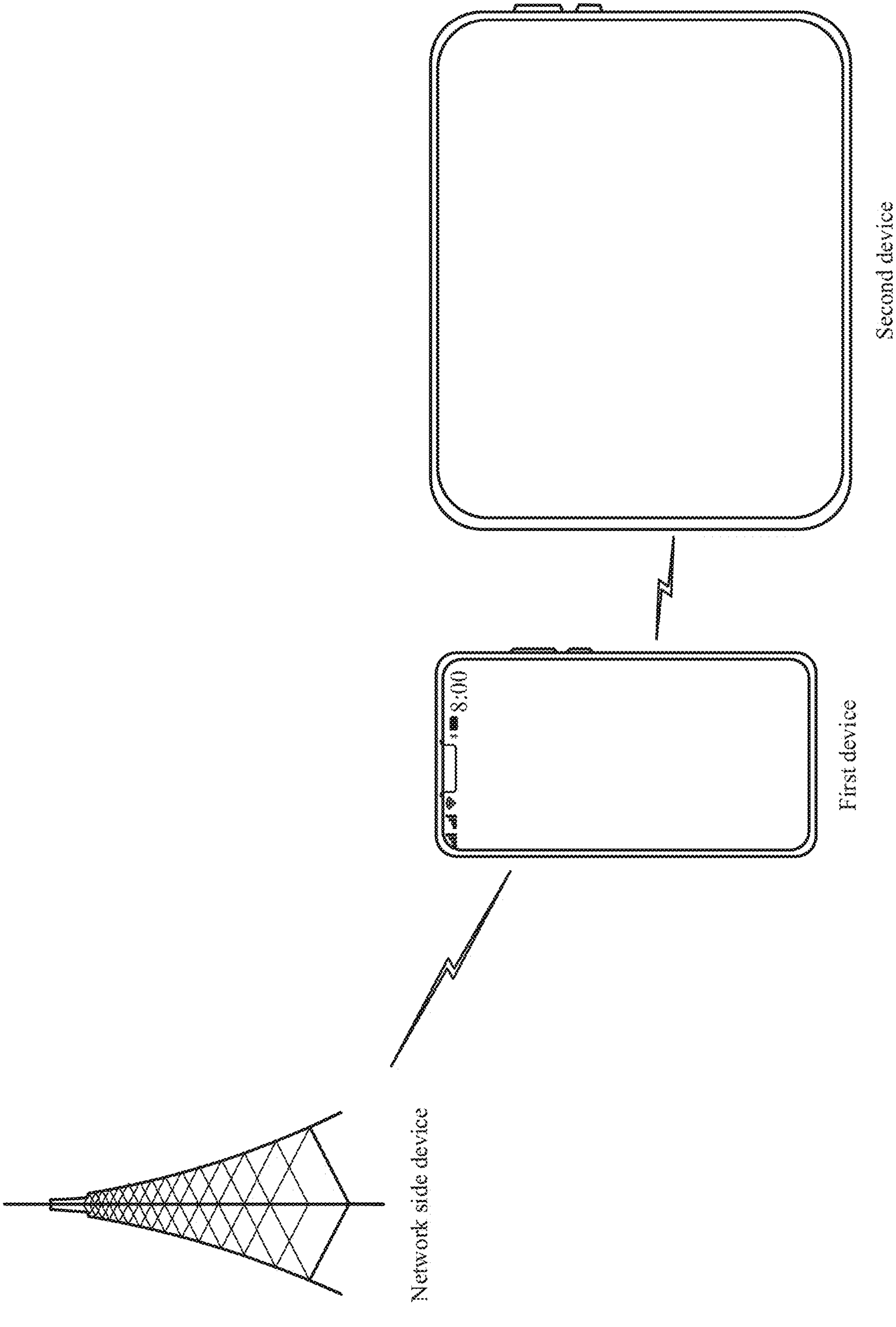
FIG. 1 is a schematic diagram of a communication system according to an embodiment of this application.
Figure 2A:
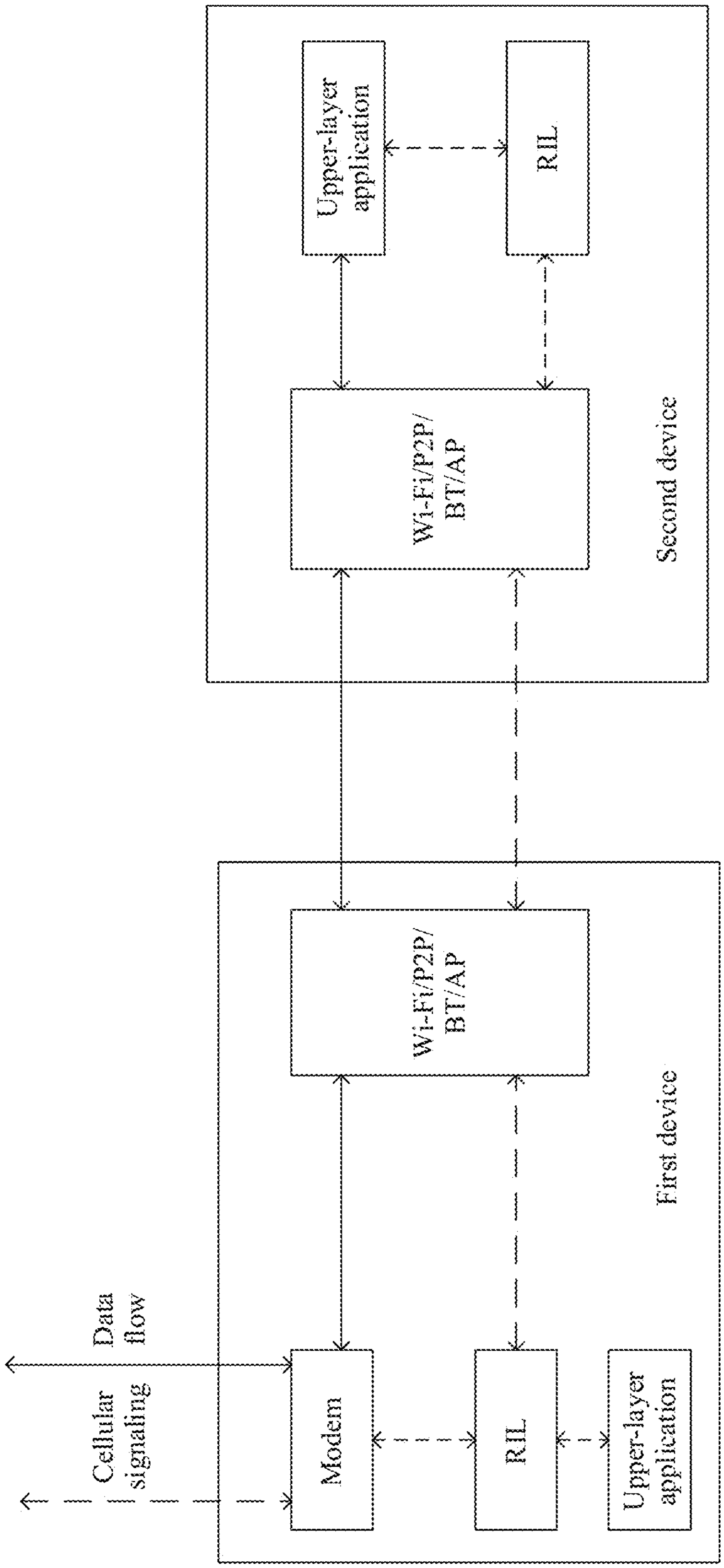
FIG. 2(*a*) and FIG. 2(*b*) are schematic diagrams of cellular signal transmission according to an embodiment of this application.
Figure 2B:
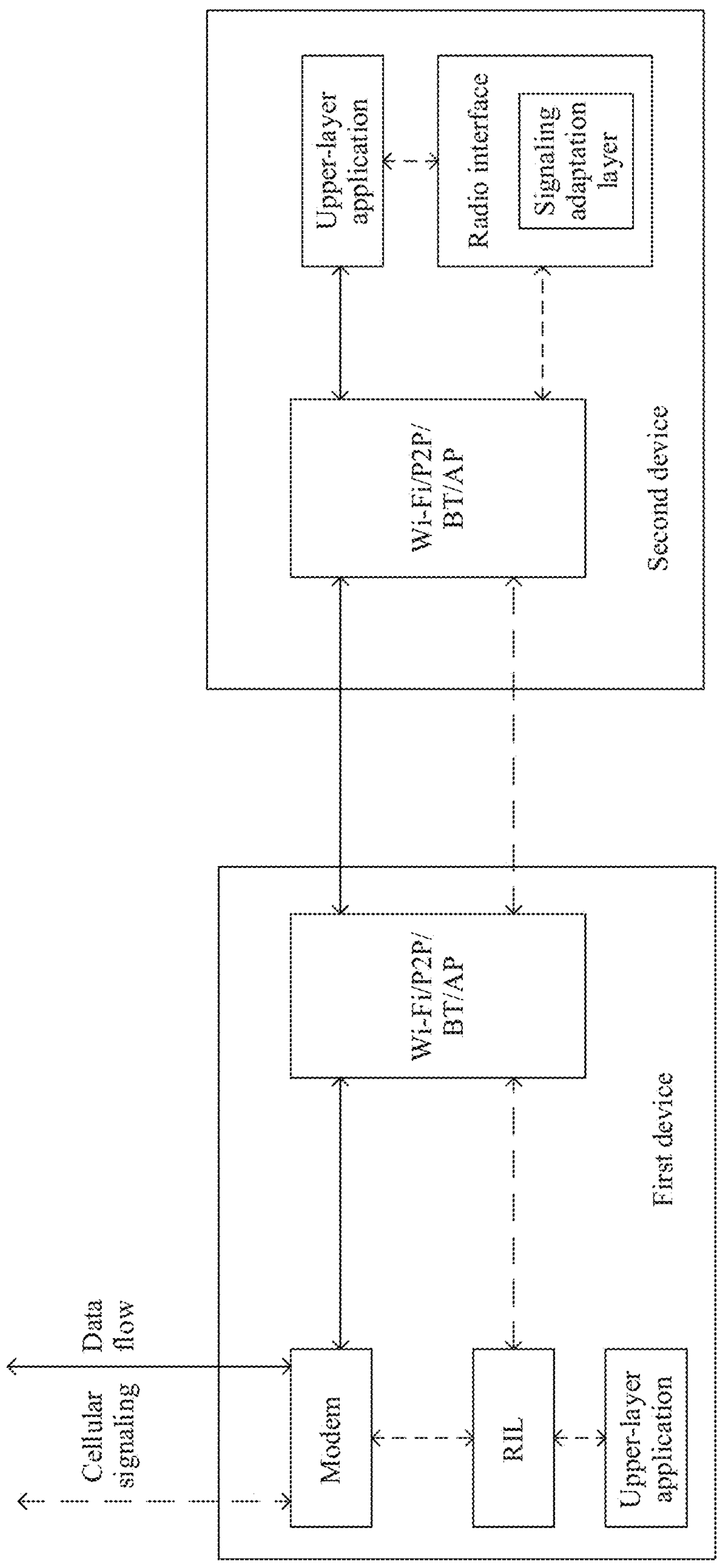

For example, the communication system may be shown in FIG. 1. The first device is a mobile phone provided with a SIM banner, and the second device is a WI-FI only PAD. After the mobile phone establishes a transmission channel with the PAD, the PAD performs cellular data exchange with a network layer device by using a cellular capability of the mobile phone, to implement a cellular communication function by using the cellular capability of the mobile phone.

In embodiments of this application, the device connection may include a Wi-Fi local area network (local area network, LAN), a Bluetooth (Bluetooth, BT) connection, a peer-to-peer (peer-to-peer, P2P) connection, a hotspot connection, a dedicated chip connection, and the like. The hotspot connection means that the first device serves as a wireless access point (access point, AP), and provides a wireless local area network connection for the second device by using a mobile network of the first device. The Bluetooth connection includes a conventional Bluetooth connection and a Bluetooth low energy (Bluetooth low energy, BLE) connection.

Cellular signaling exchange between the first device and the second device may be implemented by disposing a private interface, or cellular signaling exchange may be implemented by configuring a public interface.

For example, for an Android system, this application provides a cellular signaling exchange manner based on a radio interface layer (radio interface layer, RIL). The RIL can enable an upper-layer application to adapt to a basic cellular signaling procedure without modifying the upper-layer application. In other words, the upper-layer application can identify the cellular signaling through the RIL.

In an example, both the first device and the second device run Android systems. For a process in which the first device shares the cellular capability with the second device through the transmission channel (including channels such as Wi-Fi, P2P, BT, or AP), and the second device implements the cellular communication function by using the cellular capability of the first device, refer to a schematic diagram of cellular signal transmission shown in FIG. 2(*a*).

After receiving cellular signaling sent by the network side device, a modem of the first device forwards the cellular signaling to an RIL of the first device, and the RIL converts the cellular signaling into RIL signaling that can be identified by the upper-layer application. The RIL of the first device forwards the RIL signaling to an RIL of the second device through the transmission channel, the RIL of the second device forwards the RIL signaling to an upper-layer application of the second device, and the upper-layer application of the second device performs a related cellular function operation based on the RIL signaling.

Similarly, if the upper-layer application of the second device needs to send cellular signaling to the network layer device, for example, when a user dials up on the second device, the upper-layer application of the second device sends RIL signaling used for dialing to the RIL of the second device. The RIL of the second device forwards the RIL signaling to the RIL of the first device through the transmission channel. The RIL of the first device converts the RIL information into cellular signaling and sends the cellular signaling to the modem of the first device. The modem of the first device sends the cellular signaling to the network side device.

If the upper-layer application of the second device identifies RIL signaling related to a service, the upper-layer application of the second device invokes the transmission channel to transmit a data flow corresponding to the service. For example, when identifying RIL signaling of "the called party picks up the phone", the upper-layer application of the second device determines that voice data needs to be subsequently transmitted between the second device and the called party. In this case, the upper-layer application of the second device invokes the transmission channel between the second device and the first device. After detecting that voice data of the user is collected by a sound pickup, the upper-layer application of the second device sends the voice data to the first device through the transmission channel. The modem of the first device sends the voice data to the network side device, and then the network side device forwards the voice data to the called party. When the modem of the first device receives the voice data that is from the called party and that is sent by the network side device, the modem of the first device sends the voice data to the upper-layer application of the second device through the transmission channel, and the upper-layer application of the second device invokes a speaker to play the voice data from the called party. In this way, a cellular communication function of making a call is completed. It may be understood that, for the second device, the RIL of the second device is used as a virtual modem of the second device, to assist the second device in completing the cellular communication function by using the modem of the first device.

In addition, after receiving the cellular signaling sent by the modem, the RIL of the first device also forwards the converted RIL signaling to an upper-layer application of the first device.

For example, the first device is a called party. When the modem of the first device receives cellular signaling indicating an incoming call, the RIL of the first device sends corresponding RIL signaling to both the upper-layer application of the first device and the RIL of the second device, and the RIL of the second device forwards the RIL signaling to the upper-layer application of the second device. Both the first device and the second device can display the incoming call. If the user answers the call by using the first device, the first device communicates with a calling party by using the cellular capability of the first device, and the second device cancels displaying the incoming call. If the user answers the call by using the second device, the second device communicates with a calling party by using the cellular capability of the first device, and the first device cancels displaying the incoming call.

Figure 4A:
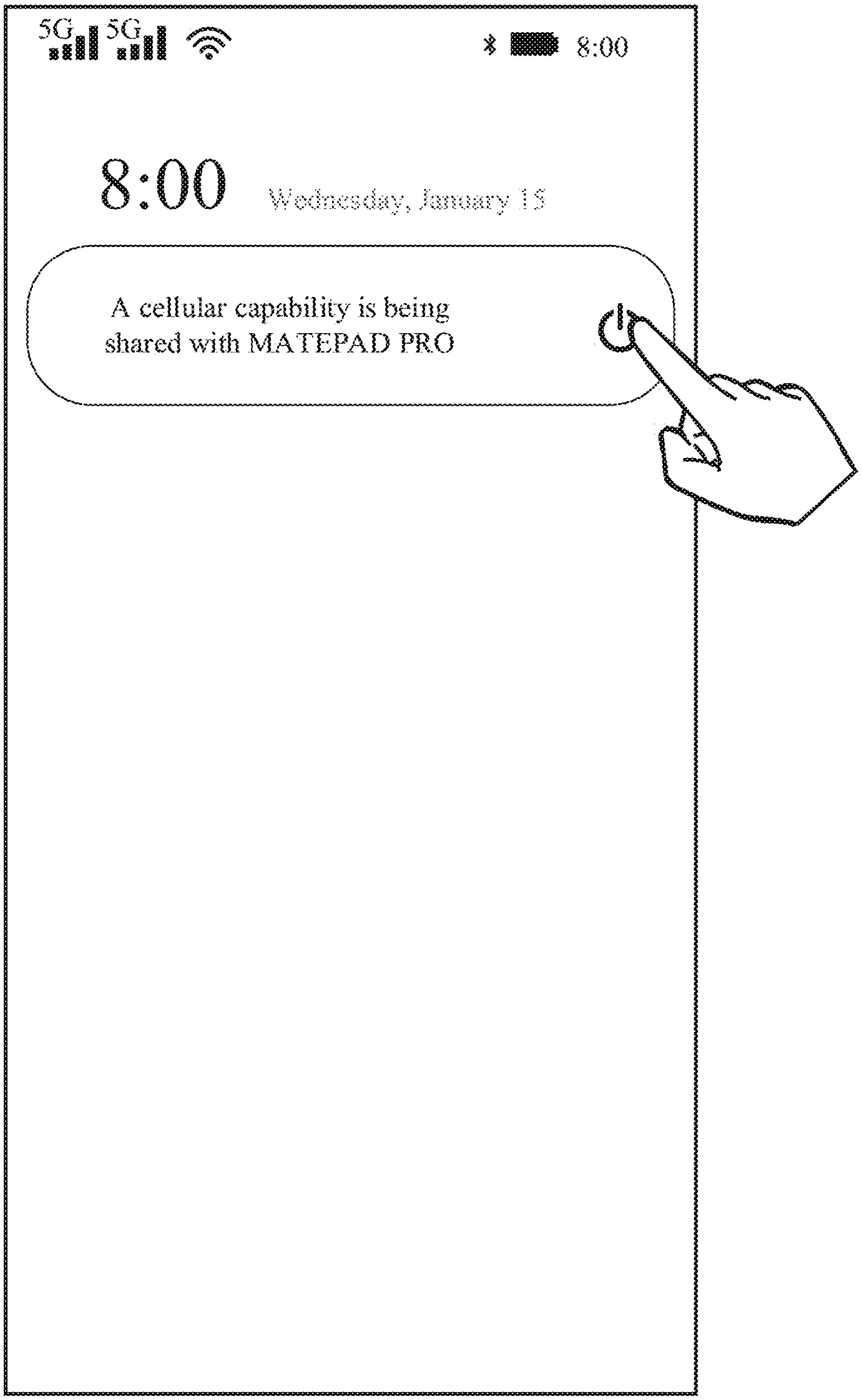
FIG. 4(*a*) to FIG. 4(*c*)-2 is a schematic diagram of a scenario of ending cellular capability sharing according to an embodiment of this application.
Figures 1, 4B:
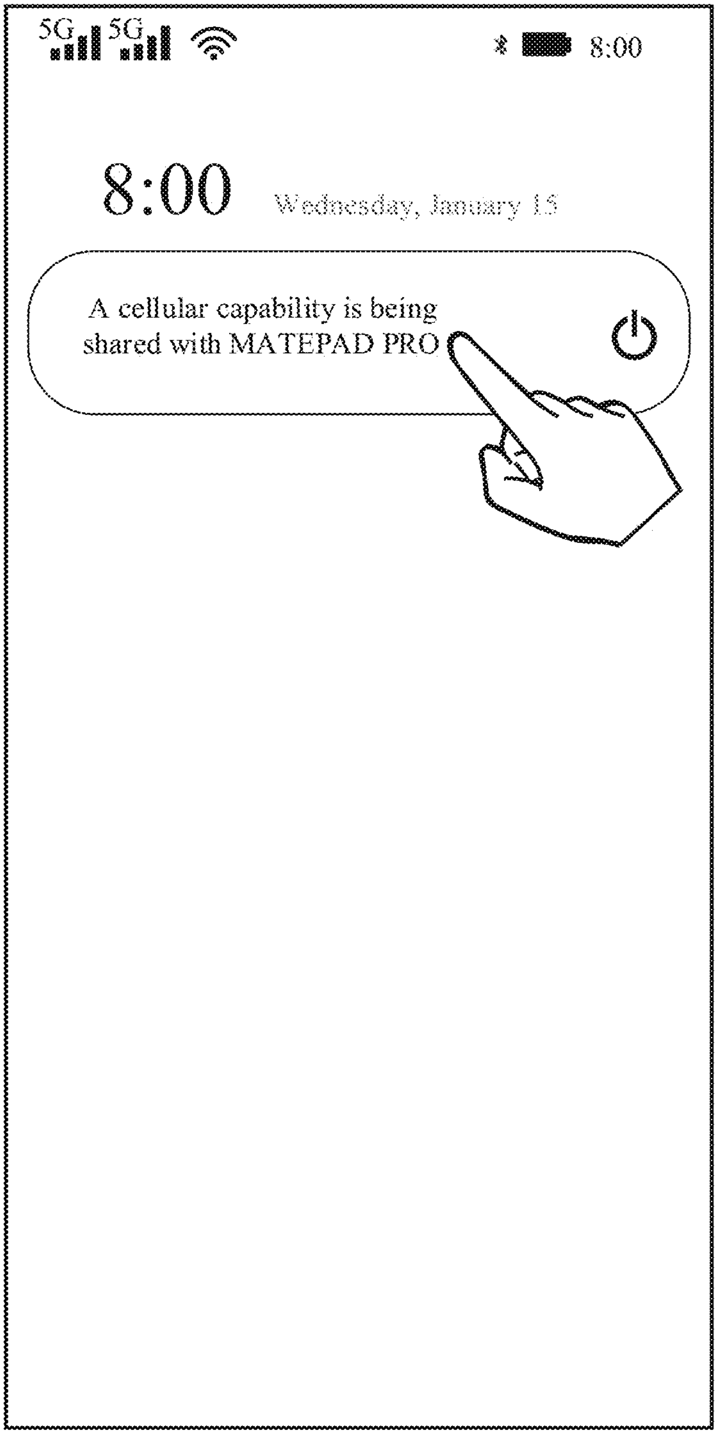
Figures 2, 4B:
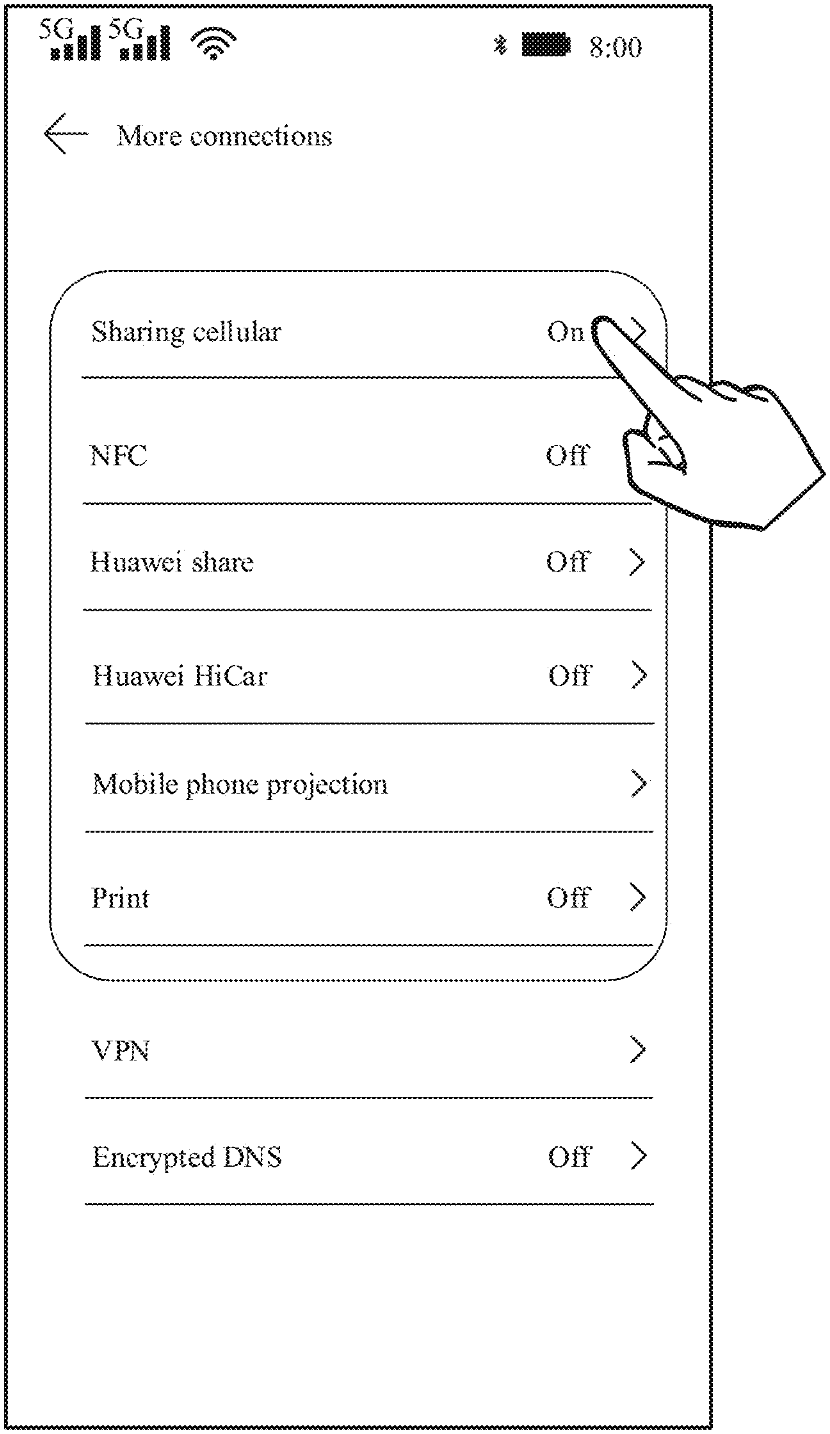
Figures 1, 4C:
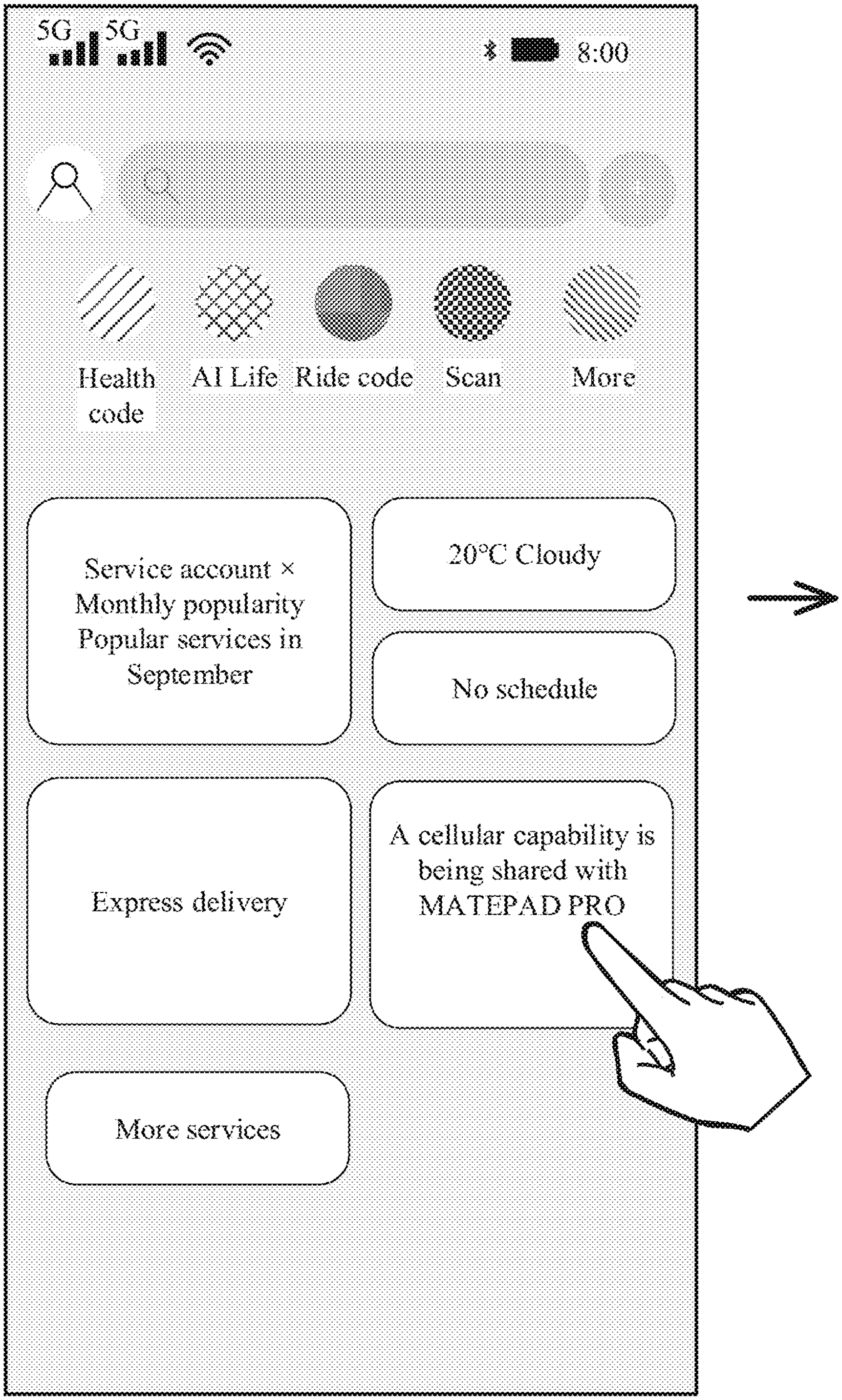
Figures 1, 2, 4C:
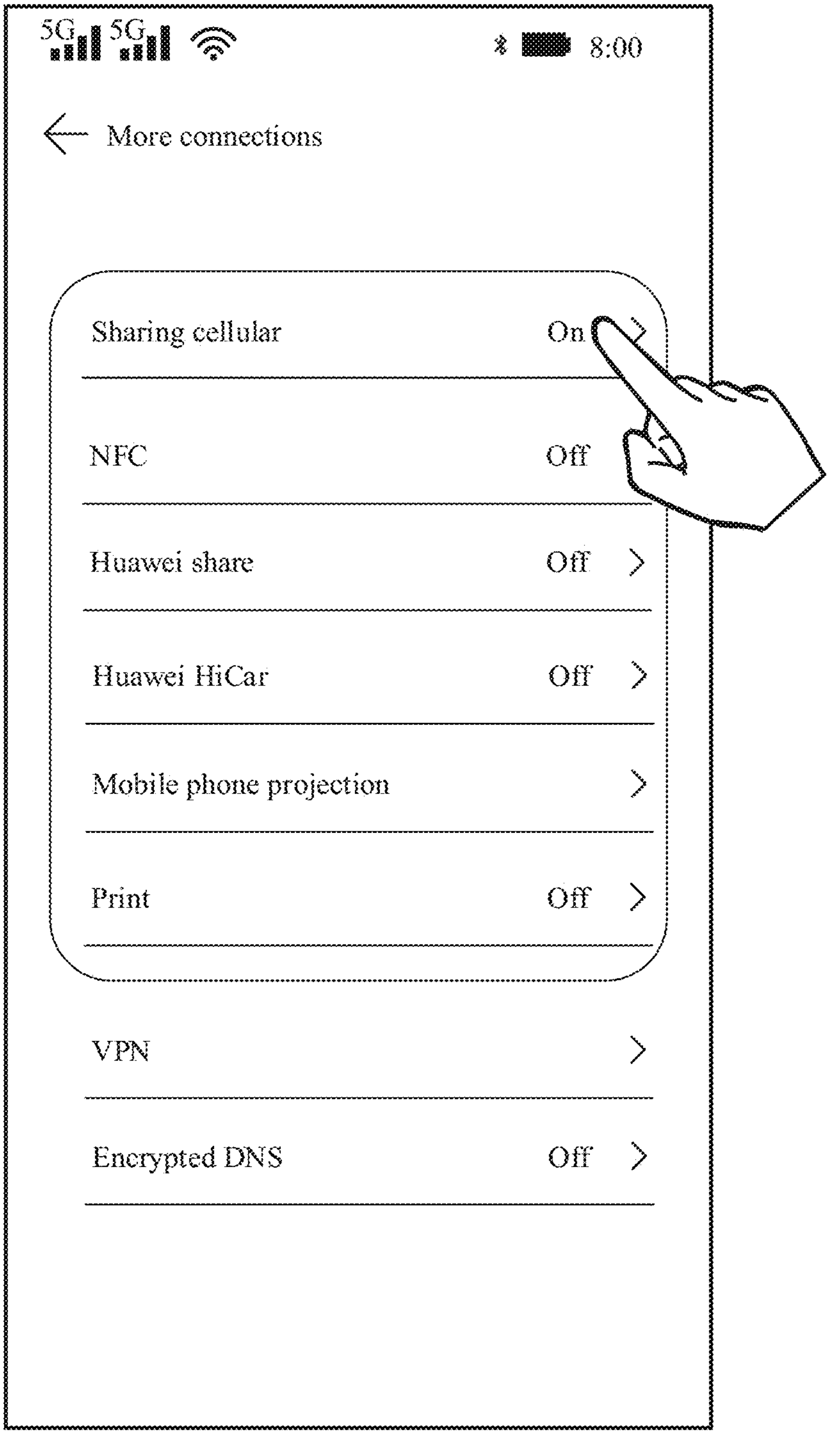
Figures 1, 5A:
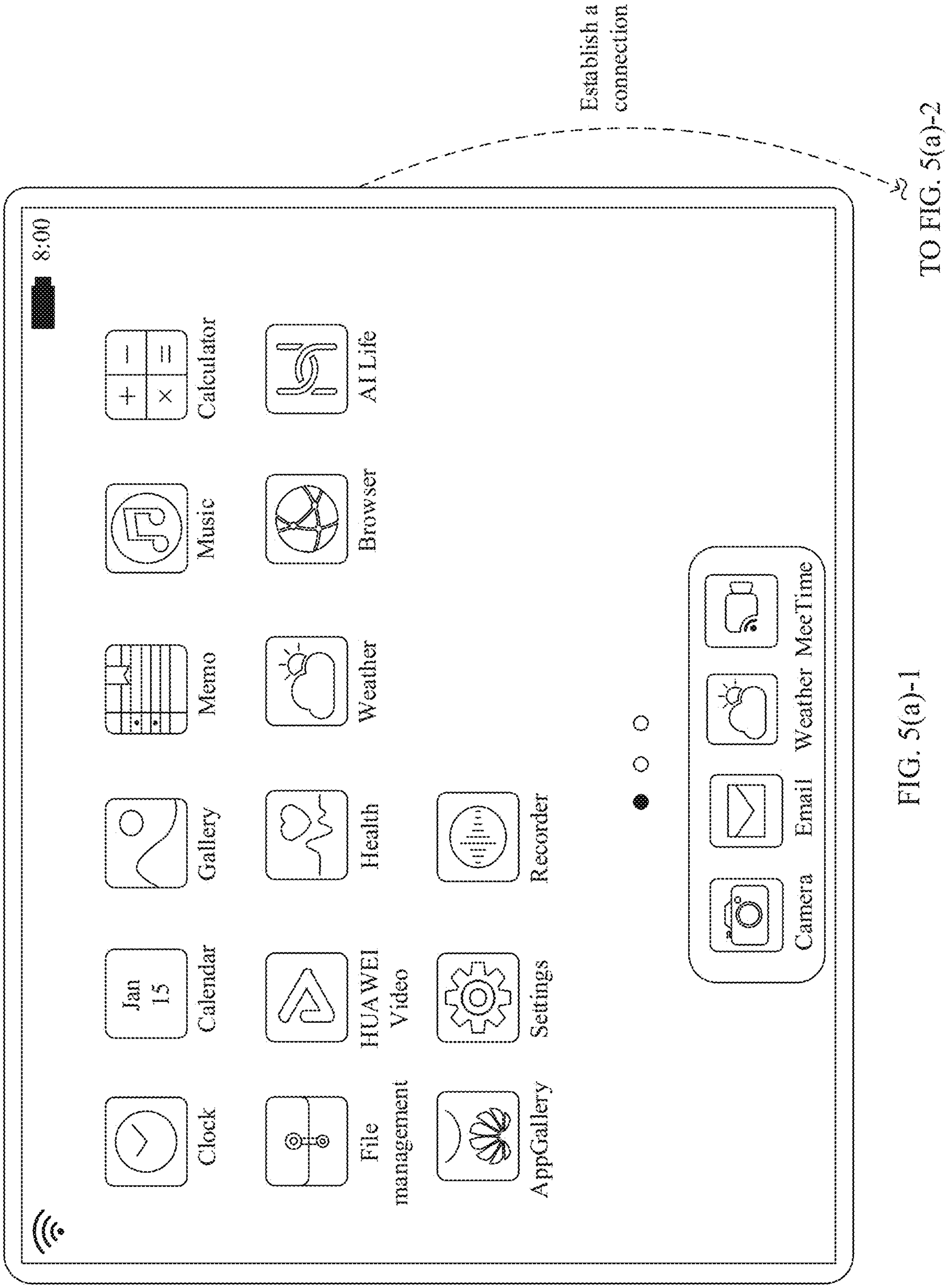
Figures 2, 5A:
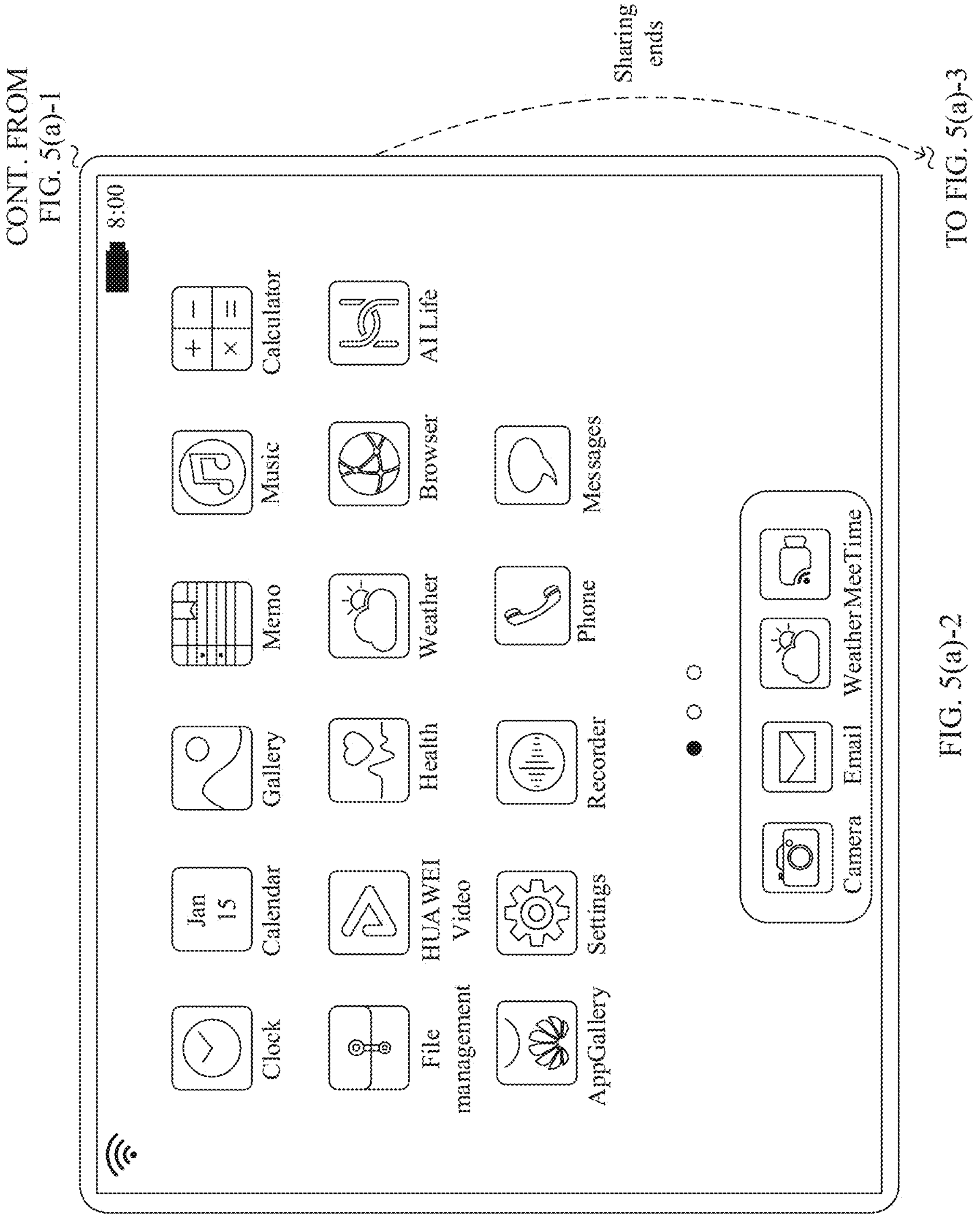
Figures 3, 5A:
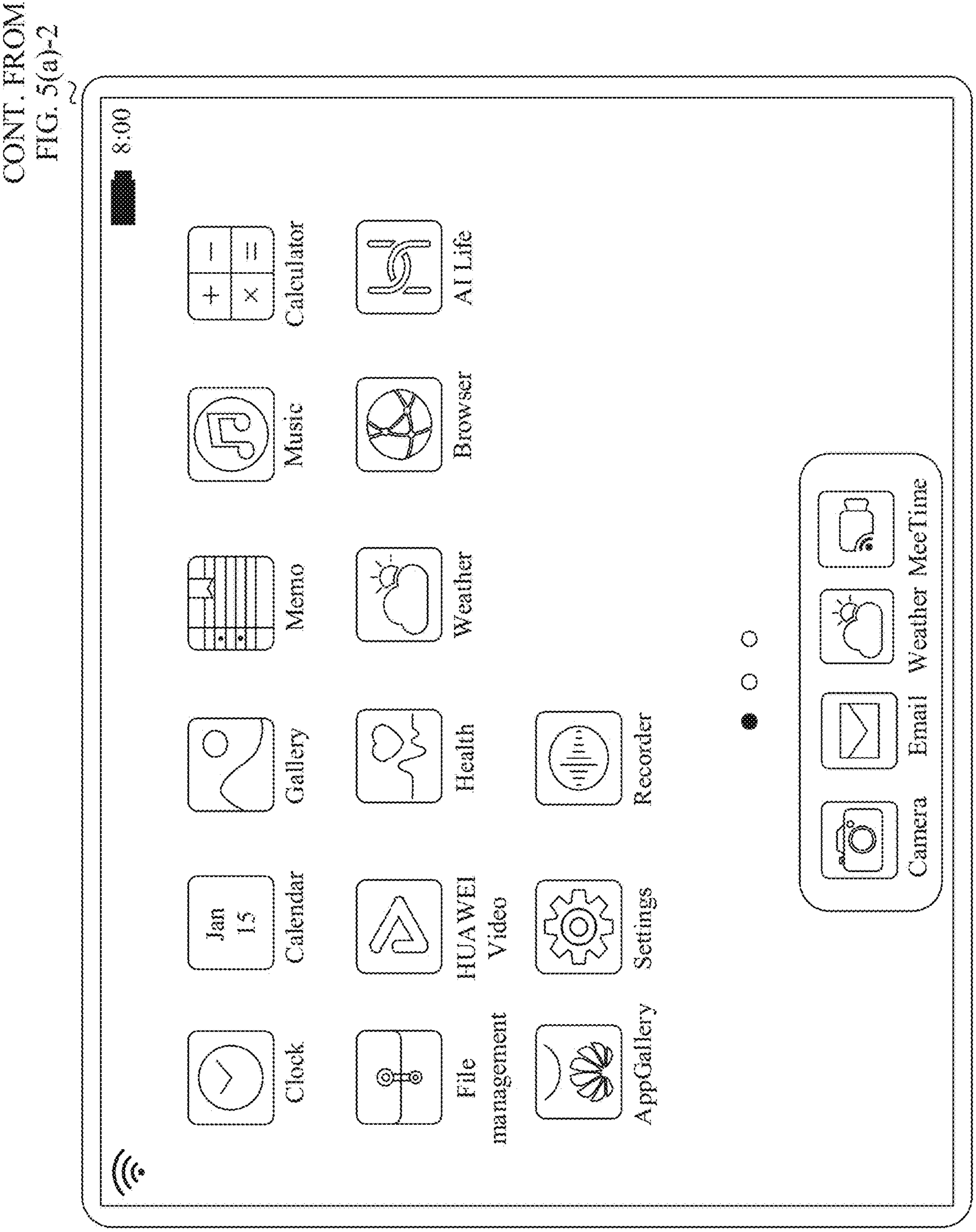
Figures 1, 5B:
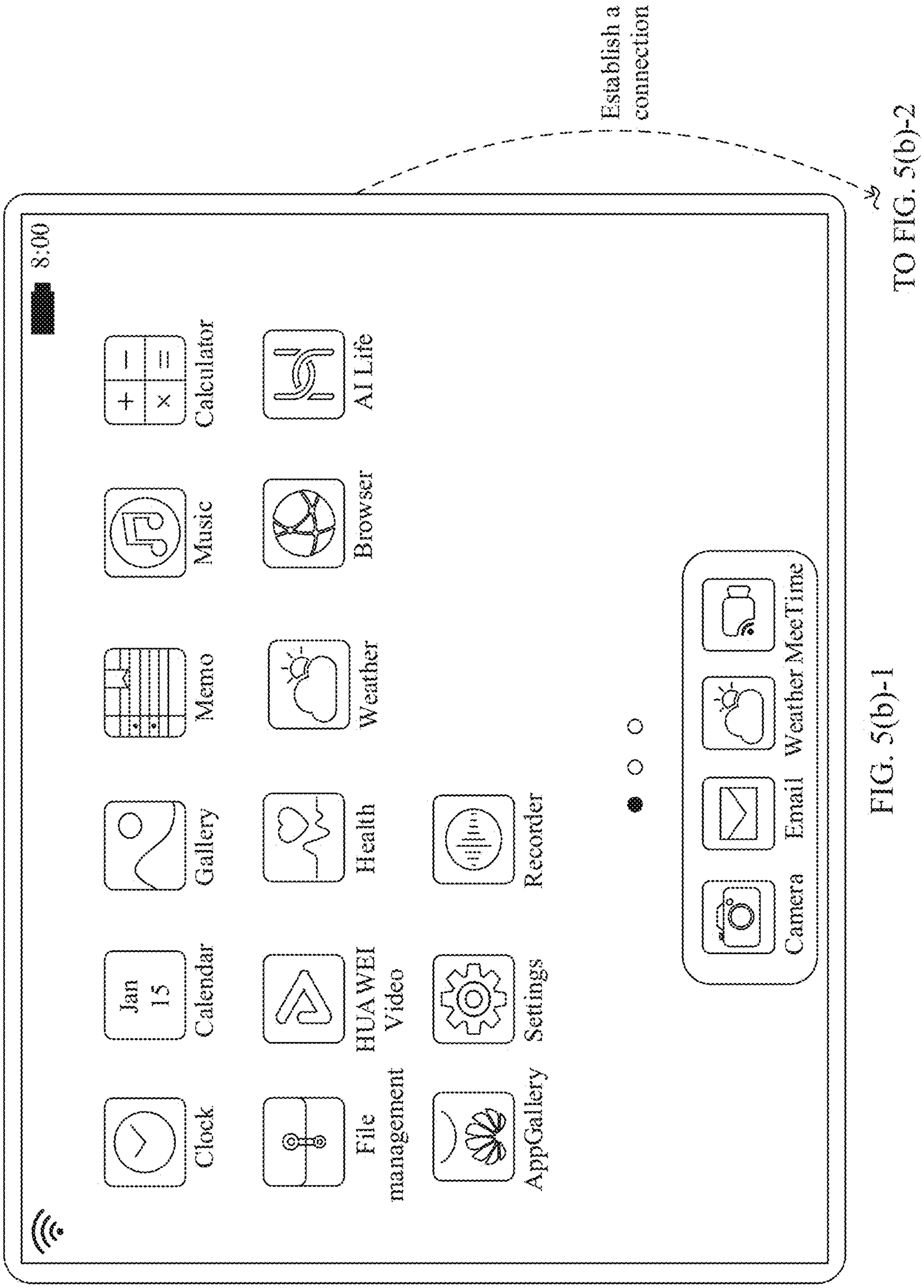
Figures 2, 5B:
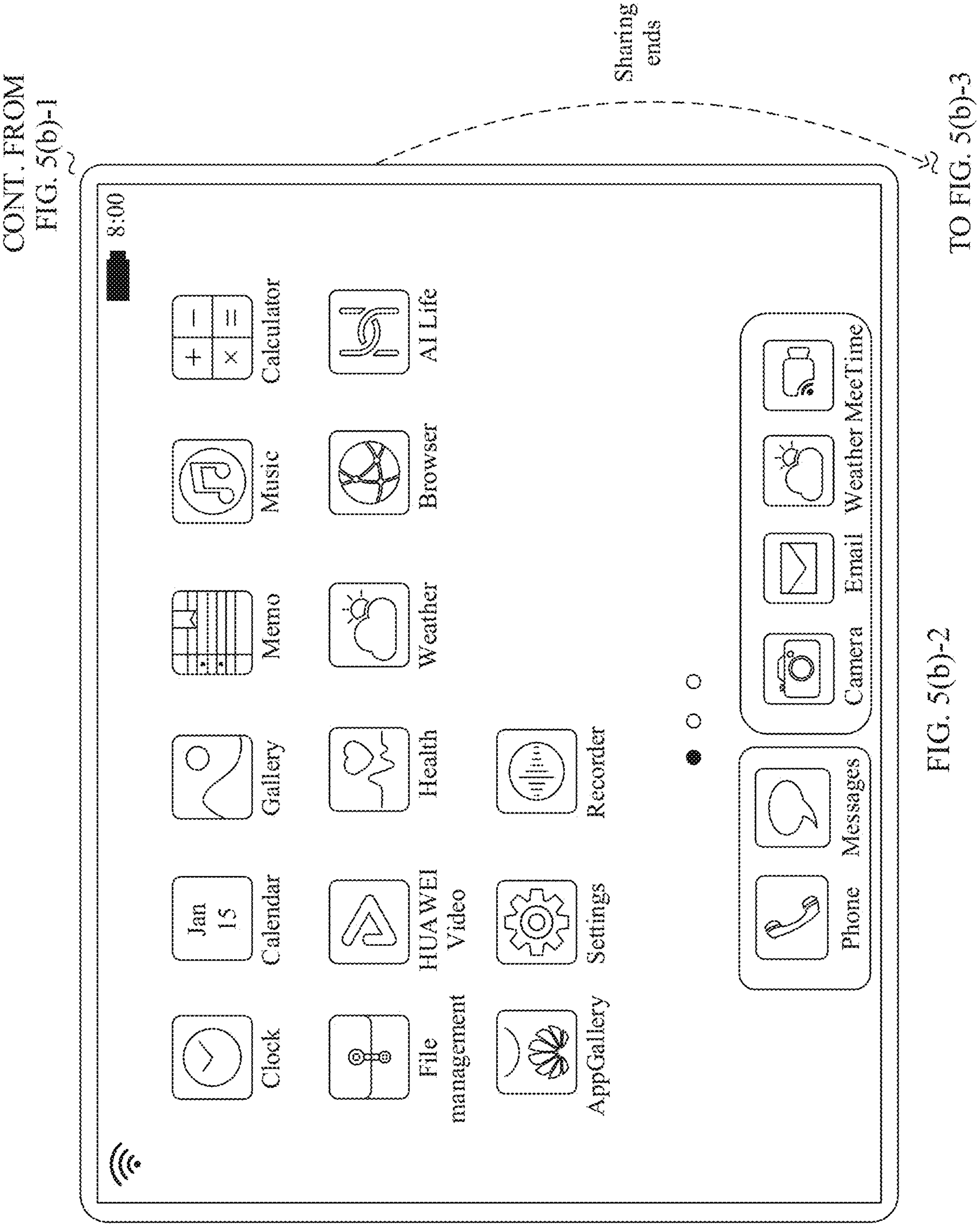
Figures 3, 5B:
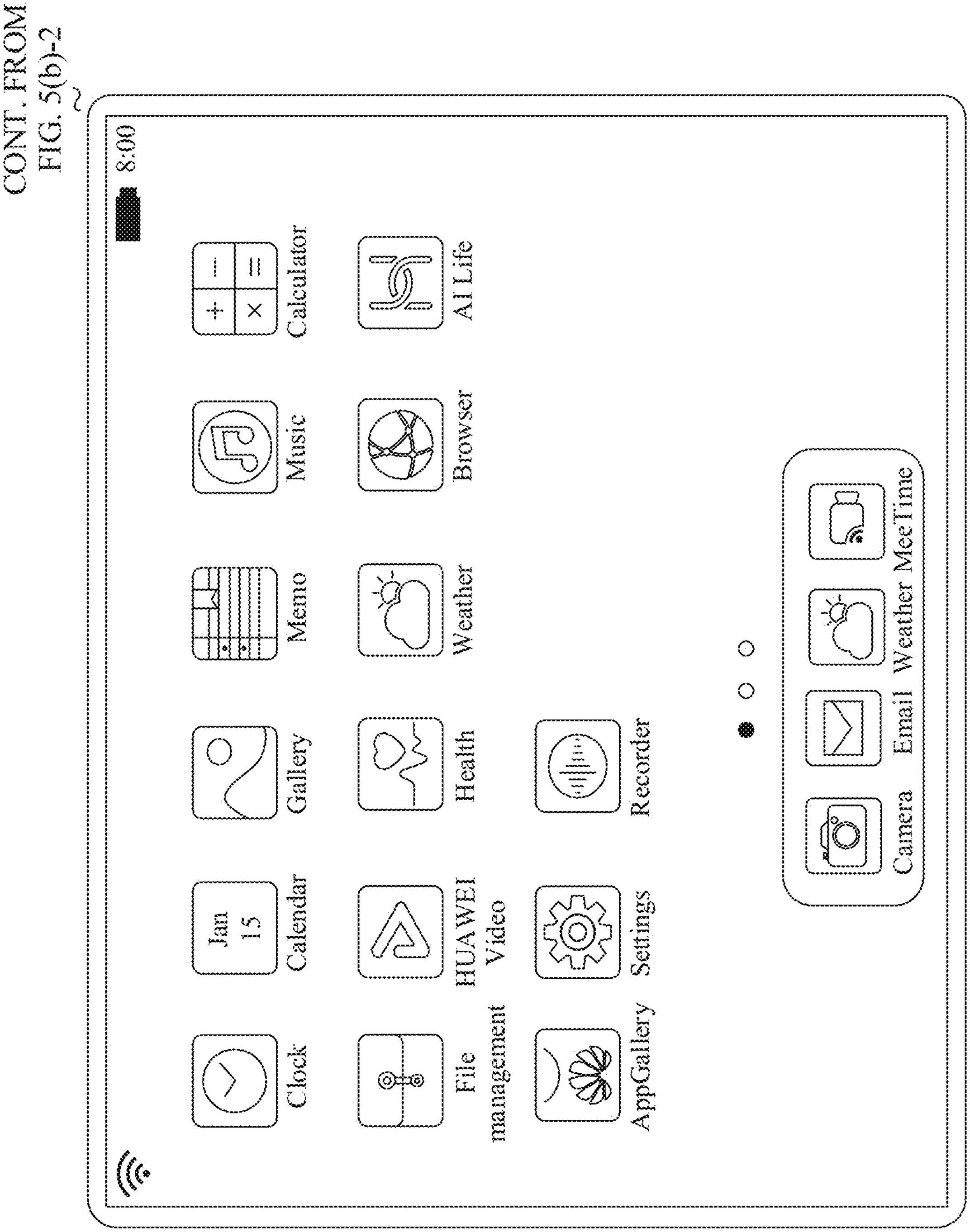
Figures 1, 6A:
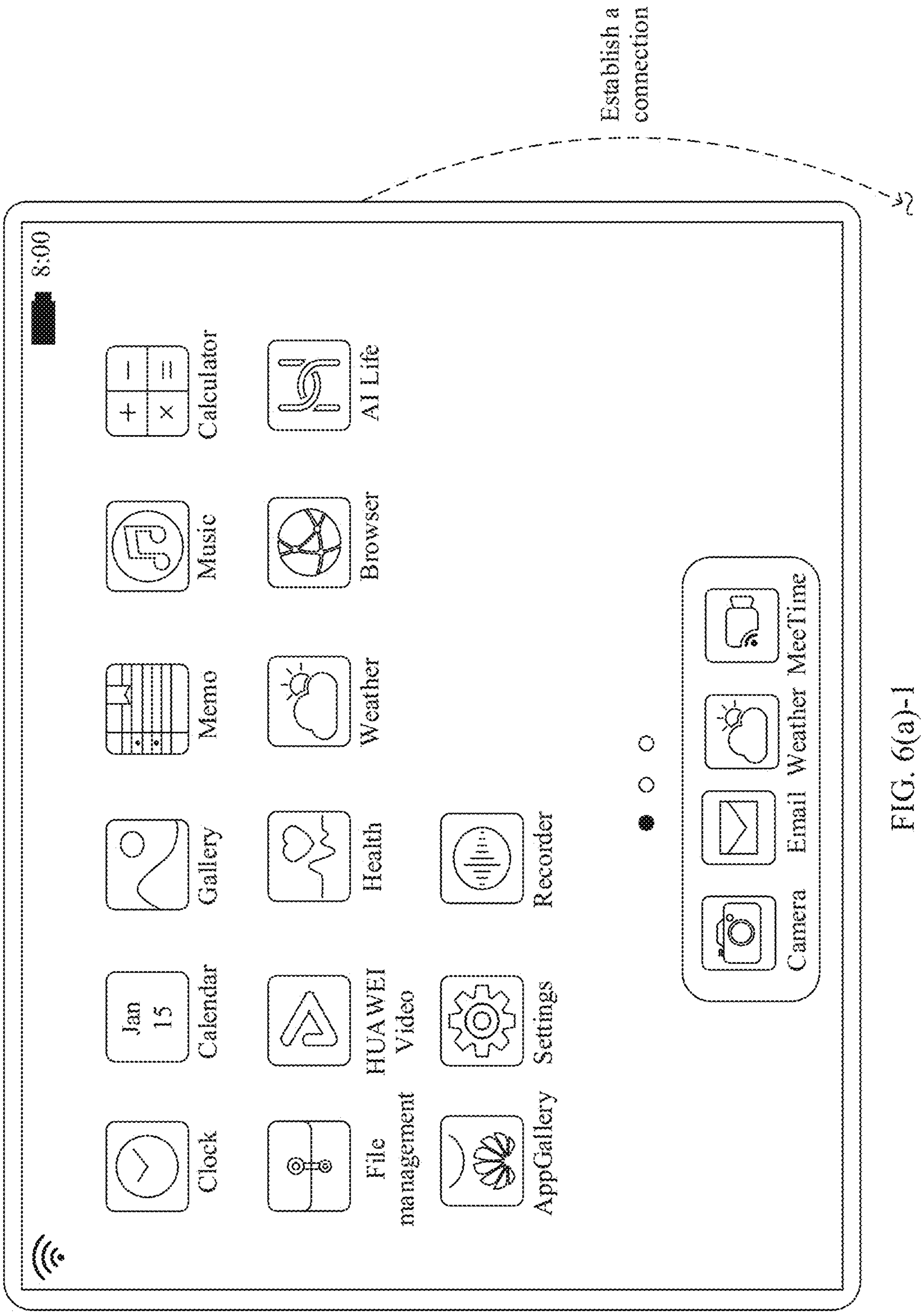
Figures 2, 6A:
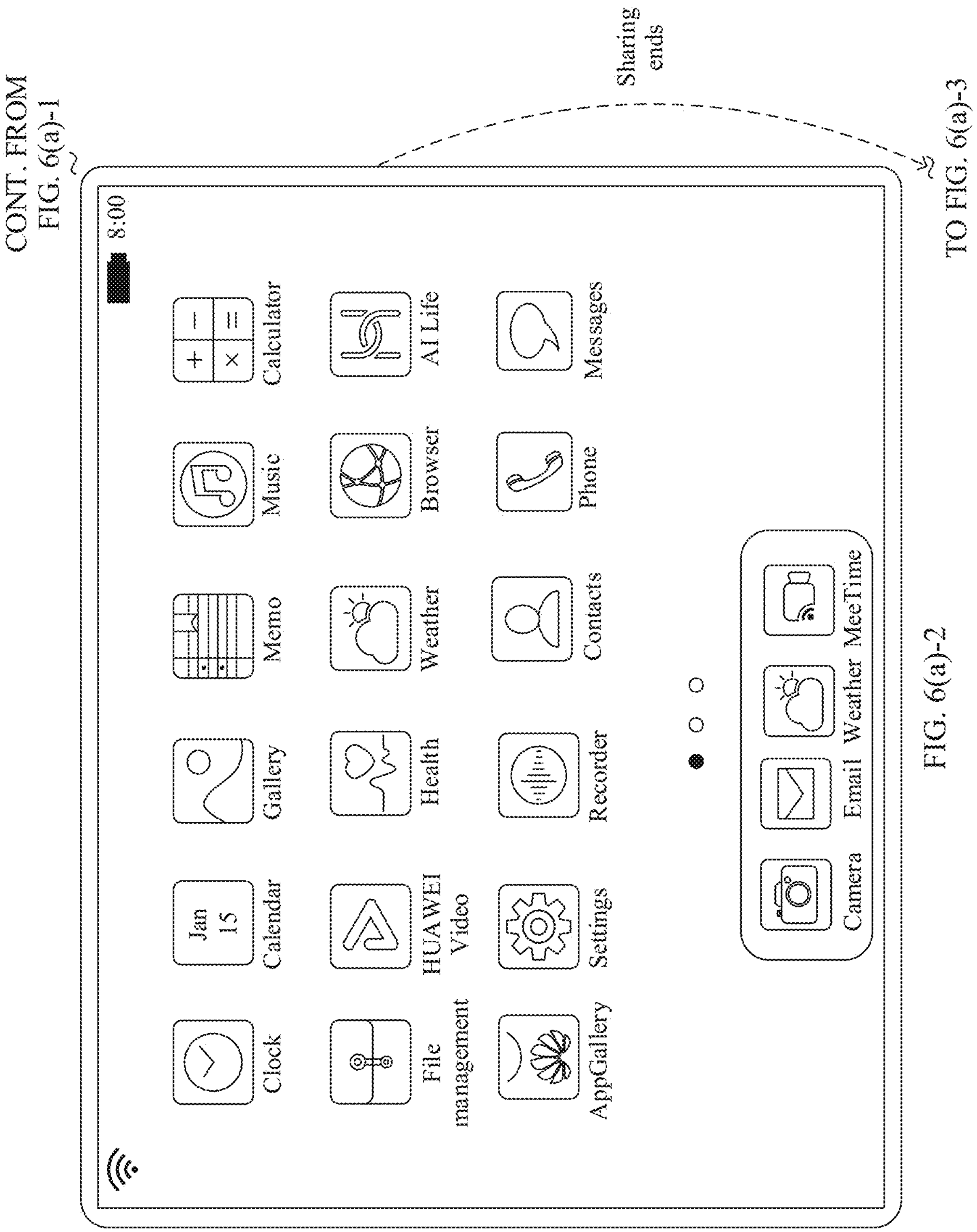
Figures 3, 6A:
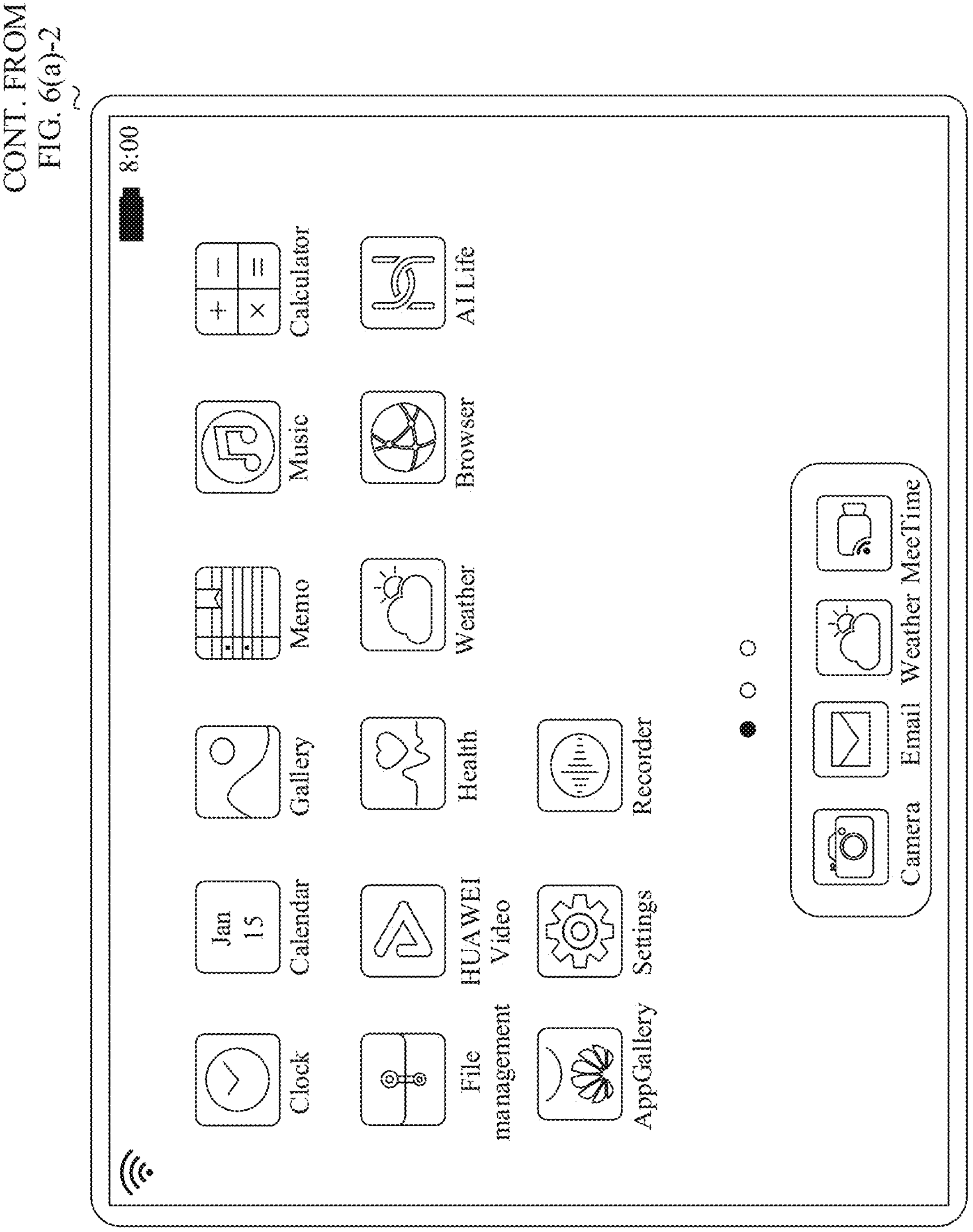
Figures 1, 6B:
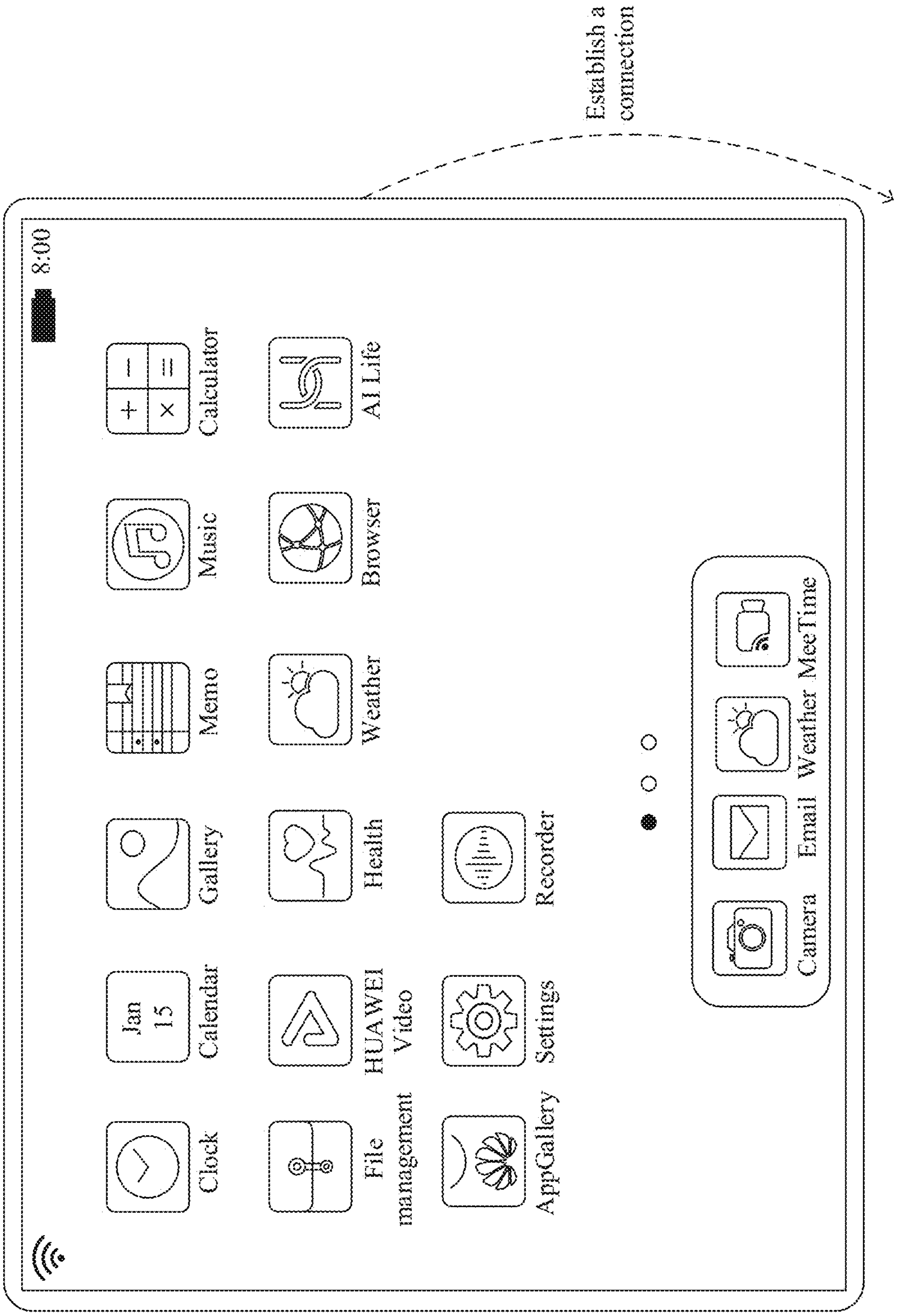
Figures 2, 6B:
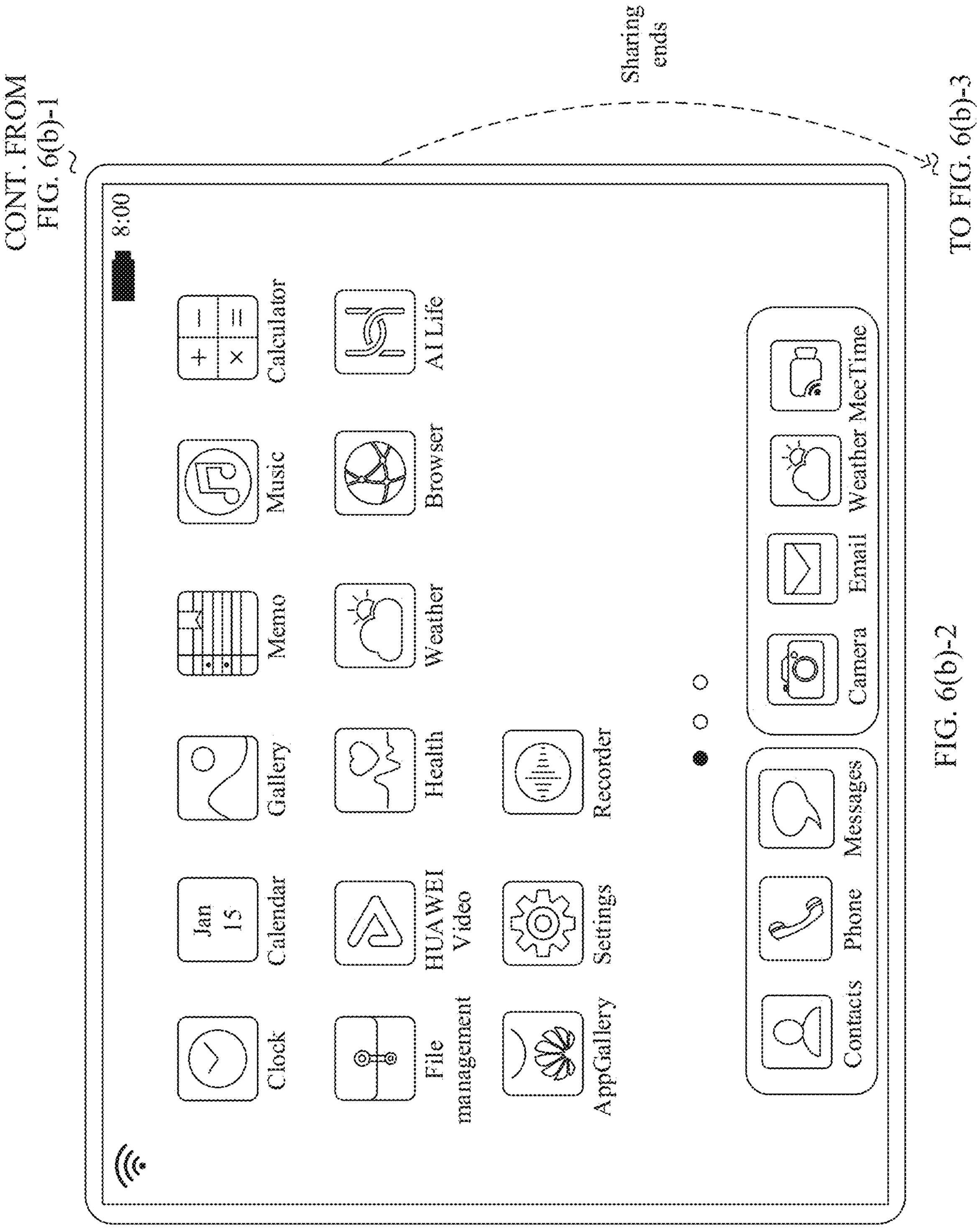
Figures 3, 6B:
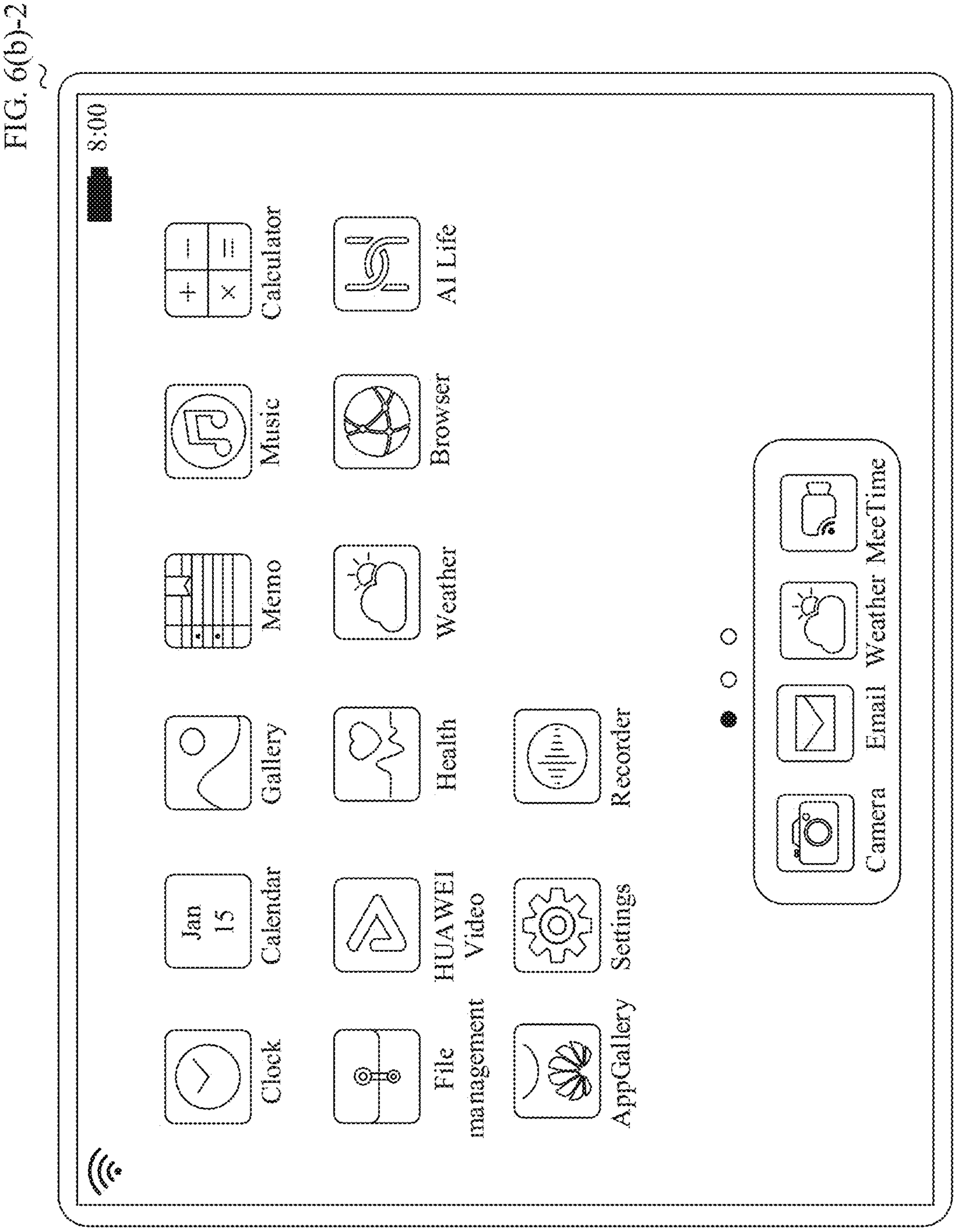
Figures 1, 6C:
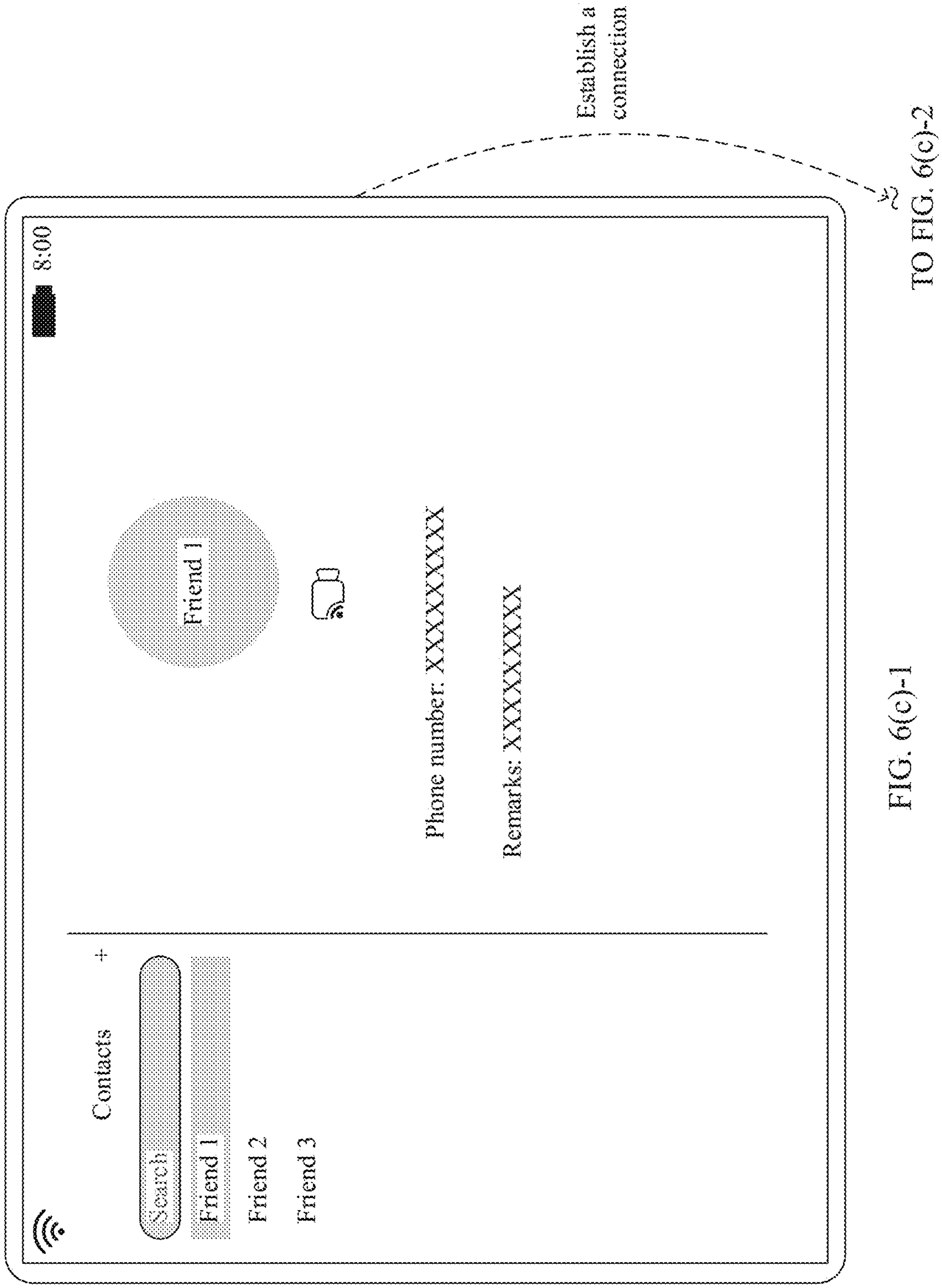
Figures 2, 6C:
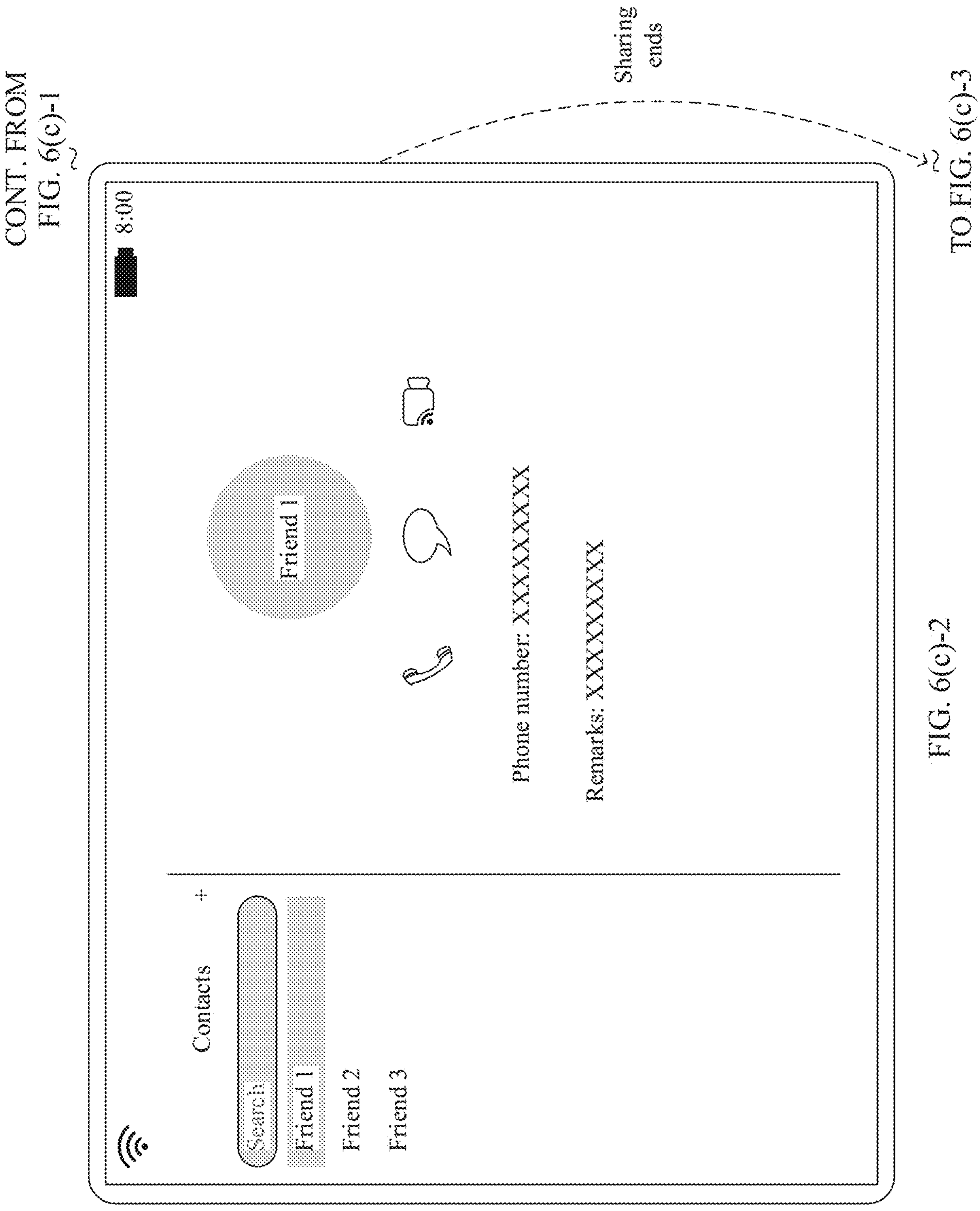
Figures 3, 6C:
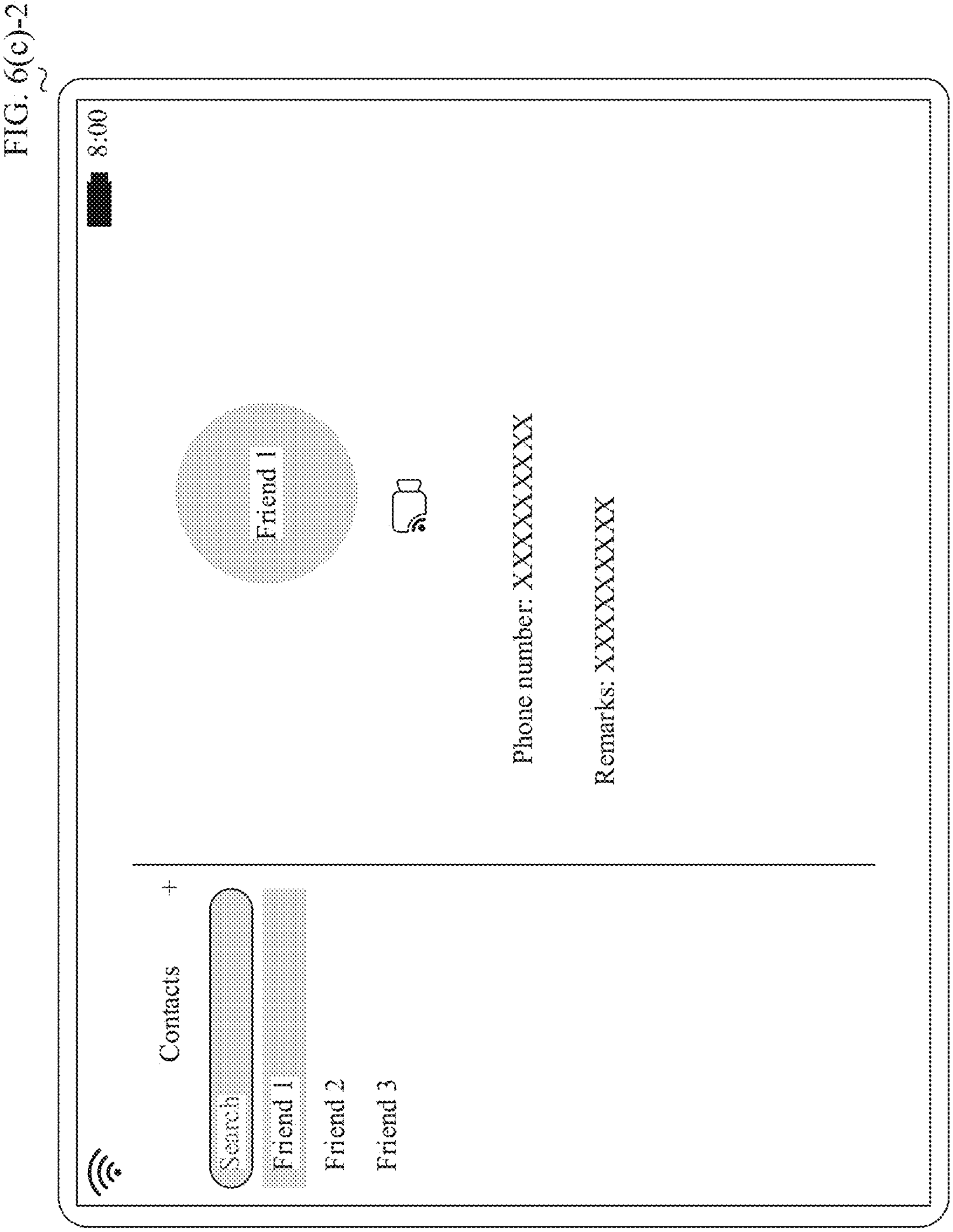
Figures 1, 7A:
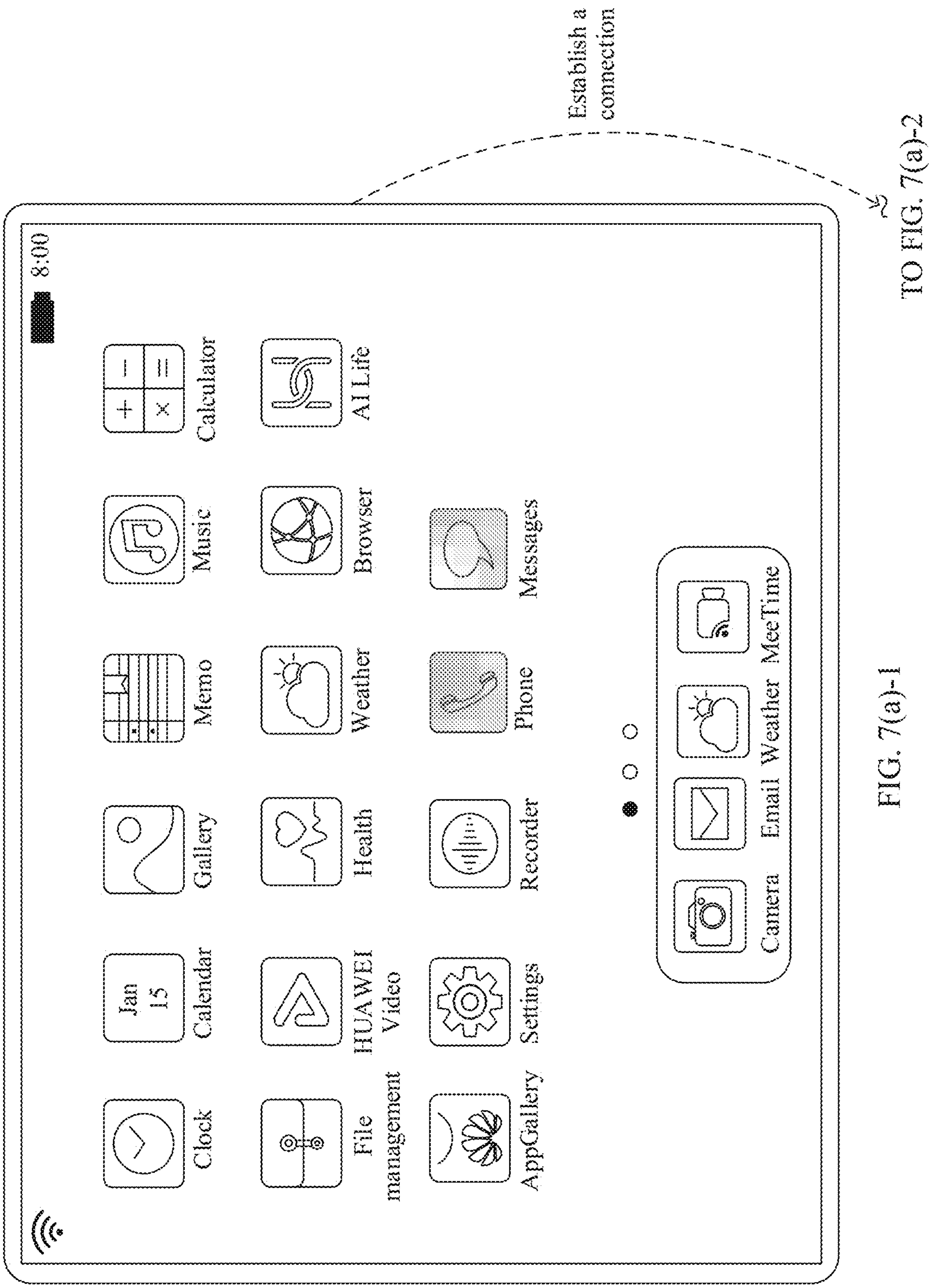
Figures 2, 7A:
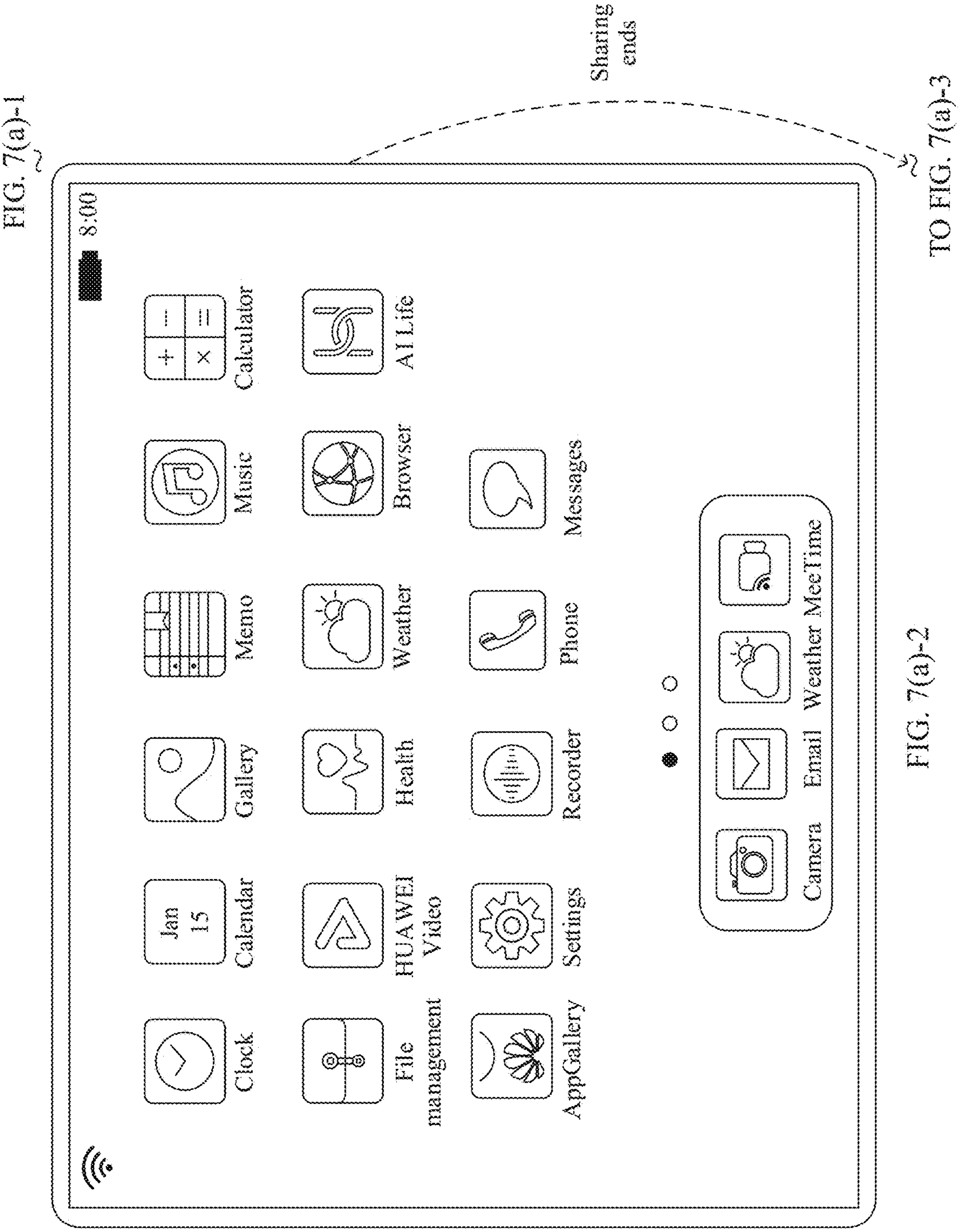
Figures 3, 7A:
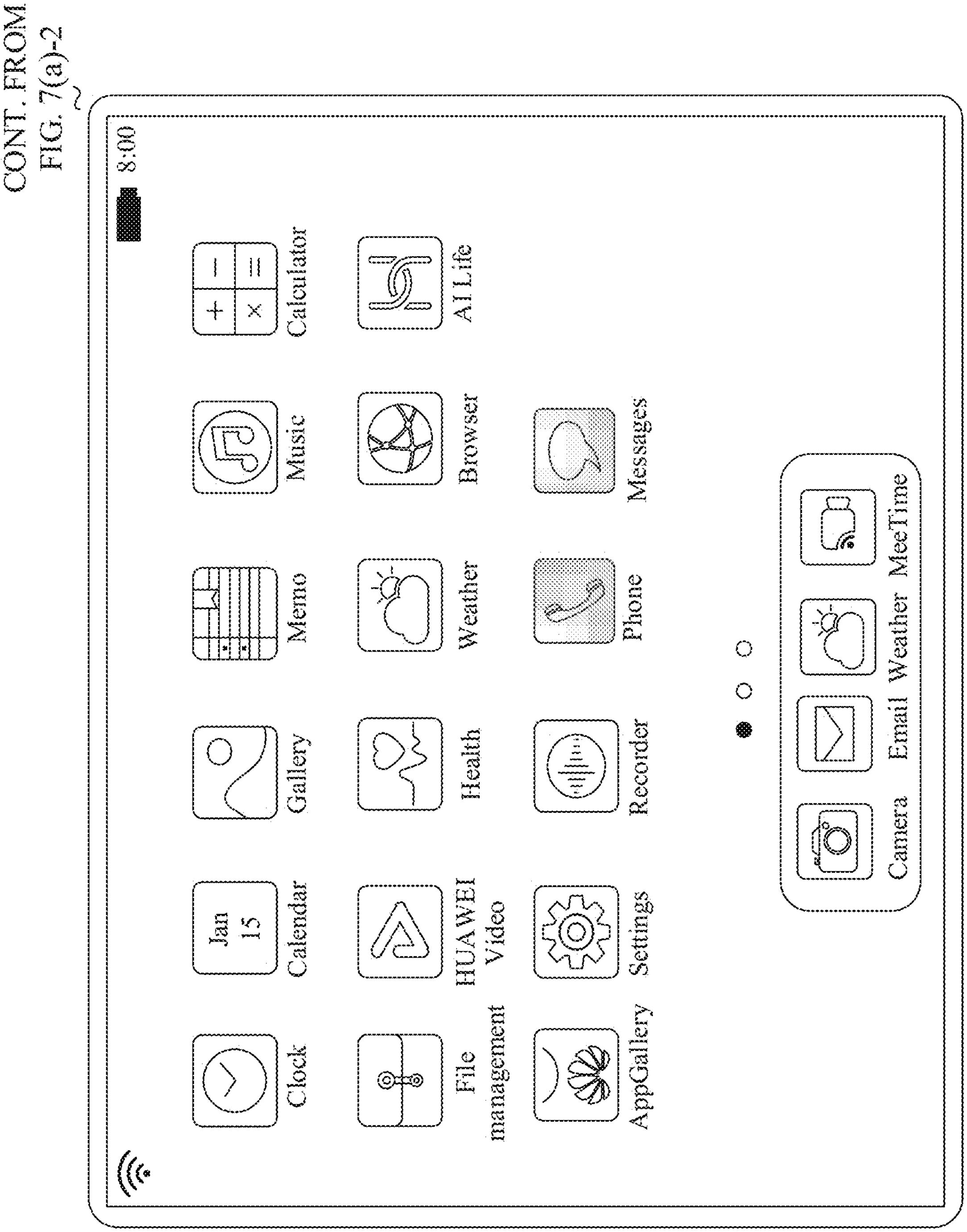
Figures 1, 7B:
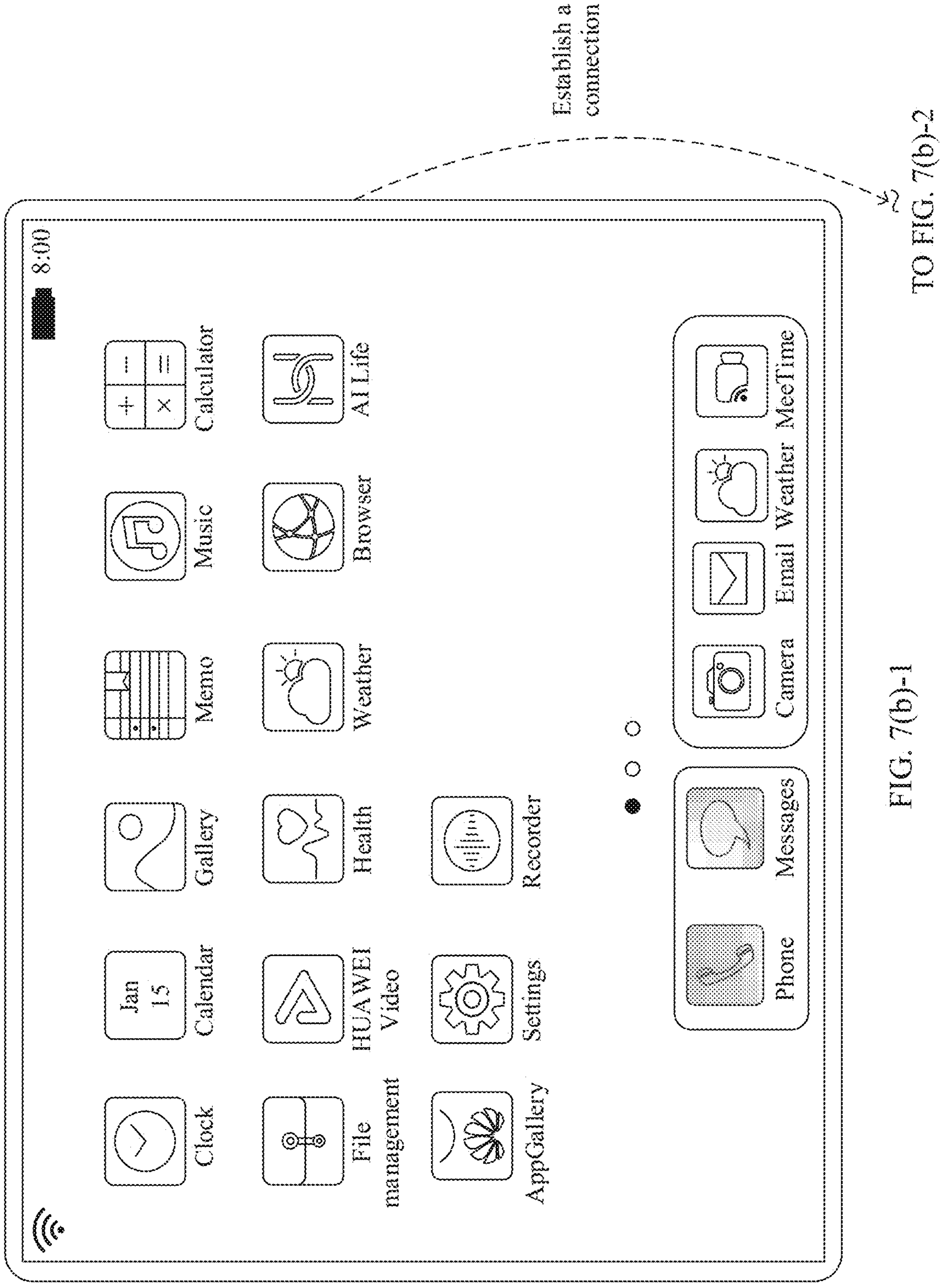
Figures 2, 7B:
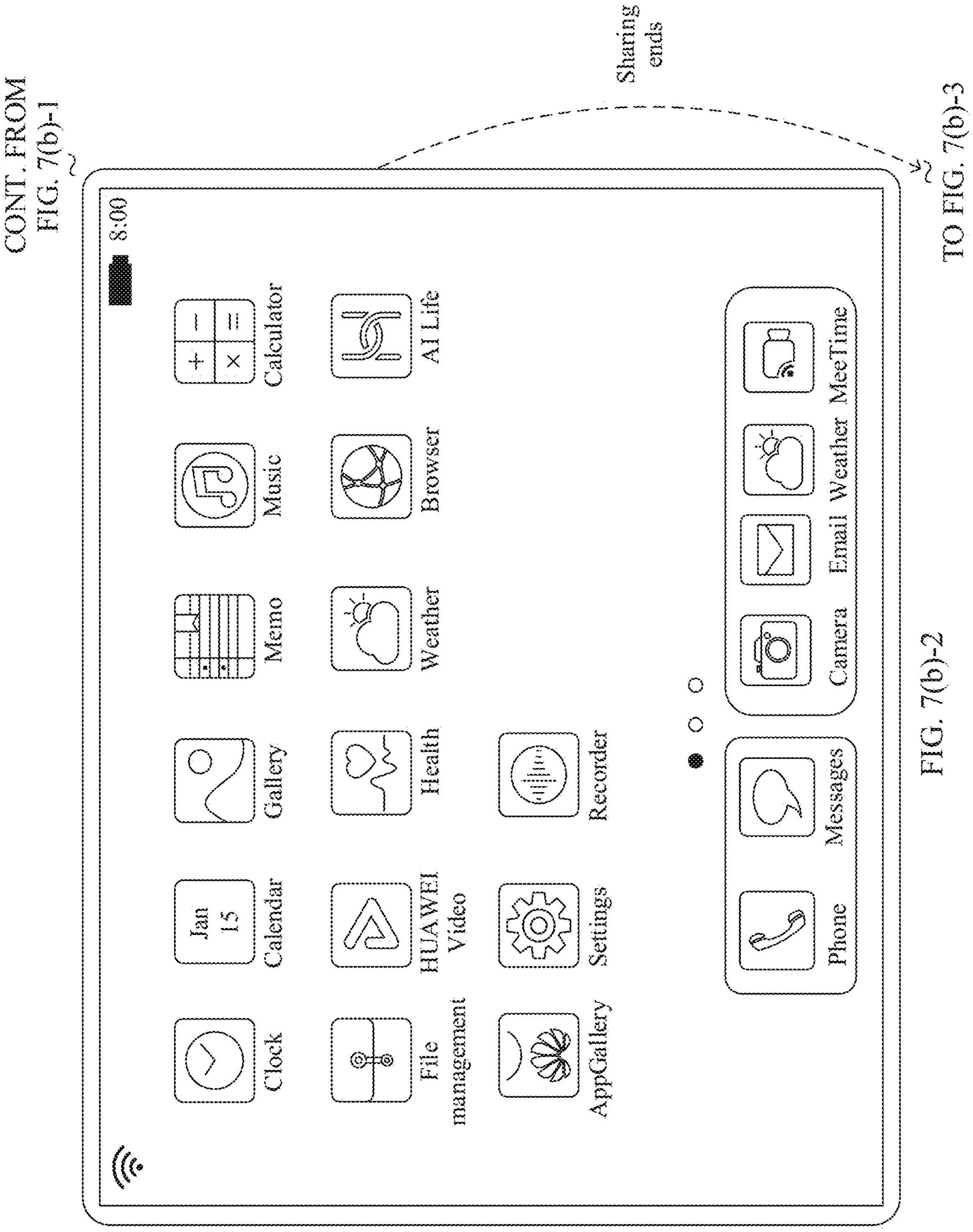
Figures 3, 7B:
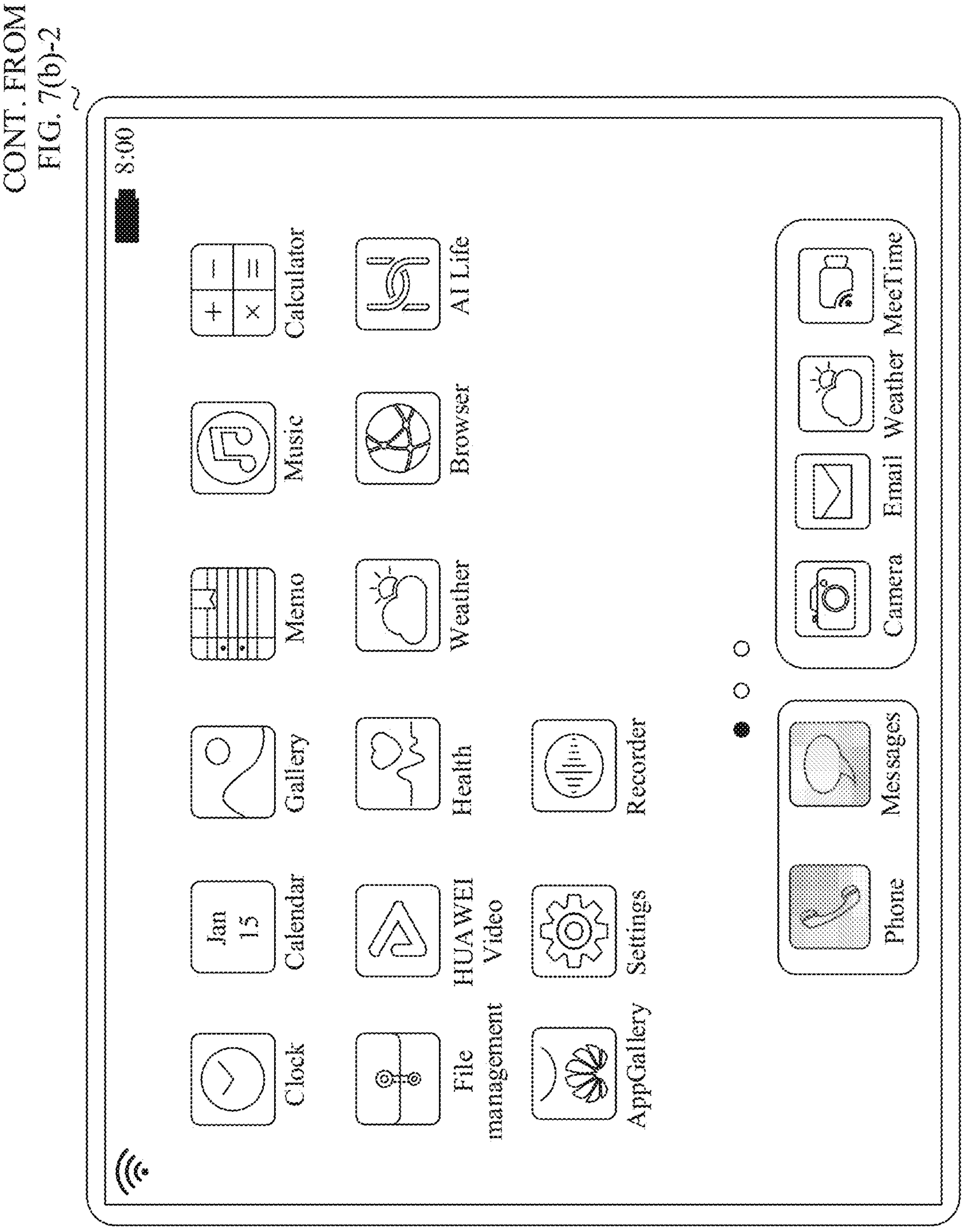
Figures 1, 8A:
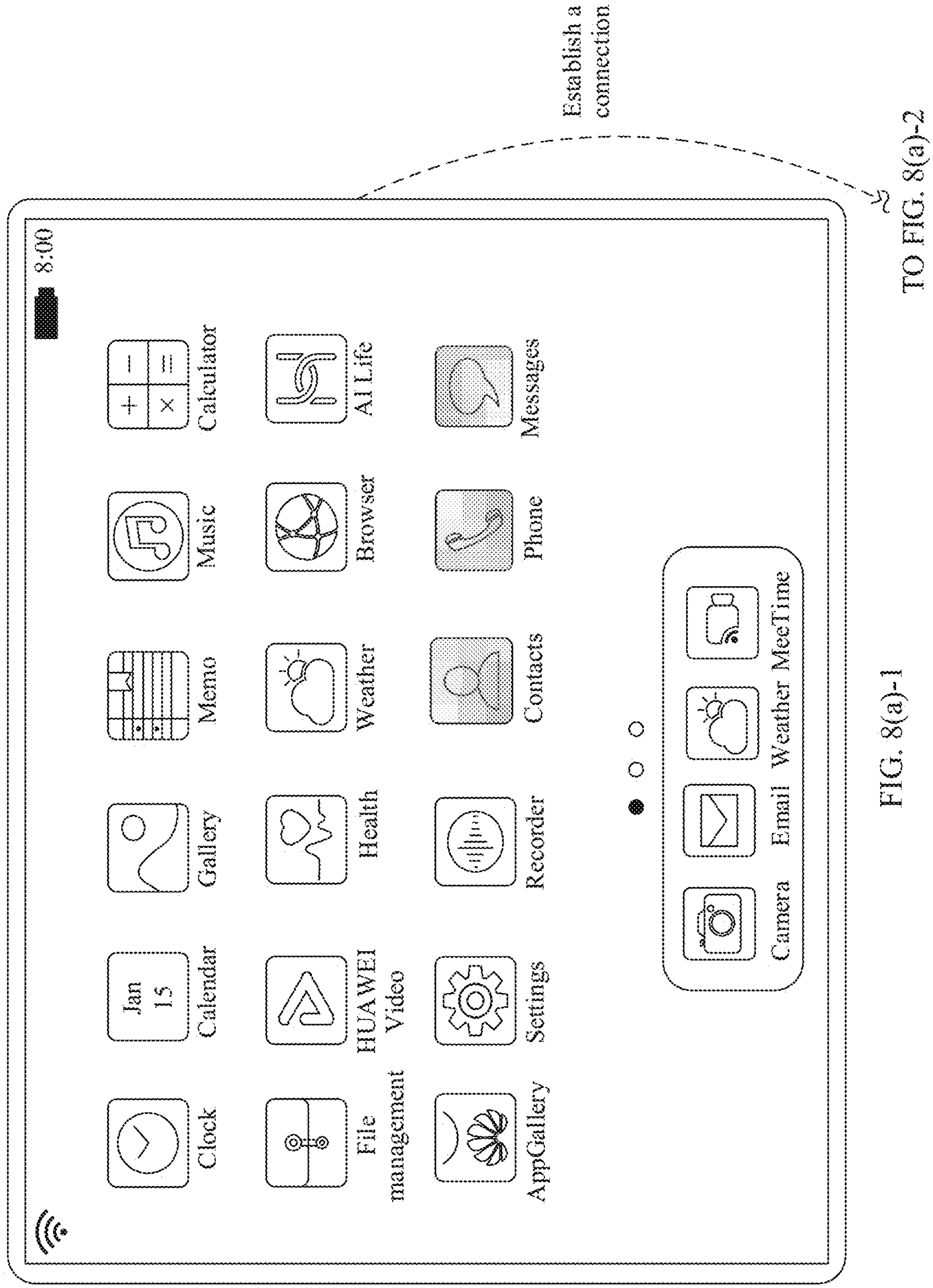
Figures 2, 8A:
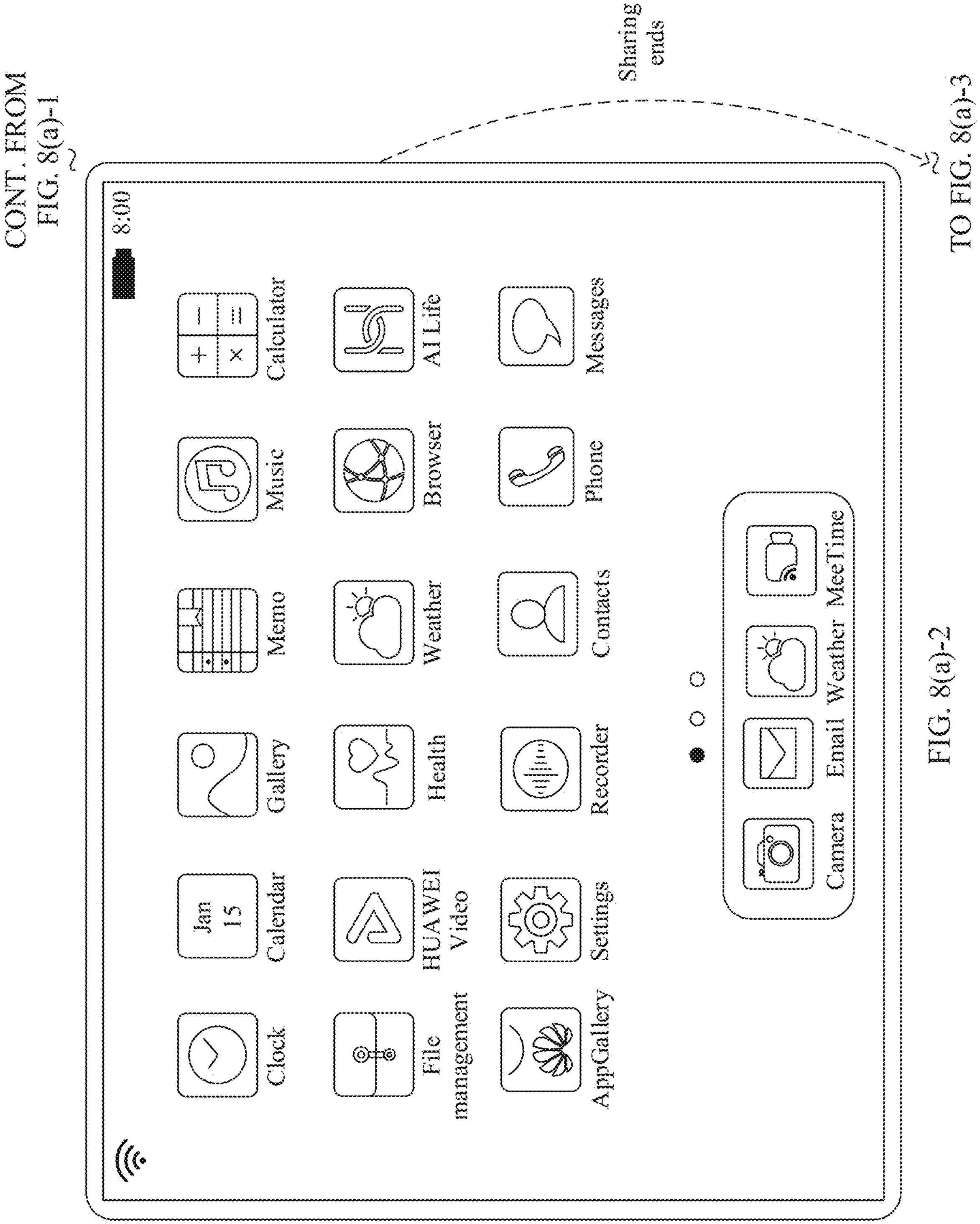
Figures 3, 8A:
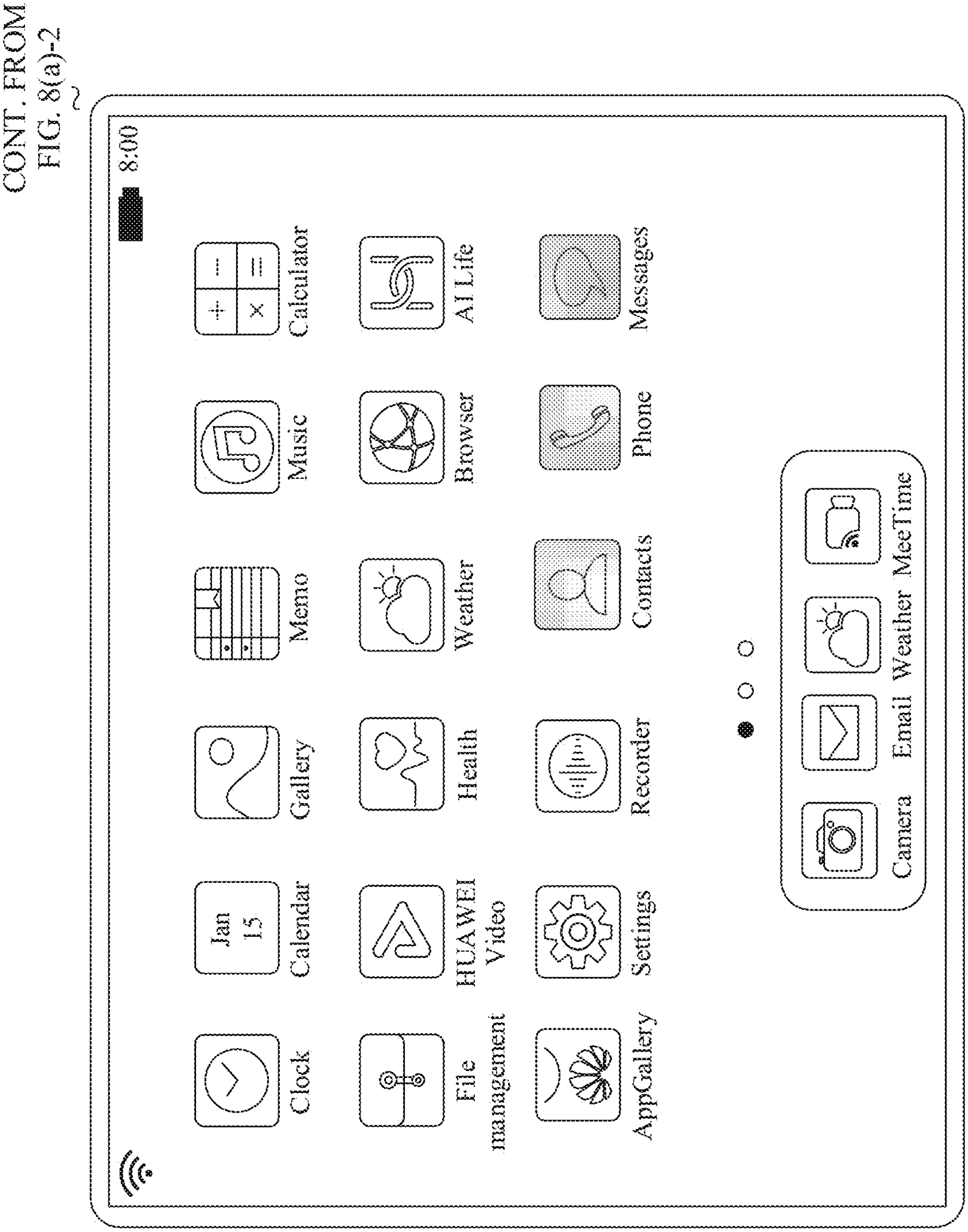
Figures 1, 8B:
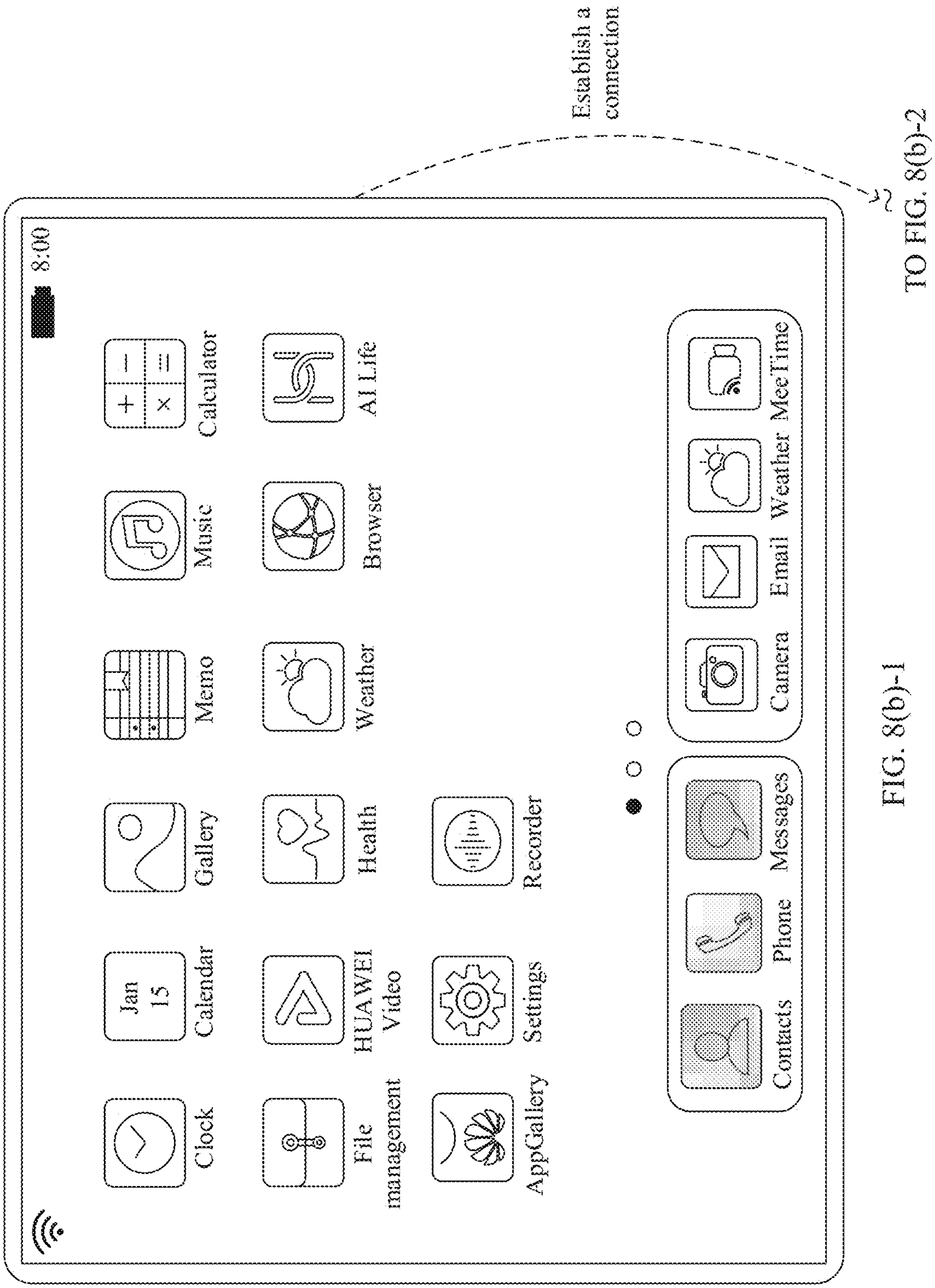
Figures 2, 8B:
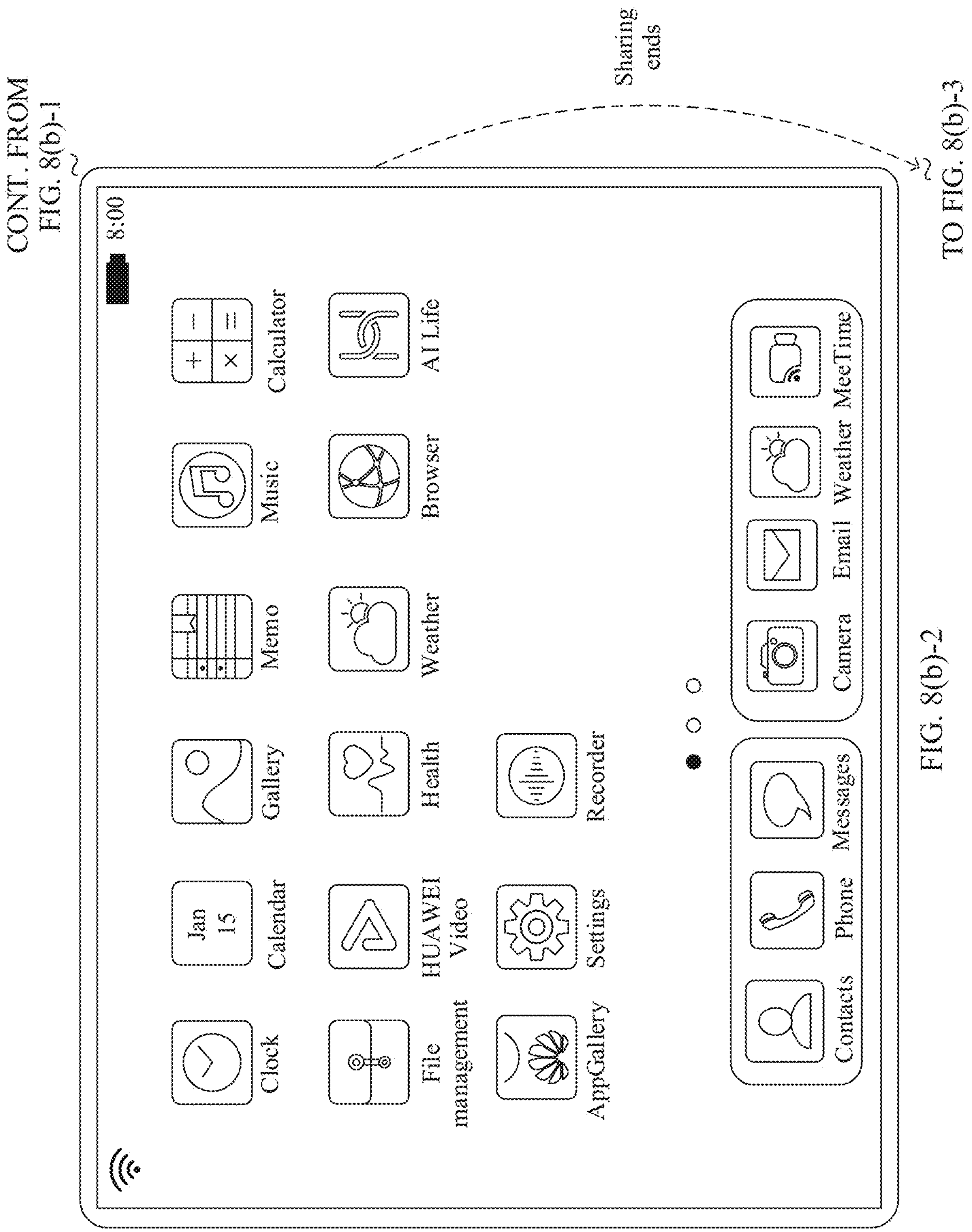
Figures 3, 8B:
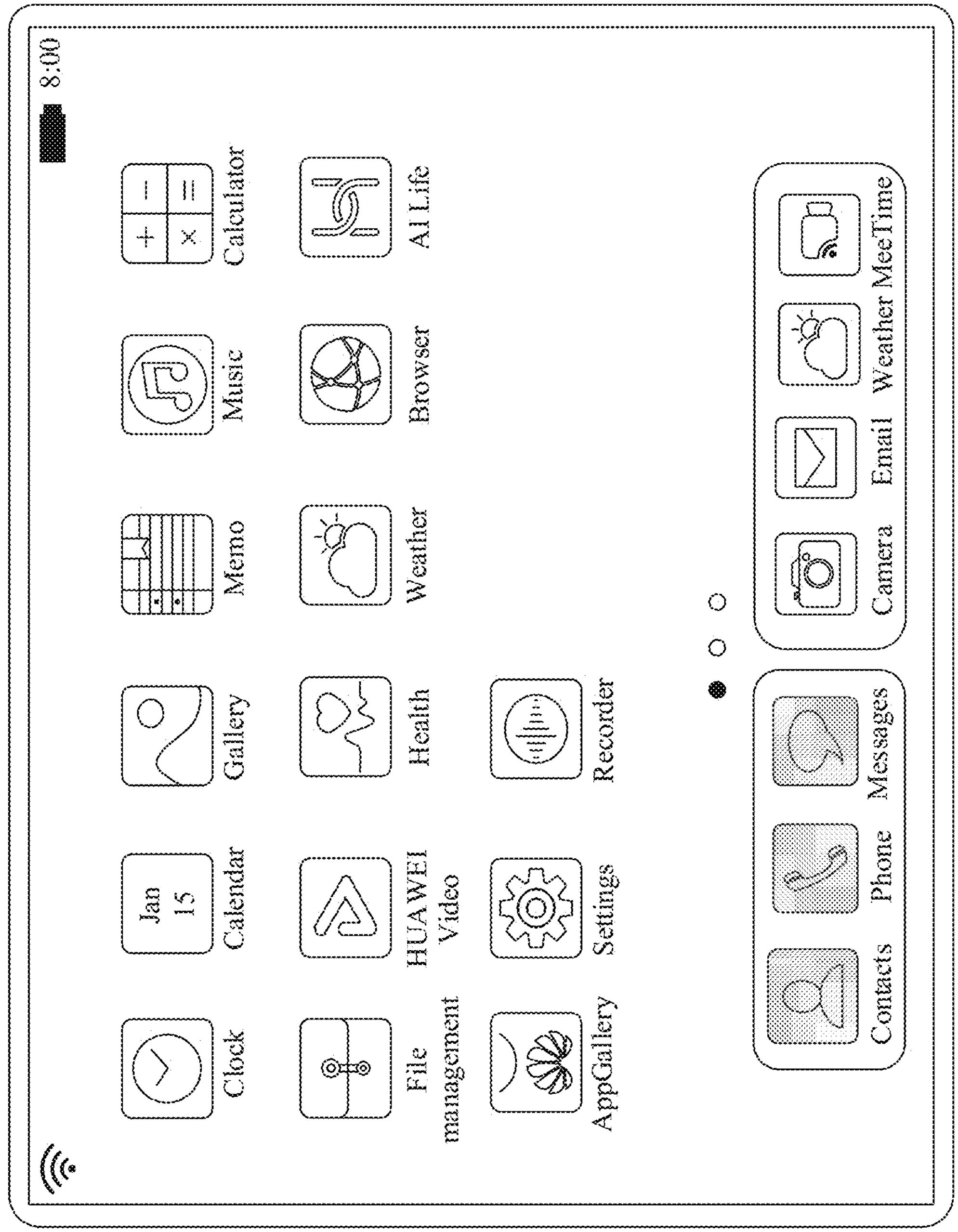
Figures 1, 8C:
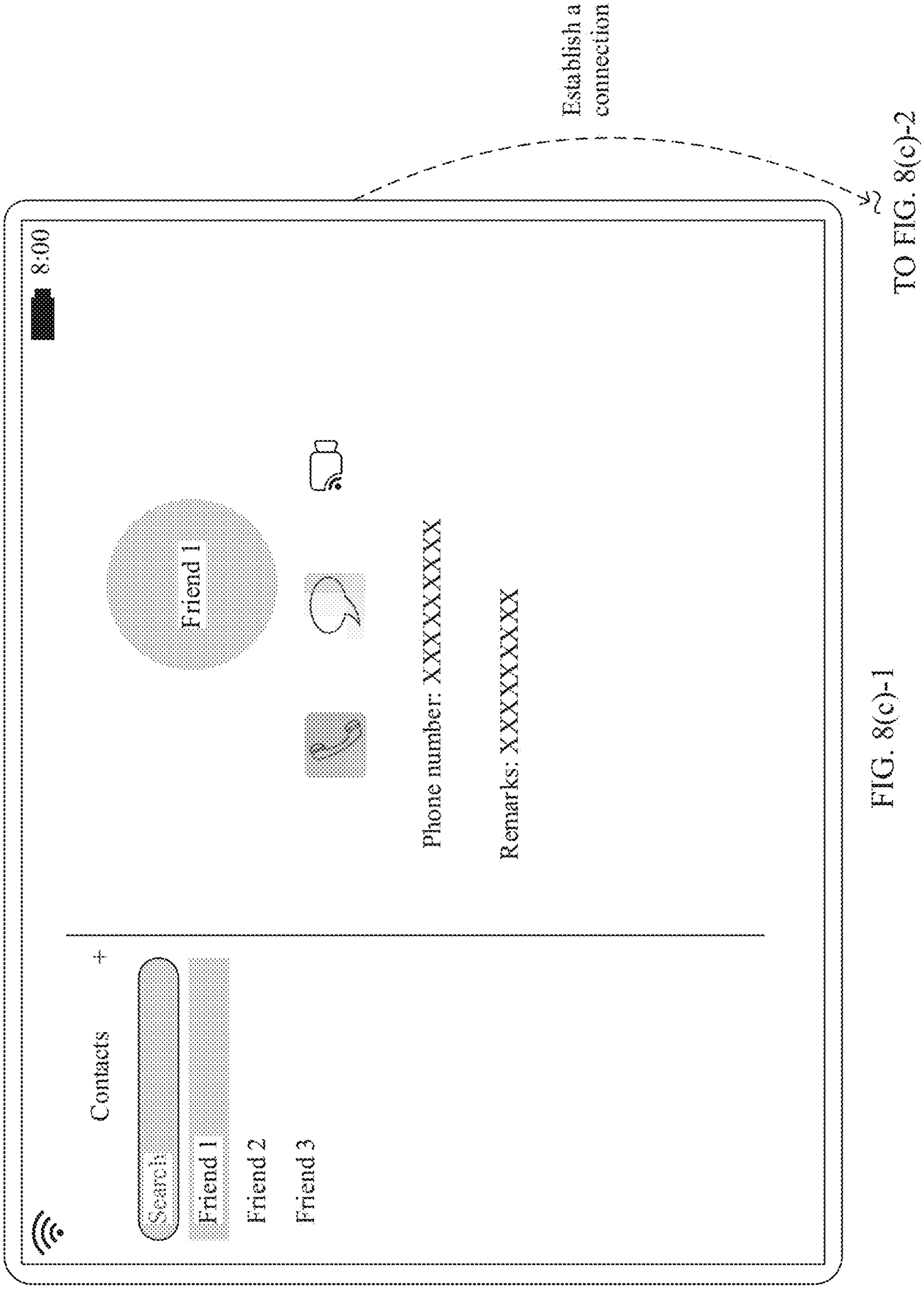
Figures 2, 8C:
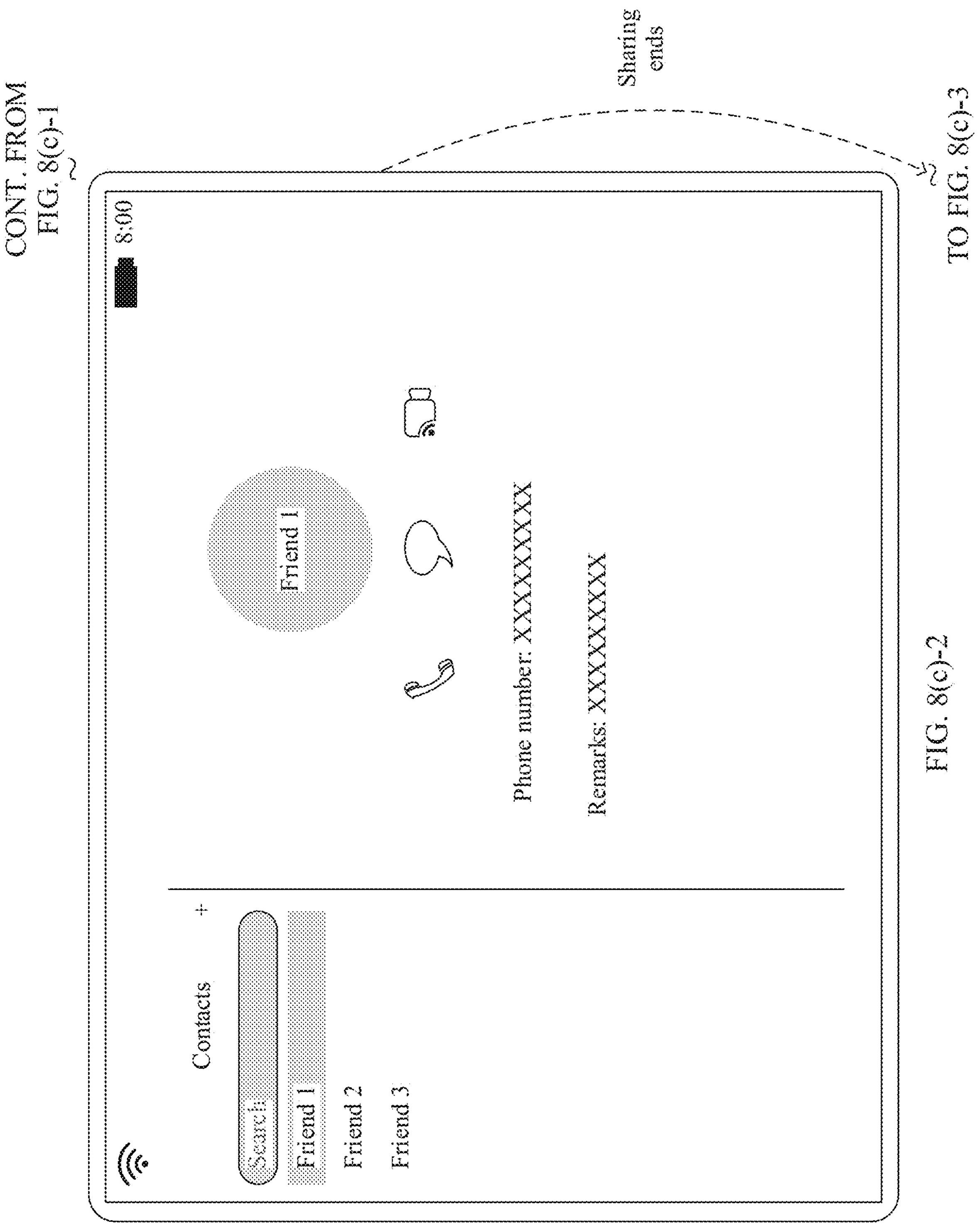
Figures 3, 8C:
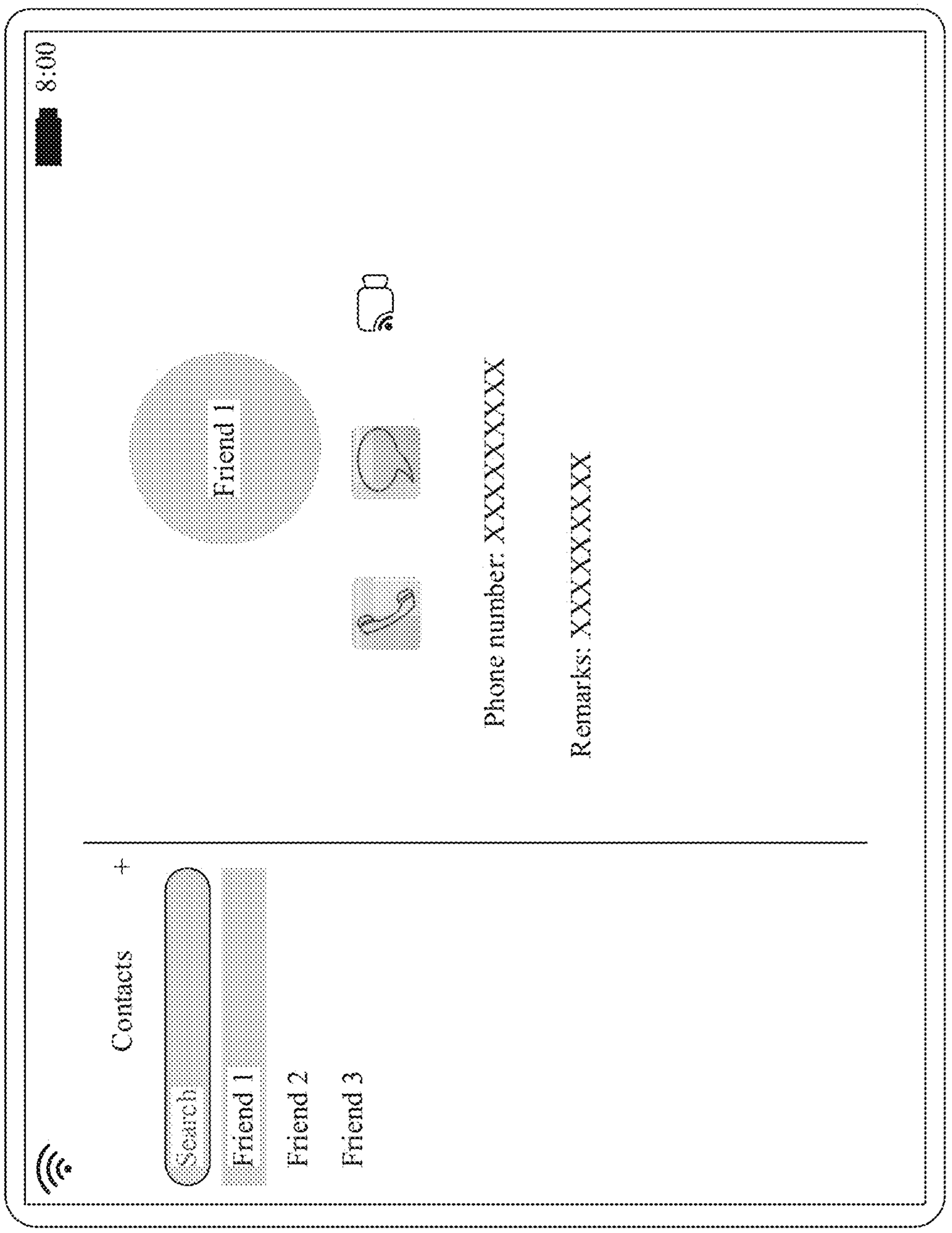

In an example, when the first device runs an Android system, and the second device runs a non-Android system, as shown in FIG. 2(*b*), a signaling adaptation module may be disposed in a radio interface (namely, an interface used by an electronic device to perform wireless communication in the non-Android system) of the second device. During cellular signaling exchange, after the modem of the first device receives the cellular signaling from the network side device, the RIL of the first device converts the cellular signaling into RIL signaling, and sends the RIL signaling to the radio interface of the second device. The radio interface of the second device converts, by using the signaling adaptation module, the RIL signaling into signaling that can be identified by the upper-layer application of the second device, and the upper-layer application of the second device performs a related cellular function operation based on the RIL signaling.

When the upper-layer application of the second device needs to send the cellular signaling to the network layer device, the upper-layer application of the second device sends corresponding signaling to the radio interface of the second device. After the signaling adaptation module in the radio interface converts the signaling into RIL signaling, the radio interface forwards the RIL signaling to the RIL of the first device through the transmission channel, and after the RIL of the first device converts the RIL signaling into cellular signaling, the modem of the first device sends the cellular signaling to the network side device.

In other words, when the second device runs a non-Android system, a corresponding signaling adaptation layer may be set for the radio interface of the second device, and the radio interface and the signaling adaptation layer of the second device may be used as a virtual RIL of the second device to perform signaling exchange with the RIL of the first device. For the second device, the virtual RIL of the second device is used as a virtual modem of the second device, to assist the second device in completing the cellular communication function by using the modem of the first device.

In an example, if the first device is connected to Wi-Fi, and the second device is not connected to Wi-Fi, when the first device assists the second device in transmitting a data flow (for example, data corresponding to a specific service, like voice data, video data. SMS message data, and Internet access data), whether to interact with the network side device by using a Wi-Fi link or interact with the network side device by using a mobile data link may be selected by identifying a service type. For example, if the first device identifies that the second device needs to be assisted in implementing the call function or the SMS message function, the first device may switch a communication link to the mobile data link. If the first device identifies that the second device needs to be assisted in implementing the Internet access function, the first device may switch the communication link to the Wi-Fi link, to save traffic of the first device.

In an example, a plurality of transmission channels with different power consumption may be established between the first device and the second device. The first device and the second device may select a transmission channel with low power consumption based on a type of transmitted content while ensuring communication efficiency, to reduce power consumption of the first device and the second device.

For example, a P2P channel and a Bluetooth channel are established between the first device and the second device. A transmission speed of the P2P channel is faster than a transmission speed of the Bluetooth channel, but power consumption of the P2P channel is higher. The first device and the second device may transmit signaling (for example, the foregoing RIL signaling) through the Bluetooth channel, and transmit the data flow (for example, the voice data, the video data, the SMS message data, and the Internet access data) through the P2P channel.

For another example, channels of two versions of BLE (for example, BLE 1 and BLE 2, where a transmission speed of the BLE 1 is slower than a transmission speed of the BLE 2, but power consumption of the BLE 1 is lower) and a P2P channel are established between the first device and the second device. The first device and the second device may transmit signaling through the BLE 1 channel, transmit a data flow of light traffic (for example, the voice data and the SMS message data) through the BLE 2 channel, and transmit a data flow of heavy traffic (for example, the video data and the Internet access data) through the P2P channel.

It may be understood that a plurality of transmission channels with different power consumption may be established between the first device and the second device before communication interaction is performed, or a transmission channel with low power consumption may be first established, to perform signaling exchange. When the upper-layer application of the second device determines, based on exchanged signaling, that a data flow needs to be transmitted, a transmission channel with corresponding power consumption is established based on a type of the data flow (for example, whether the data flow is a data flow of light traffic or a data flow of heavy traffic).

Figure 3:
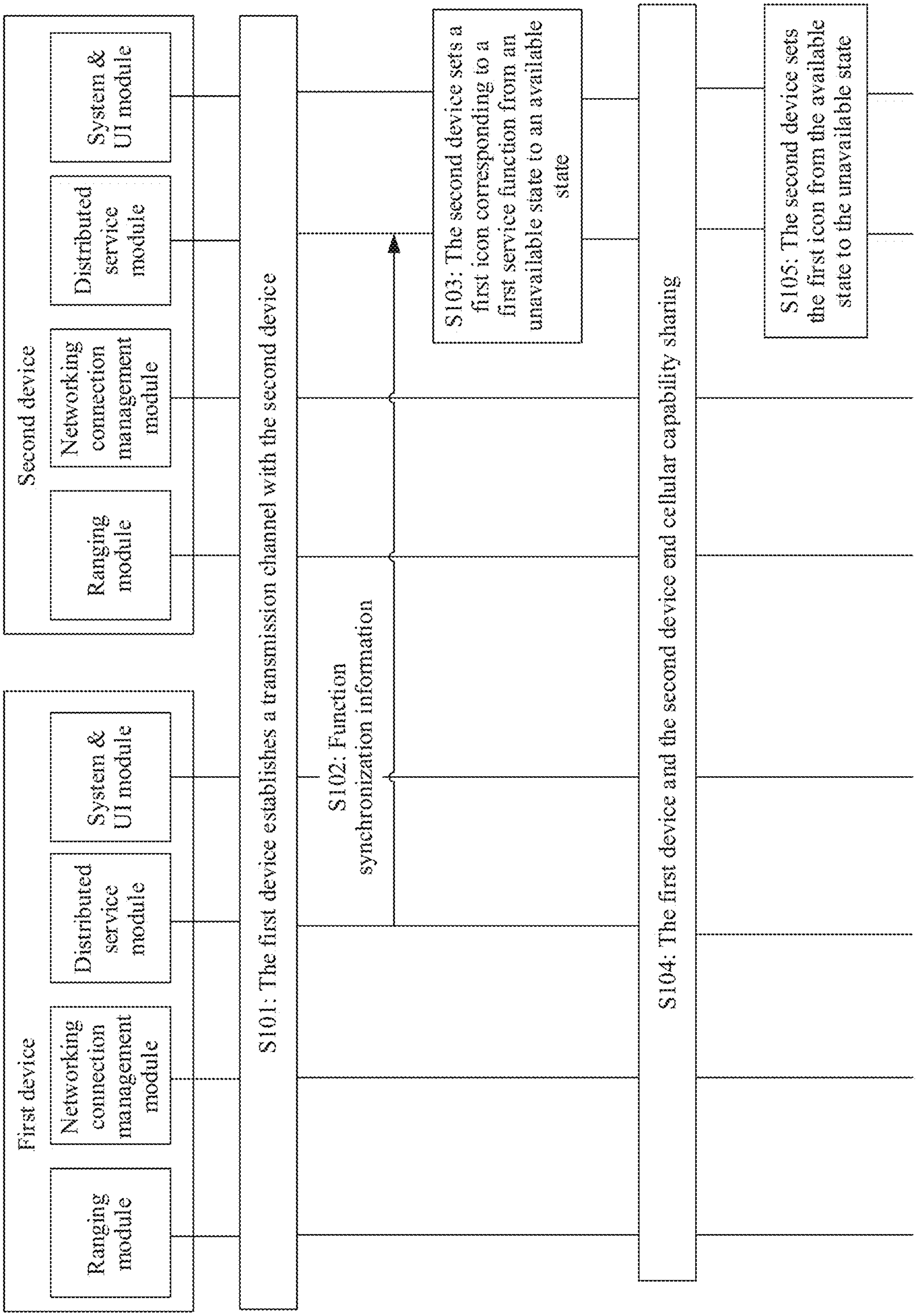
FIG. 3 is a flowchart 1 of an embodiment of a method for sharing a cellular capability according to an embodiment of this application.

FIG. 3 is a flowchart of an embodiment of a method for sharing a cellular capability according to this application. The method mainly relates to an icon loading manner in a cellular capability sharing process. As shown in FIG. 3, the method includes the following steps.

S101: A first device establishes a transmission channel with a second device.

After the first device and the second device establish the transmission channel by using a device connection, the first device may share a cellular capability with the second device through the transmission channel, and the second device can implement a cellular communication function by using the cellular capability of the first device. For example, for a process in which the second device implements the cellular communication function by using the cellular capability of the first device, refer to descriptions in the embodiment shown in FIG. 2(*a*) and FIG. 2(*b*). Details are not described herein again.

S102: The first device sends function synchronization information to the second device through the transmission channel, where the function synchronization information is used to synchronize, to the second device, a first service function that is allowed to be shared in the cellular communication function.

In this embodiment of this application, the first device may specify the first service function that is allowed to be shared. For example, after completing establishment of the transmission channel, a networking link management module of the first device notifies a distributed service module of the first device that the second device is connected, and triggers the distributed service module to synchronize the cellular communication function to the second device. The distributed service module of the first device sends the function synchronization information to a distributed service module of the second device. The distributed service module of the second device determines, based on content in the function synchronization information, a cellular communication function to be implemented by using the cellular capability of the first device.

After the second device receives the function synchronization information sent by the first device, the second device may determine that the second device can implement the first service function. In other words, in this case, the second device may determine that the second device has a virtual cellular capability.

S103: The second device sets a first icon corresponding to the first service function from an unavailable state to an available state.

In this embodiment of this application, a component corresponding to each cellular communication function, for example, a phone component corresponding to a call function or an SMS message component corresponding to an SMS message function, is preset in the second device. When the second device does not have the cellular capability, an icon corresponding to each cellular communication function is set to an unavailable state.

The unavailable state is a hidden state or a grayed-out display state, and the available state is a normal display state. The hidden state is a non-display state, and the grayed-out display state is a state in which an icon is displayed by using a gray shade. In the grayed-out display state, the second device does not respond to an operation (for example, a tap operation, a drag operation, or a touch and hold operation of a user) on the first icon. In other words, in the hidden state or the grayed-out display state, the user cannot operate the first icon, that is, the first icon is unavailable.

Correspondingly, in the normal display state, the second device responds to an operation on the first icon. In other words, in the normal display state, the user can operate the first icon, that is, the first icon is unavailable.

In this embodiment of this application, the component of each cellular communication function is preset in the second device. When the second device does not have the cellular capability, the second device sets the icon corresponding to each cellular communication function to the unavailable state, so that the user cannot enable each cellular communication function on the second device. After the second device has the cellular capability (that is, can use the cellular capability of the first device), the second device may switch the corresponding icon from the unavailable state to the available state, so that the user operates the icon.

For example, after receiving the function synchronization information, the distributed service module of the second device may notify a UI of the second device to load the first icon of the first service function.

After the UI of the second device completes loading of the first icon, when the user performs an operation on the first icon on the UI of the second device, the second device may invoke a component of the first service function, and implement the first service function by using the cellular capability of the first device through the transmission channel.

In an embodiment, the cellular capability of the first device may be unavailable because the first device is in arrears. Therefore, the function synchronization information may further carry indication information indicating that the cellular capability of the first device is available or unavailable. If the distributed service module of the second device determines, based on the function synchronization information, that the cellular capability of the first device is available, the distributed service module of the second device may notify the UI to load the first icon. If the distributed service module of the second device determines, based on the function synchronization information, that the cellular capability of the first device is unavailable, the distributed service module of the second device does not need to notify the UI to load the first icon. In an example, the UI may be notified to display prompt information, for example, information indicating that the cellular capability of the first device is unavailable (for example, in arrears).

S104: The first device and the second device end cellular capability sharing.

In this embodiment of this application, the first device may end the cellular capability sharing, or the second device may end the cellular capability sharing.

The first device is used as an example. In an example, if the first device is set to be steady on, when the first device turns off a screen (that is, the user triggers the screen to turn off), it indicates that the first device is temporarily not used, and then the first device may end the cellular capability sharing.

In another example, if the first device detects that the first device and the second device are outside a preset range (for example, out of a preset range, or not in a same Wi-Fi local area network), the first device may end the cellular capability sharing.

In another example, if the first device is not set to be steady on, when a screen of the first device is continuously off for a preset period of time (for example, 5 minutes or 10 minutes), the first device may end the cellular capability sharing.

In another example, when the first device shares the cellular capability with the second device, the first device may display, in a notification center of a leftmost screen and/or a drop-down menu, a banner indicating that the cellular capability is being shared. The user may disable a cellular sharing function by using the banner, so that the first device ends the cellular capability sharing.

For example, as shown in FIG. 4(*a*), when the first device shares the cellular capability, the notification center of the first device displays the banner indicating that the cellular capability is being shared, and an Off button is disposed on the banner. The user accesses a control center through the drop-down menu and taps the Off button on the banner. After detecting the user operation, the first device ends the cellular capability sharing.

Alternatively, as shown in FIG. 4(*b*)-1 and FIG. 4(*b*)-2, after detecting that the user taps the banner, the first device enters a setting interface, and a "Cellular sharing" column is displayed on the setting interface. On the setting interface, if the first device detects that a switch corresponding to the "Cellular sharing" column is turned off by the user, the first device ends the cellular capability sharing.

Alternatively, as shown in FIG. 4(*c*)-1 and FIG. 4(*c*)-2, the banner indicating that the cellular capability is being shared is displayed on the leftmost screen of the first device. When detecting that the user taps the banner, the first device enters the setting interface. If the first device detects that the switch corresponding to the "Cellular sharing" column is turned off by the user, the first device ends the cellular capability sharing.

After determining that the cellular capability sharing may end, the first device notifies the networking connection management module to initiate a link disconnection operation. The networking connection module of the first device initiates a link disconnection operation to a networking connection module of the second device, and deletes the transmission channel between the first device and the second device, to end the cellular capability sharing.

It may be understood that, a manner of ending the cellular capability sharing by the second device is the same as a manner of ending the cellular capability sharing by the first device. Details are not described herein again.

S105: The second device sets the first icon from the available state to the unavailable state.

Based on the method for sharing a cellular capability provided in this application, the second device may dynamically load an icon in a process of sharing the cellular capability. After the cellular capability sharing between the first device and the second device ends, because the second device sets the first icon to the unavailable state, the first icon is unavailable. Therefore, the user cannot operate the first service function on the second device. In this way, it is ensured to an extent that the user cannot view, on the second device, record information corresponding to the first service function, and information security and privacy are protected.

The following uses an example in which the first service function includes the call function and the SMS message function, and describes the method procedure shown in FIG. 3 with reference to schematic diagrams of icon loading scenarios shown in FIG. 5(*a*)-1 to FIG. 8(*c*)-3.

In an example, a component corresponding to each cellular communication function is preset in the second device, and when the second device does not have the cellular capability, an icon corresponding to each cellular communication function is hidden. In other words, before the first device shares the first service function with the second device, the second device does not display the first icon (including a phone icon and an SMS message icon) corresponding to the first service function. When the first device establishes a communication connection to the second device and prepares to share the cellular capability, the second device normally displays the phone icon and the SMS message icon (namely, an icon corresponding to "Messages" in the accompanying drawings).

When the first icon is set from the hidden state to the normal display state, the second device may load the first icon on a desktop. For example, as shown in FIG. 5(*a*)-1 to FIG. 5(*a*)-3, the second device loads the first icon on a desktop of a first page or loads the first icon on a desktop of a last page. Alternatively, as shown in FIG. 5(*b*)-1 to FIG. 5(*b*)-3, the second device may load the first icon in a dock area. The dock area refers to an area that does not change with switching between a plurality of desktops.

When the cellular capability sharing between the first device and the second device ends, the second device hides the first icon again.

It should be noted that an address book (or may also be referred to as contacts) component is built in the second device. The second device may be configured to dynamically load an address book icon. For example, before the first device shares the first service function with the second device, the second device does not display the address book icon. After the first device establishes the communication connection to the second device, if the first device shares, with the second device, the cellular communication function (for example, the call function and the SMS message function) related to the address book, the second device normally displays the address book icon.

For example, after the first device establishes the communication connection to the second device, as shown in FIG. 6(*a*)-1 to FIG. 6(*a*)-3, the second device displays the phone icon, the SMS message icon, and the address book icon on the desktop. Alternatively, as shown in FIG. 6(*b*)-1 to FIG. 6(*b*)-3, the second device displays the phone icon, the SMS message icon, and the address book icon in the dock area.

When the cellular capability sharing between the first device and the second device ends, the second device hides the phone icon, the SMS message icon, and the address book icon again.

Alternatively, the second device may be configured to always normally display the address book icon. In other words, the address book icon is not hidden when the phone icon or the SMS message icon is hidden.

In an example, when the second device is configured to normally display the address book icon, the address book may store contact information, or may not store contact information. As shown in FIG. 6(*c*)-1 to FIG. 6(*c*)-3, if the address book stores contact information, before the first device shares the first service function with the second device, the second device hides the phone icon and the SMS message icon on the desktop or in the dock area, and also hides the phone icon and the SMS message icon on a corresponding contact interface.

After the first device establishes the communication connection to the second device, the second device normally displays the icon and the SMS message icon on the desktop or in the dock area, and also normally displays the phone icon and the SMS message icon on the corresponding contact interface.

Correspondingly, when the cellular capability sharing between the first device and the second device ends, the second device hides again the phone icon and the SMS message icon that are displayed on the desktop and the contact interface, or in the dock area and on the contact interface.

In another example, when the second device does not have the cellular capability, an icon corresponding to each cellular communication function is displayed in the grayed-out display state. As shown in FIG. 7(*a*)-1 to FIG. 7(*a*)-3, both the phone icon and the SMS message icon are displayed on the desktop in the grayed-out display state. Alternatively, as shown in FIG. 7(*b*)-1 to FIG. 7(*b*)-3, both the phone icon and the SMS message icon are displayed in the dock area in the grayed-out display state.

After the first device establishes the communication connection to the second device, the second device sets the phone icon and the SMS message icon from the grayed-out display state to the normal display state. When the cellular capability sharing between the first device and the second device ends, the second device sets the phone icon and the SMS message icon to the grayed-out display state again.

Correspondingly, when an address book component is built in the second device, if the second device is configured to dynamically load the address book icon, the second device displays the address book icon in the grayed-out display state before the first device shares the first service function with the second device. After the first device establishes the communication connection to the second device, if the first device shares, with the second device, the cellular communication function related to the address book, the second device normally displays the address book icon.

For example, after the first device establishes the communication connection to the second device, as shown in FIG. 8(*a*)-1 to FIG. 8(*a*)-3, the phone icon, the SMS message icon, and the address book icon that are displayed by the second device on the desktop are set from the grayed-out display state to the normal display state. Alternatively, as shown in FIG. 8(*b*)-1 to FIG. 8(*b*)-3, the phone icon, the SMS message icon, and the address book icon that are displayed by the second device in the dock area are set from the grayed-out display state to the normal display state.

When the cellular capability sharing between the first device and the second device ends, the second device sets the phone icon, the SMS message icon, and the address book icon from the normal display state to the grayed-out display state again.

If the second device is configured to always normally display the address book icon, a display status of the address book icon does not change as a display status of the phone icon or the SMS message icon changes.

In an example, when the second device is configured to always normally display the address book icon, the address book may store the contact information. As shown in FIG. 8(*c*)-1 to FIG. 8(*c*)-3, if the address book stores the contact information, before the first device shares the first service function with the second device, the second device sets the phone icon and the SMS message icon that are displayed on the desktop or in the dock area to the grayed-out display state, and also sets the phone icon and the SMS message icon to the grayed-out display state on the corresponding contact interface.

After the first device establishes the communication connection to the second device, the second device sets the phone icon and the SMS message icon from the grayed-out display state to the normal display state on the desktop or in the dock area, and also sets the phone icon and the SMS message icon from the grayed-out display state to the normal display state on the corresponding contact interface.

Correspondingly, when the cellular capability sharing between the first device and the second device ends, the second device sets again the phone icon and the SMS message icon that are displayed on the desktop and the contact interface, or in the dock area and on the contact interface from the normal display state to the grayed-out display state.

It may be understood that, after the cellular capability sharing between the first device and the second device ends, because the second device hides the first icon or displays the first icon in the grayed-out display state, the first icon is unavailable. Therefore, the user cannot operate the first service function on the second device. In this way, it is ensured to an extent that the user cannot view, on the second device, record information corresponding to the first service function, and information security and privacy are protected.

It should be noted that, to make the cellular communication function shared by the first device to the second device more intuitive to the user, icons of each cellular communication function displayed on the second device and the first device may be unified, to improve user experience.

Figure 9:
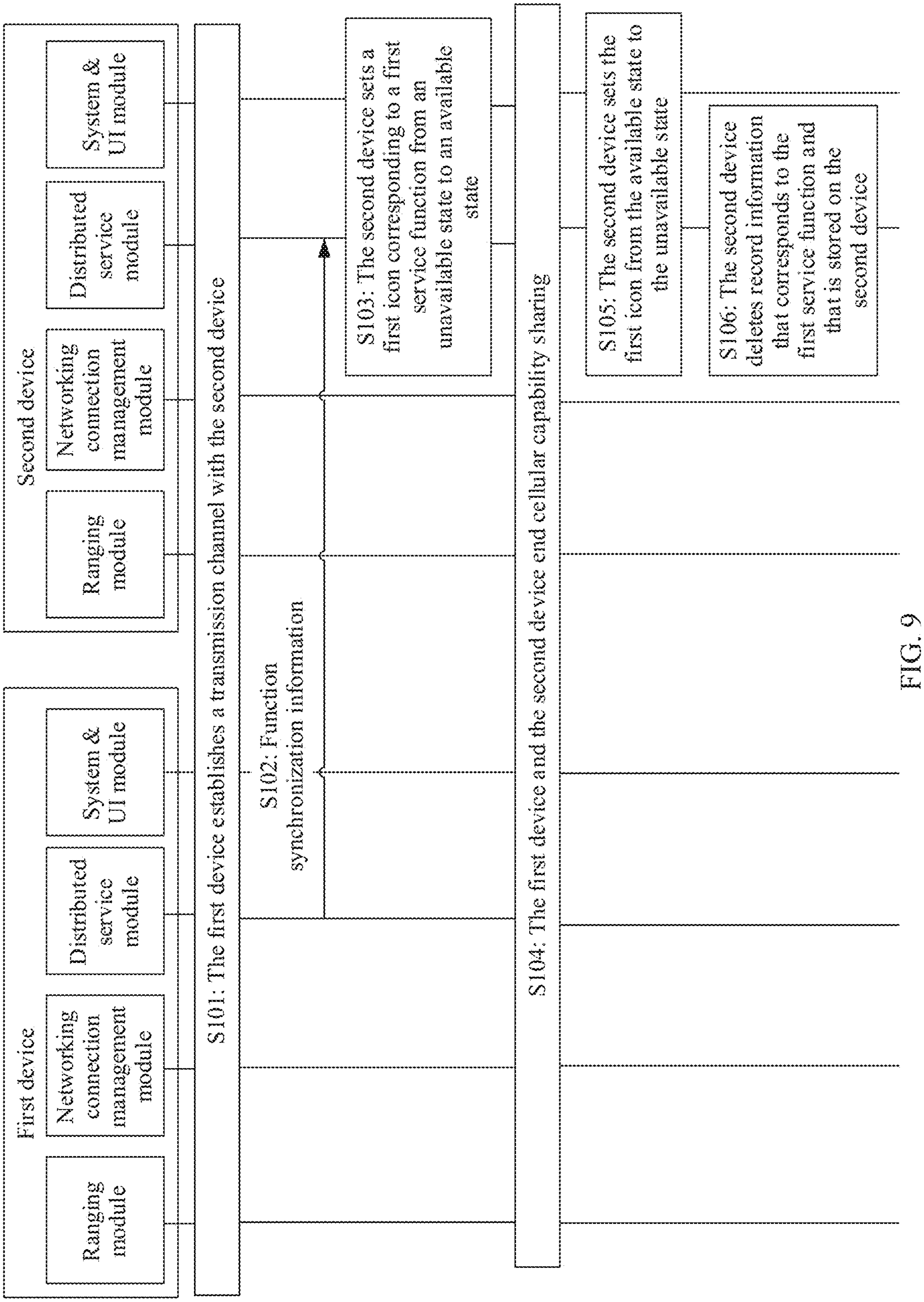
FIG. 9 is a flowchart 2 of an embodiment of a method for sharing a cellular capability according to an embodiment of this application.

In a scenario, a plurality of first devices may share cellular capabilities with a same second device. For example, each family member has a mobile phone and also uses a same tablet computer. Therefore, to further ensure information privacy on each first device, based on FIG. 3, as shown in FIG. 9, after S104, the method further includes the following step.

S106: The second device deletes record information that corresponds to the first service function and that is stored on the second device.

For example, a call record and an SMS message record. The record information may include record information generated in a cellular capability sharing process.

For example, the second device may delete the record information based on an indication of the first device. For example, the first device may carry indication information in the function synchronization information sent to the second device, to indicate the second device to delete the indicated record information when the sharing ends. Certainly, after determining that the cellular capability sharing ends, the first device may separately send the indication information to the second device, to indicate the second device to delete the record information. Alternatively, the second device is configured to delete, when the cellular capability sharing ends, data generated in the current cellular capability sharing process.

Figure 10:
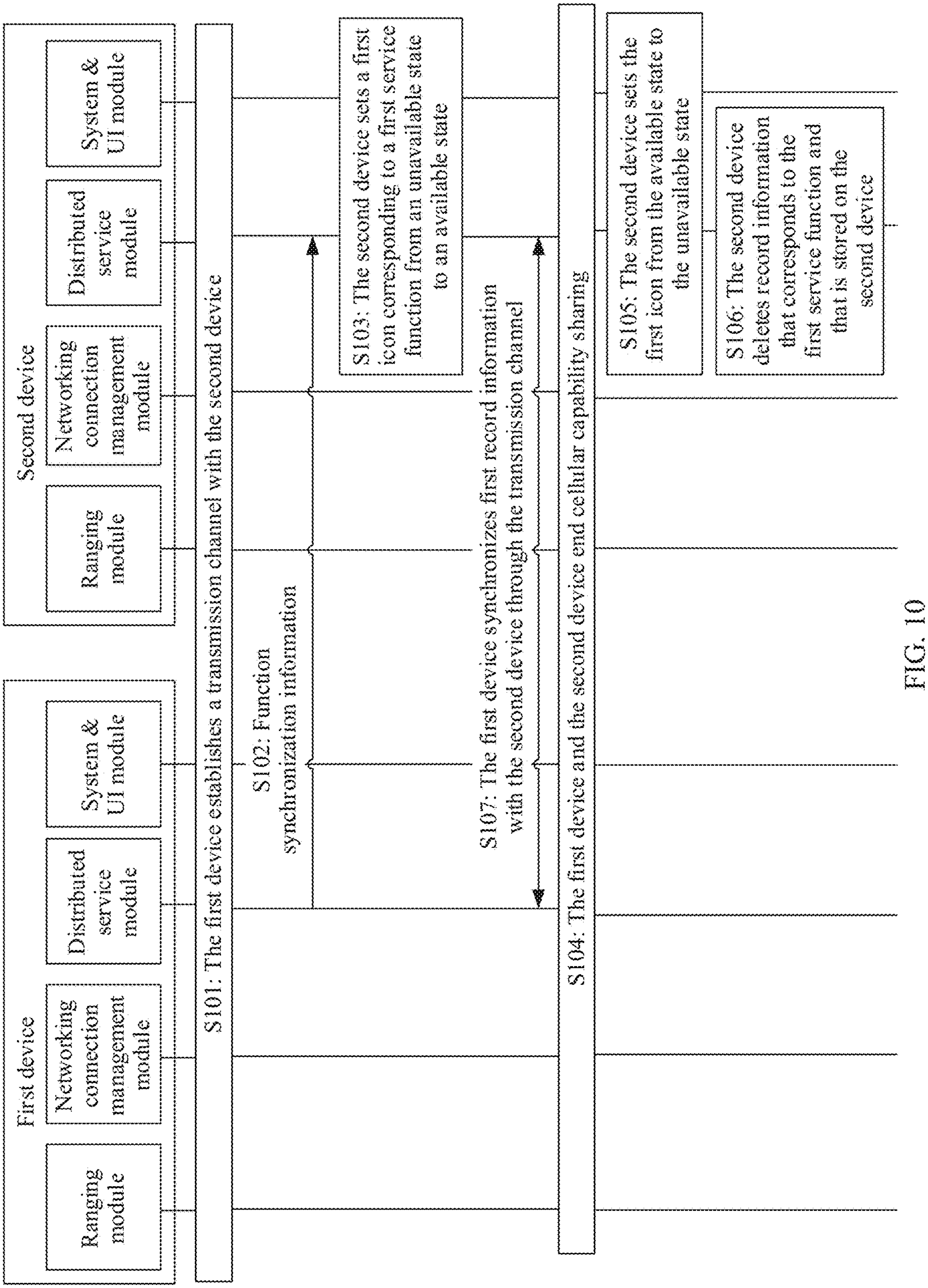
FIG. 10 is a flowchart 3 of an embodiment of a method for sharing a cellular capability according to an embodiment of this application.

Optionally, to facilitate the user to perform the first service function by using the second device, the first device may further synchronize first record information with the second device. For example, based on FIG. 9, as shown in FIG. 10, after S102, the method further includes the following step.

S107: The first device synchronizes the first record information with the second device through the transmission channel.

In this embodiment of this application, the first record information may include a usage record of the first service function on the first device and a usage record of the first service function on the second device. The usage record on the first device includes a usage record generated during the cellular capability sharing and a usage record stored before the cellular capability sharing.

For example, if the first service function includes the call function and/or the SMS message function, the first record information may include the call record and the SMS message record, and may further include address book information related to the call function and/or the SMS message function.

Synchronized address book information may include address book information on the second device and/or address book information on the first device. For example, after the first device establishes the transmission channel with the second device, the first device may send all contact information in the address book stored on the first device to the second device, or may send contact information corresponding to the call record in the address book to the second device. During the cellular capability sharing, if the user adds contact information to the address book of the second device, the second device may send the added contact information to the first device, and the first device stores the contact information in the address book of the first device.

It should be noted that, if the first device synchronizes the address book information to the second device, when the first device and the second device end the cellular capability sharing, the second device may also delete the address book synchronized from the first device, to protect privacy and security of the address book of the first device.

It may be understood that, in this manner, in one aspect, the user may quickly view and use the first record information on the second device, to improve operation efficiency. In another aspect, the first device may also update a complete usage record in real time, so that the user can subsequently view the complete usage record on the first device after the cellular capability sharing ends.

In an application scenario, currently, when the first device shares the cellular capability with the second device, the devices are connected by using Bluetooth, Wi-Fi, a dedicated chip, or the like. Therefore, the second device usually cannot sense a cellular status of the first device, for example, a standard of a primary banner and/or a secondary banner of the first device, strength of a cellular signal, and a cellular status whether a Voice over Long-Term Evolution (Voice over Long-Term Evolution, VoLTE) HD call is enabled. In one aspect, when the second device cannot successfully perform the cellular communication function, the user may not be able to determine whether a connection between the first device and the second device is faulty or cellular signal quality of the first device is faulty. In another aspect, if some applications that need to run in a secure environment (that is, a cellular data traffic environment) are installed on the second device, these applications cannot be started because the second device does not have a cellular capability.

Figure 11:
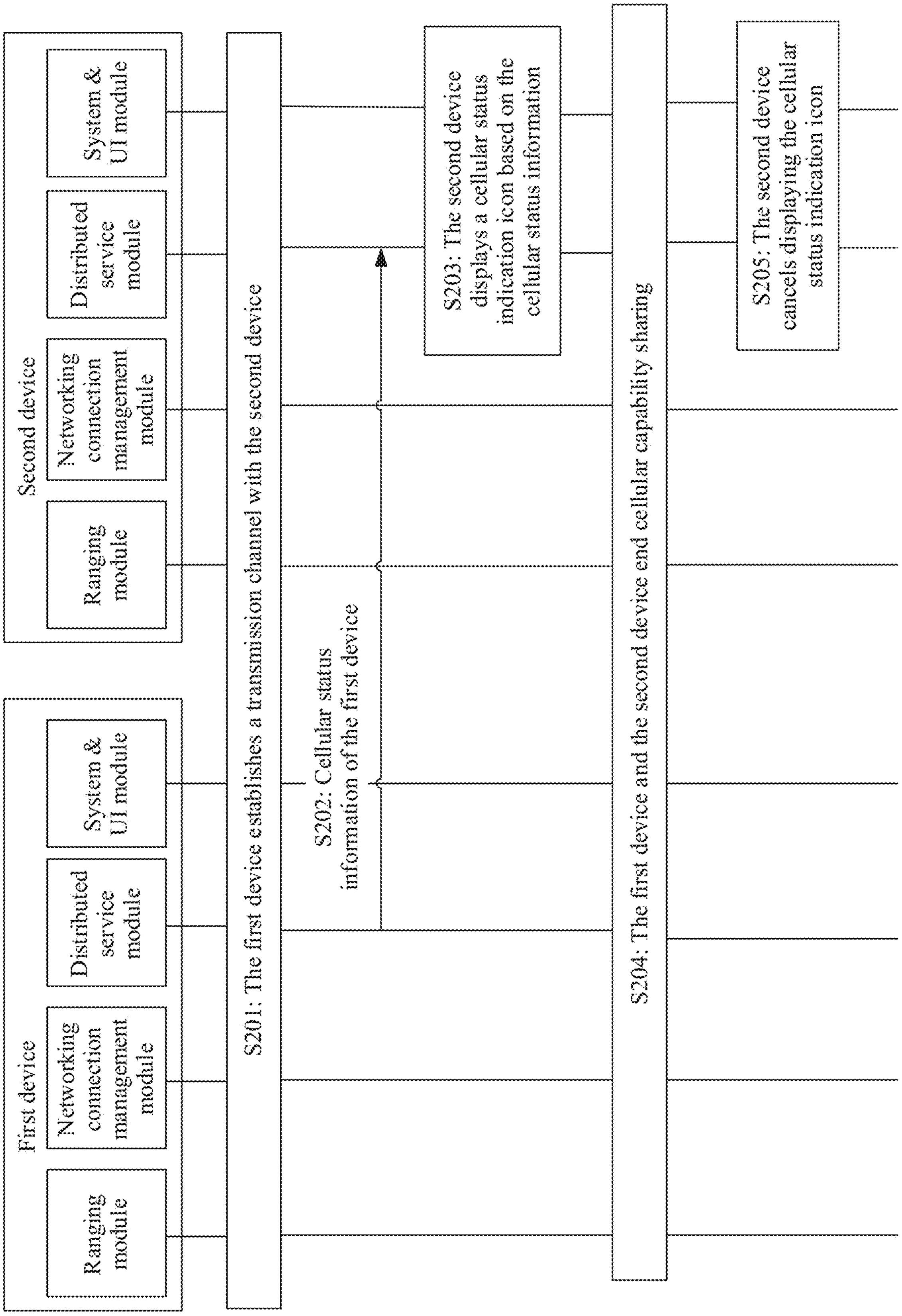
FIG. 11 is a flowchart 4 of an embodiment of a method for sharing a cellular capability according to an embodiment of this application.

In this case, in another embodiment of a method for sharing a cellular capability provided in this application, a first device sends cellular status indication information to a second device, so that the second device can sense a cellular status of the first device. For example, as shown in FIG. 11, the method includes the following steps.

S201: The first device establishes a transmission channel with the second device.

For example, for a specific implementation process of S201, refer to the description in S101. Details are not described herein again.

S202: The first device sends cellular status information of the first device to the second device.

S203: The second device displays a cellular status indication icon based on the cellular status information.

A distributed service module of the first device sends the cellular status information to an RIL interface of the second device through an RIL interface of the first device. The cellular status information is a signal RIL command. After parsing the cellular status information, a distributed service module of the second device notifies a UI of the second device to display the corresponding cellular status indication icon.

S204: The first device and the second device end cellular capability sharing.

S205: The second device cancels displaying the cellular status indication icon.

Figure 12A:
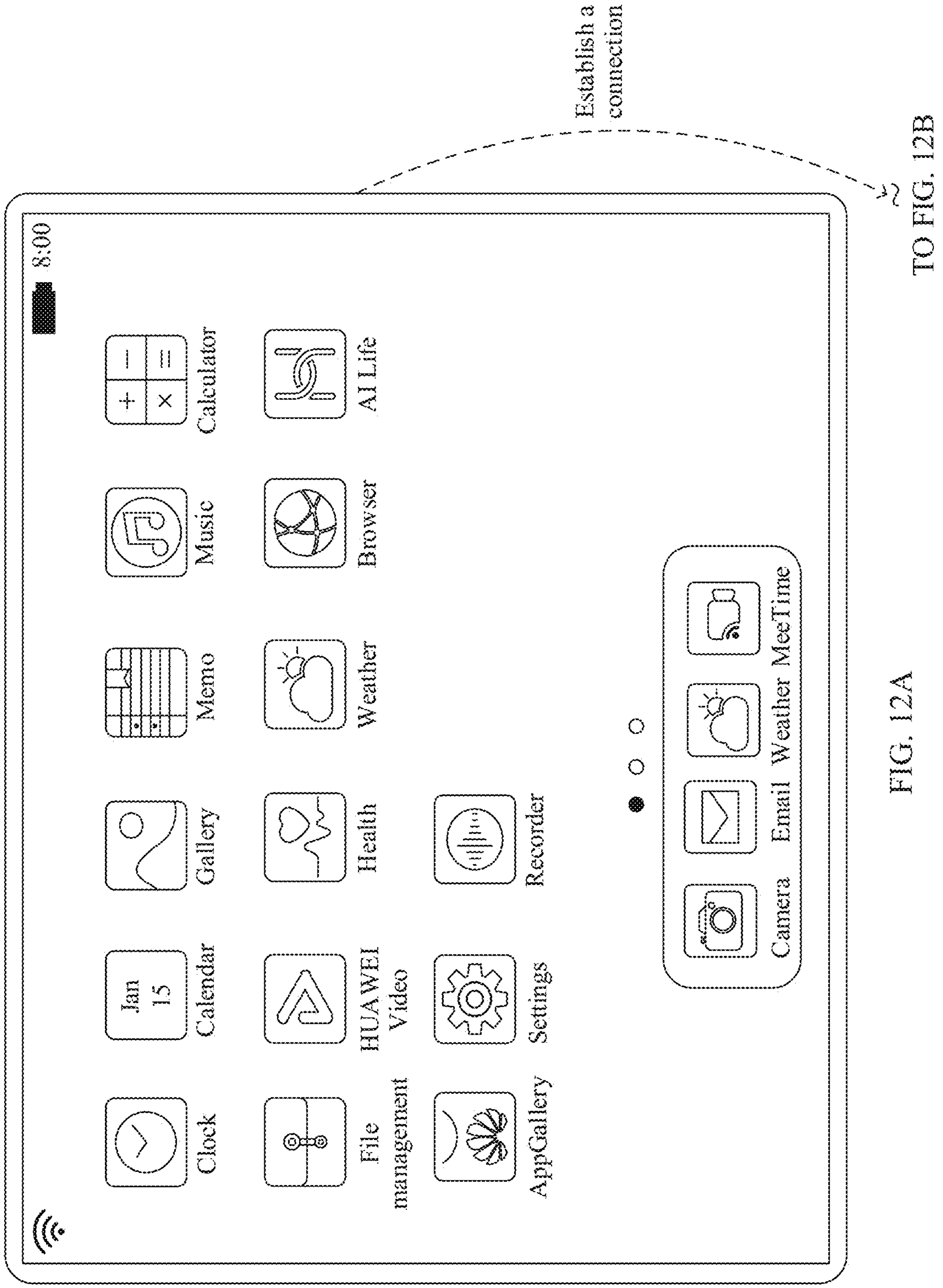
FIG. 12A to FIG. 12C are a schematic diagram of a scenario in which a cellular status indication icon is displayed according to an embodiment of this application.
Figure 12B:
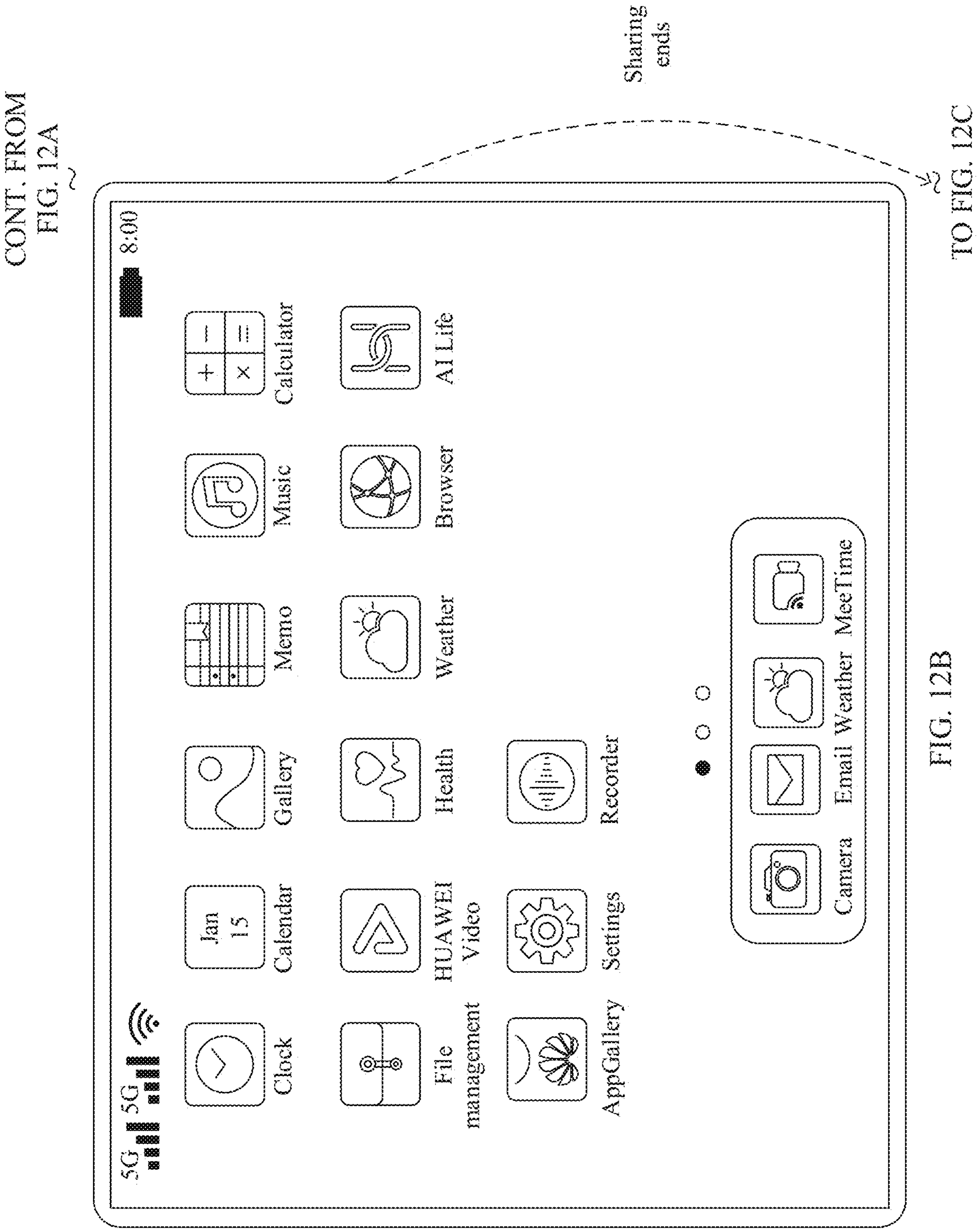
Figure 12C:
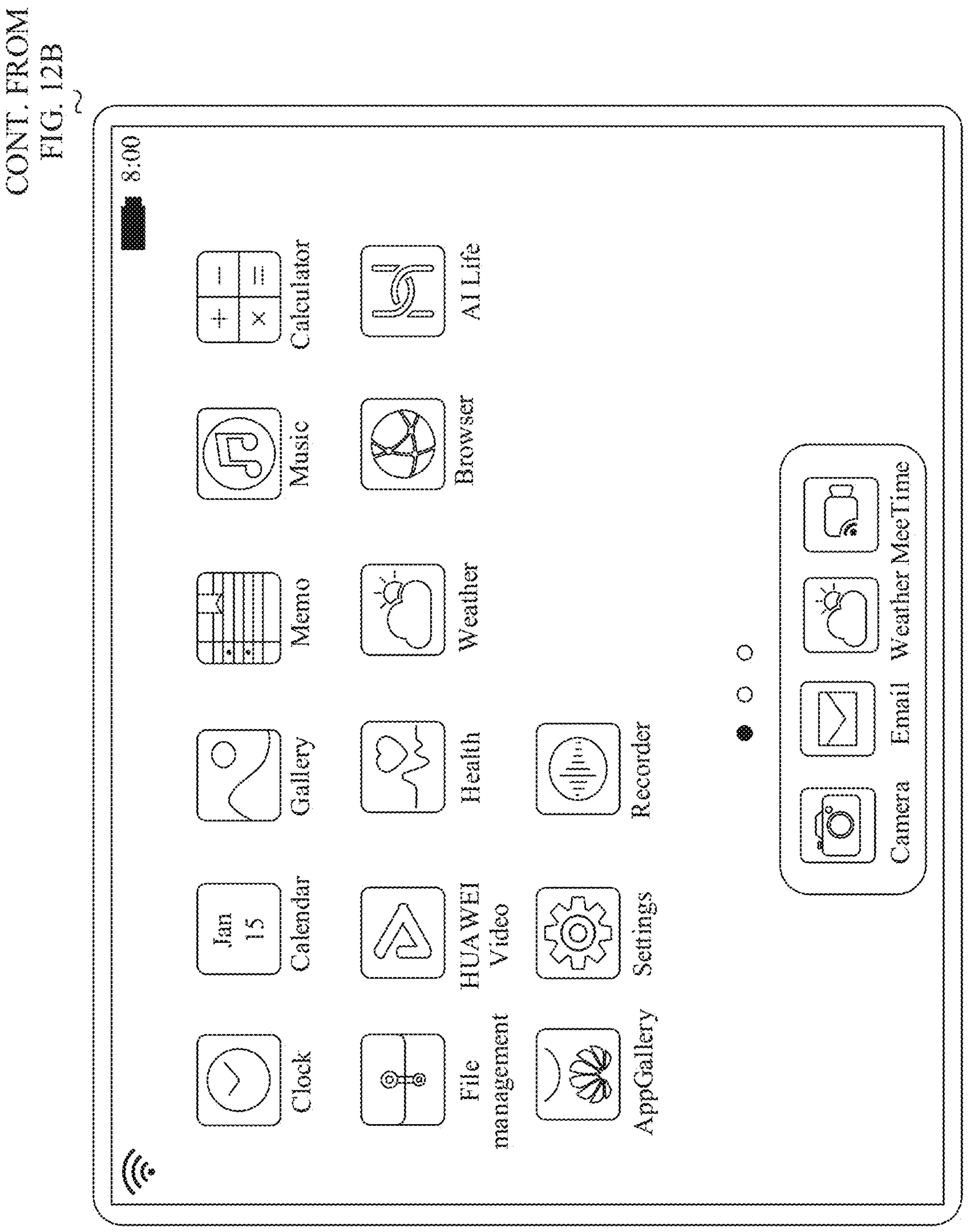

For example, as shown in FIG. 12A to FIG. 12C, after the first device establishes the transmission channel with the second device, the first device notifies, by using the cellular status information, the second device that both a primary banner and a secondary banner of the first device are in a 5G communication standard, and signal strength is full-bar. The second device displays the corresponding cellular status indication icon. When the cellular capability sharing between the first device and the second device ends, the second device cancels displaying the cellular status indication icon.

It may be understood that, in this embodiment, the first device sends the cellular status indication information to the second device, so that the second device can sense the cellular status of the first device, and display the cellular status indication icon based on the cellular status of the first device. Therefore, a user may intuitively learn the cellular status of the first device from the second device. If an application that needs to run in a secure environment is installed on the second device, the second device may provide a secure running environment for the application based on the cellular status of the first device, so that the application can be started to run.

It should be noted that the embodiments shown in FIG. 3, FIG. 9, FIG. 10, and FIG. 11 may be implemented in combination, or may be implemented independently. For example, based on the embodiments shown in FIG. 10 and FIG. 11, a completion procedure of the method for sharing a cellular capability provided in this application may be shown in FIG. 13A and FIG. 13B. The method includes the following steps.

S301: The first device establishes the transmission channel with the second device.

S302: The first device sends the function synchronization information to the second device through the transmission channel, where the function synchronization information is used to synchronize, to the second device, the first service function that is allowed to be shared in the cellular communication function.

S303: The second device sets the first icon corresponding to the first service function from the unavailable state to the available state.

S304: The first device synchronizes the first record information with the second device through the transmission channel.

S305: The first device sends the cellular status information of the first device to the second device.

S306: The second device displays the cellular status indication icon based on the cellular status information.

S307: The second device executes the first service function based on the cellular capability of the first device.

S308: The first device and the second device end the cellular capability sharing.

S309: The second device sets the first icon from the available state to the unavailable state.

S310: The second device deletes the record information that corresponds to the first service function and that is stored on the second device.

S311: The second device cancels displaying the cellular status indication icon.

Figure 13A:
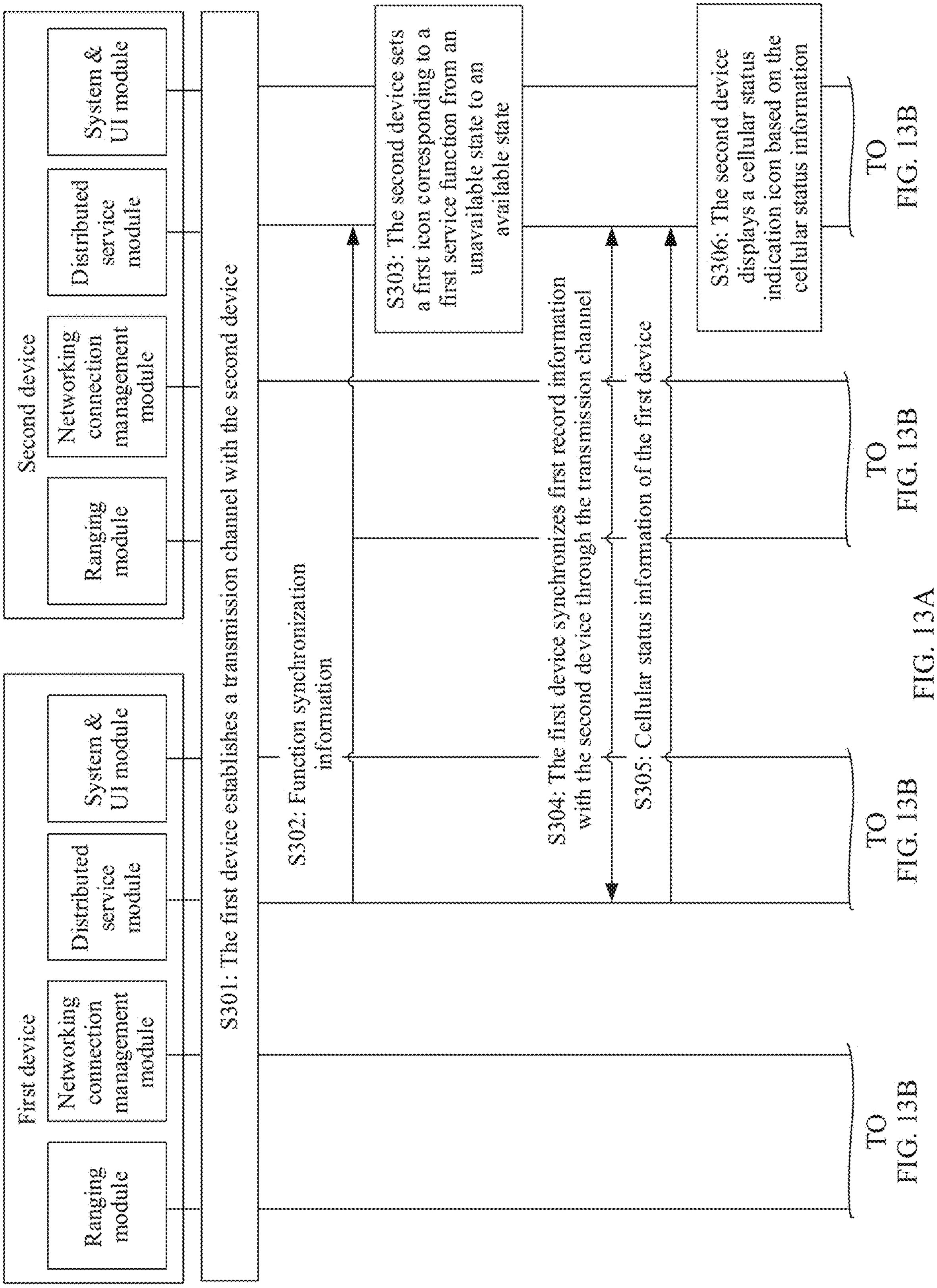
FIG. 13A and FIG. 13B are a flowchart 5 of an embodiment of a method for sharing a cellular capability according to an embodiment of this application.
Figure 13B:
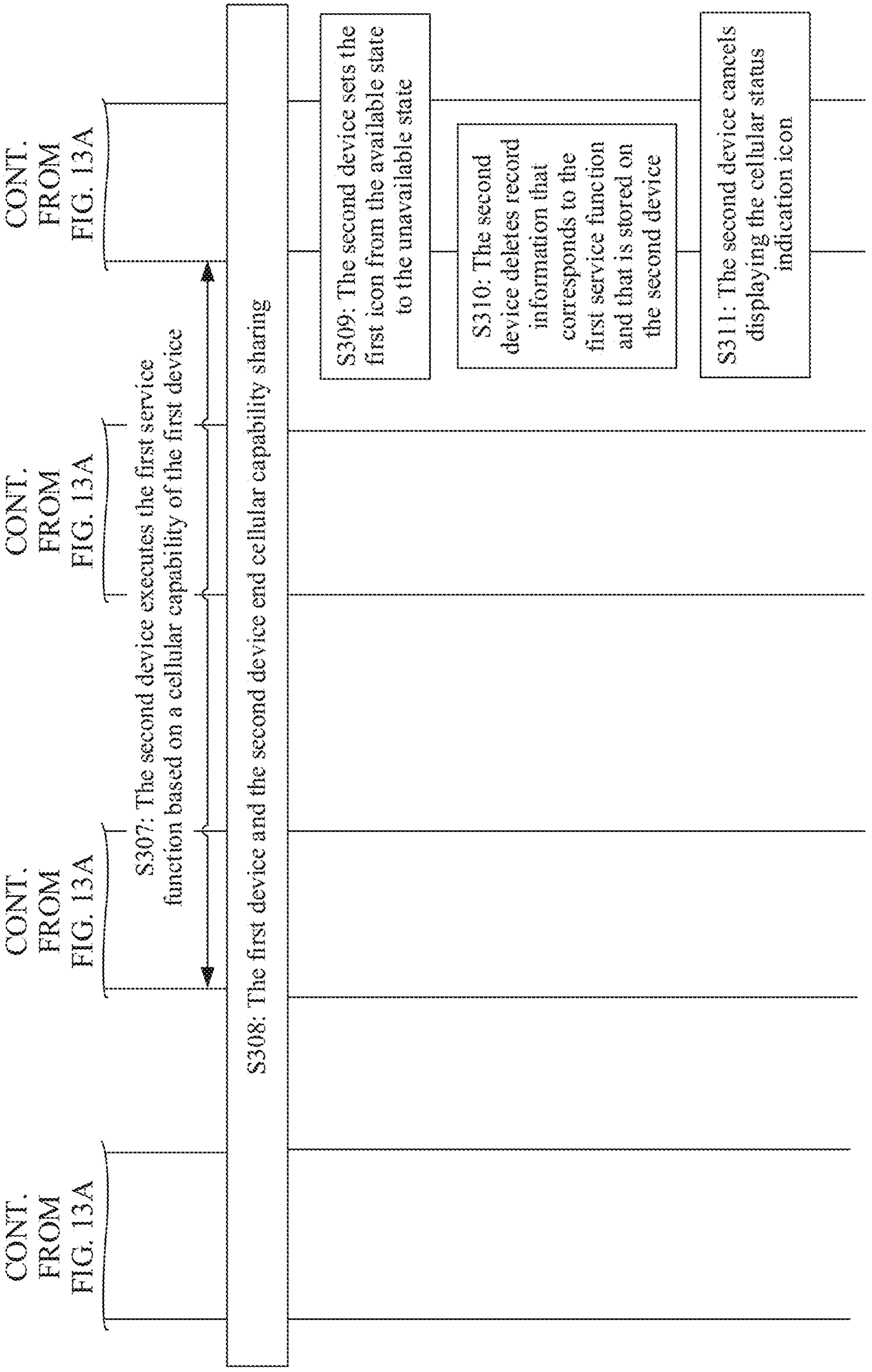
Figure 14A:
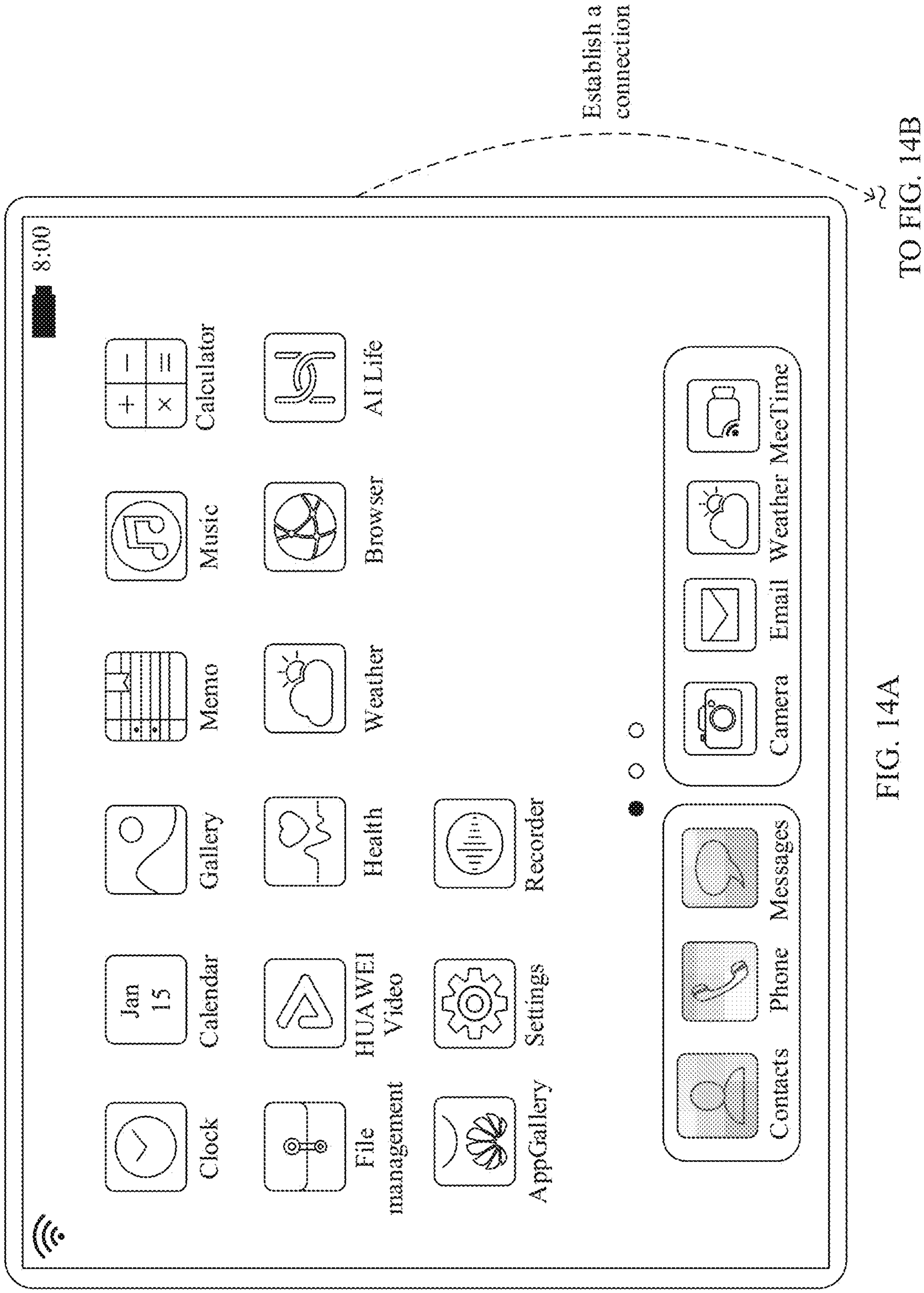
FIG. 14A to FIG. 14C are a schematic diagram of a cellular capability sharing scenario according to an embodiment of this application.
Figure 14B:
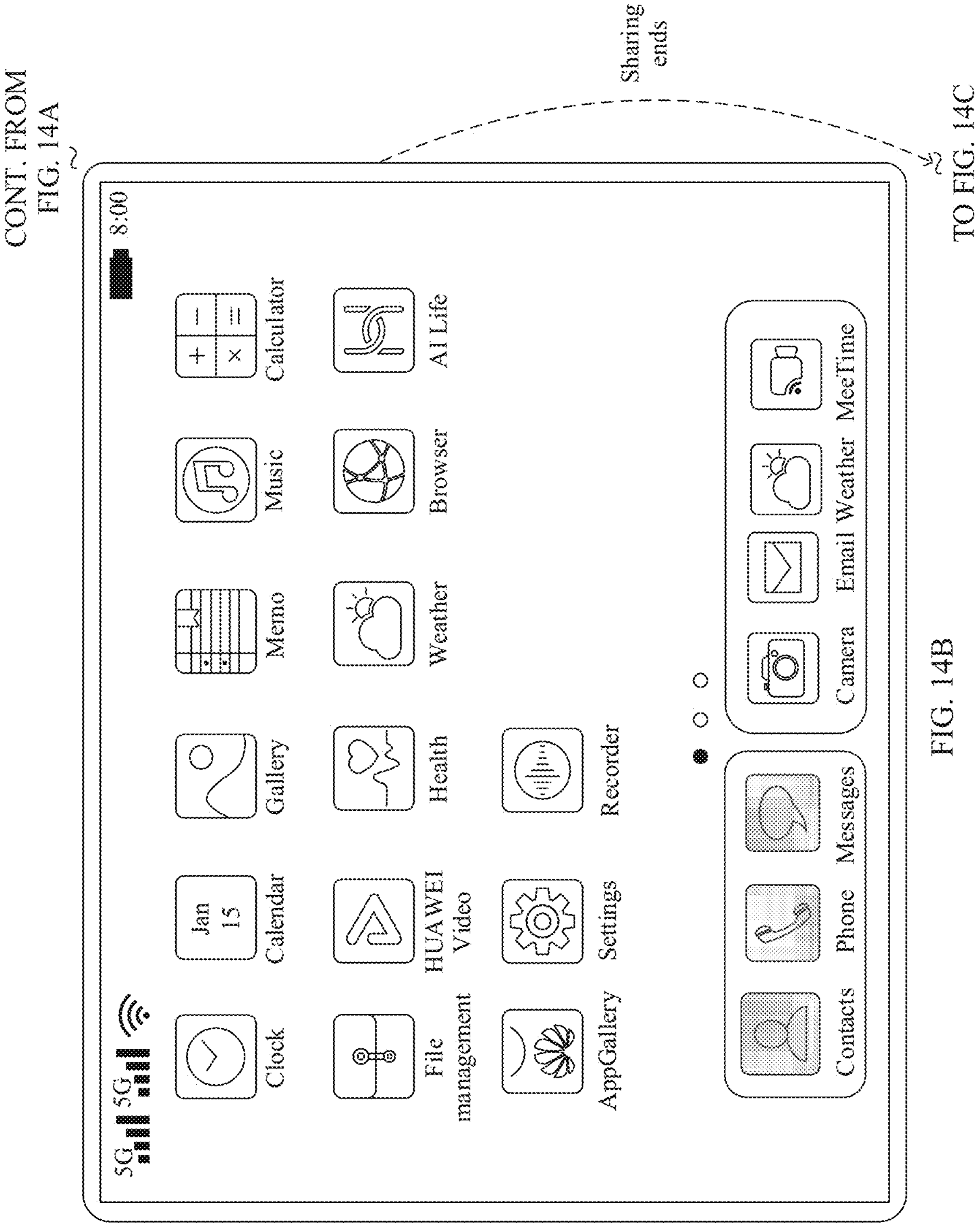
Figure 14C:
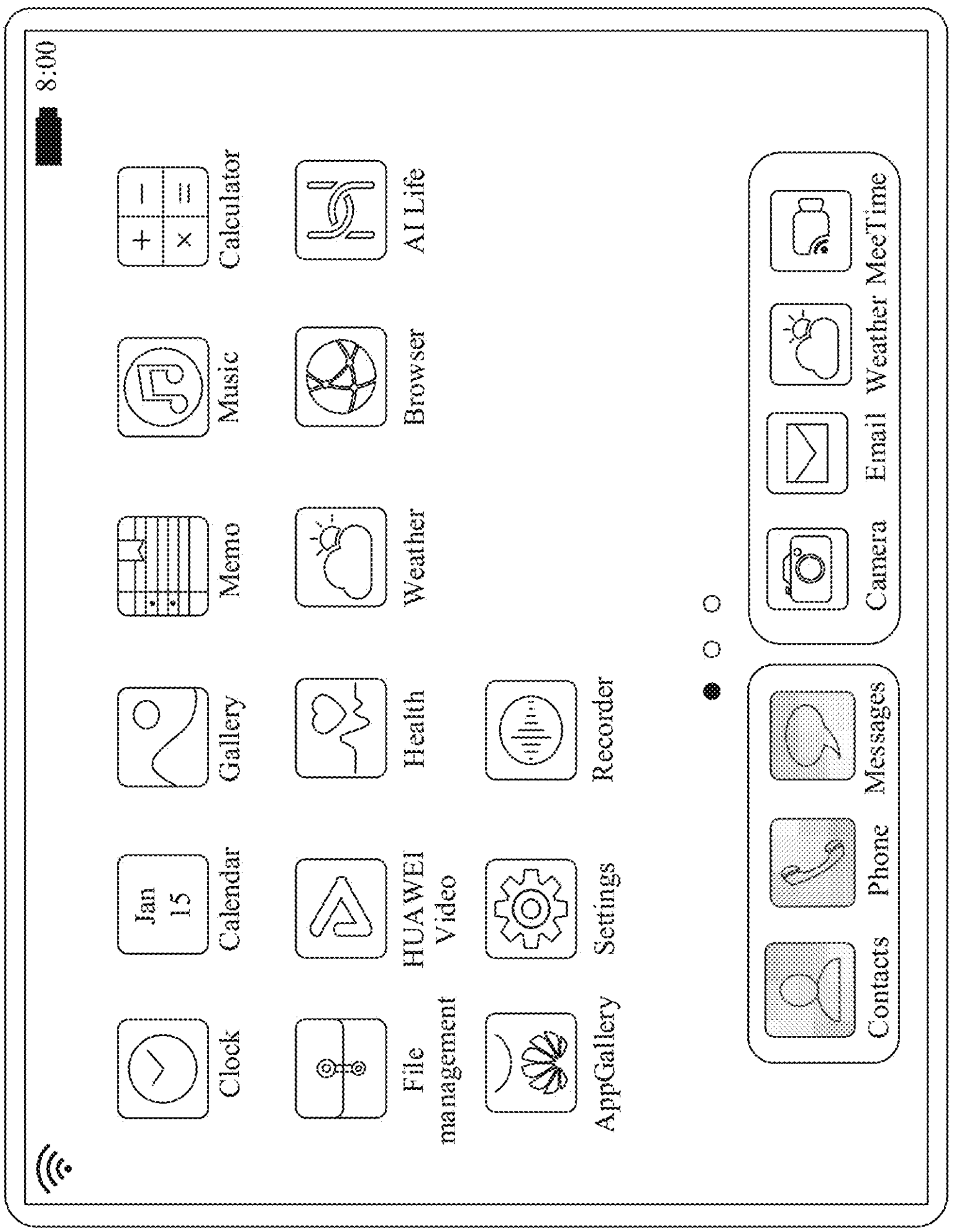

Based on the flowchart shown in FIG. 13A and FIG. 13B, an example in which the second device hides the icon corresponding to each cellular communication function when the second device does not have the cellular capability is used for scenario example description. As shown in FIG. 14A to FIG. 14C, before the first device shares the cellular communication function with the second device, the second device does not display the icon corresponding to each cellular communication function. After the first device establishes the communication connection to the second device, the first device specifies that a shared call function is allowed. The second device normally displays the phone icon and the address book icon that correspond to the call function. The first device synchronizes a stored call record and the address book to the second device. After the first device sends the cellular status information of the first device to the second device, the second device determines that the cellular status of the first device is a state in which both the primary banner and the secondary banner are in the 5G communication standard, and the signal strength is full-bar. The second device displays two 5G cellular status indication icons with full signal bars. The first device and the second device transmit a cellular data flow and a cellular signal flow through the RIL interface and the transmission channel, so that the second device makes a call by using the cellular capability of the first device.

When the cellular capability sharing between the first device and the second device needs to end, the first device and the second device perform inter-device link disconnection, and delete the transmission channel, to end the cellular capability sharing. Then, the second device deletes the address book and the call record, hides the phone icon and the address book icon, and cancels displaying the cellular status indication icon.

It can be learned from the foregoing that, in one aspect, according to the method for sharing a cellular capability provided in this application, the second device may dynamically load, based on whether the cellular capability sharing is performed, the icon corresponding to the cellular communication function, so that the icon indicates available during the cellular capability sharing, and indicates unavailable after the sharing ends. In this way, it is ensured to an extent that the user cannot view, on the second device during a non-sharing period, record information corresponding to the cellular communication function. Therefore, information security and privacy are protected.

In another aspect, according to the method for sharing a cellular capability provided in this application, the second device can completely share the cellular capability of the first device, and fully sense the cellular status of the first device, so that the user can intuitively learn the cellular status of the first device, and start and execute some applications that require a secure environment.

Optionally, to further ensure information security of the first device, the first device may be triggered to share the cellular capability with the second device by using a preset condition. In other words, when the first device and the second device meet the preset condition, the first device may establish the transmission channel with the second device, and share the cellular capability with the second device. The preset condition may be set based on a requirement of an actual application scenario.

For example, the preset condition may include a range condition. When the second device is a device that is determined by the first device and that is allowed to share a cellular capability, and the first device and the second device are within a preset range, the first device allows sharing of the cellular capability with the second device.

The device that allows sharing of the cellular capability may be a device with a same account or a device in a device list set in the first device.

The preset range may be a preset distance, for example, 1 m or 2 m; or may be in a same local area network range, for example, the first device and the second device are connected to a same Wi-Fi local area network, and are both in signal coverage of the Wi-Fi local area network.

In this embodiment of this application, the first device and the second device may trigger a cellular capability sharing procedure based on a device discovery technology. A device discovery procedure may be performed by the first device, or may be performed by the second device.

For example, the first device is used as an example. The first device may start device discovery when being powered on. For example, when detecting a power-on operation, an operating system of the first device notifies the networking connection management module to start executing the device discovery procedure, to detect whether the second device exists.

Alternatively, the first device may start device discovery when a screen is on. For example, when detecting that the first device switches from screen-off to screen-on, a user interface (user interface, UI) of the first device notifies the networking connection management module to start executing the device discovery procedure, to detect whether the second device exists.

Alternatively, the first device may start device discovery when receiving the Wi-Fi local area network. For example, when being connected to the Wi-Fi local area network, the networking connection management module starts executing the device discovery procedure to detect whether the second device exists.

Alternatively, the first device may start device discovery when detecting that a device with a same account goes online. For example, when detecting that a device with a same account (for example, with a same Huawei account with the first device) goes online, the distributed service module of the first device may notify the networking connection management module to start executing the device discovery procedure, to detect whether the second device exists.

If the first device is configured to allow sharing of the cellular capability in a same local area network, when detecting the second device connected to the same Wi-Fi local area network with the first device, the networking connection management module may perform security authentication on the second device, and after determining that the second device is an authorized device, directly initiate a device connection to the connection management module of the second device.

If the first device is configured to allow the first device to share the cellular capability with the second device when a distance between the second device and the first device is within the preset distance, the networking connection management module of the first device performs security authentication on the second device after detecting, by executing device discovery, existence of the second device, and after determining that the second device is an authorized device, notify a ranging module (for example, a Bluetooth ranging module or an ultrasonic ranging module) to send a broadcast signal to a ranging module of the second device, to measure the distance between the first device and the second device.

When the measured distance meets the preset distance, the first device initiates the device connection to the second device.

It may be understood that, a process in which the second device performs device discovery is the same as a process in which the first device performs device discovery. Details are not described herein again.

Optionally, the preset condition may alternatively be that a OneHop operation is triggered between the first device and the second device.

For example, both the first device and the second device have a near field communication (near field communication. NFC) function, and may trigger the OneHop operation. When an NFC module of the first device detects that the OneHop operation is triggered between the first device and the second device, the NFC module of the first device may notify the networking connection management module to initiate the device connection to the second device, to establish the transmission channel.

Optionally, the preset condition may alternatively be that the first device and the second device determine, in a code scanning manner, that sharing of the cellular capability is allowed.

For example, a QR code is preset on the first device. The second device may obtain authorization information of the first device by scanning the QR code, and the second device initiates the device connection to the first device based on the authorization information. The first device may determine, based on the authorization information sent by the second device, to allow sharing of the cellular capability with the second device, and perform the device connection to the second device. Alternatively, a QR code is preset on the second device. The first device may obtain device information of the second device by scanning the QR code, and determine to allow sharing of the cellular capability with the second device. The first device initiates the device connection to the second device based on the device information of the second device.

Optionally, the preset condition may alternatively be that ultra wideband (ultra wideband, UWB) communication is established between the first device and the second device. For example, both the first device and the second device have a UWB chip and have a UWB function. When the first device points to the second device, after positioning the second device based on the UWB function, the first device determines to allow sharing of the cellular capability with the second device, and initiates the device connection to the second device.

In this embodiment of this application, the first device may have a setting function, and can flexibly set a take-effect condition, a device that is allowed to share the cellular capability, a service function that is allowed to be shared, record information clearing, and the like.

Figures 1, 15A:
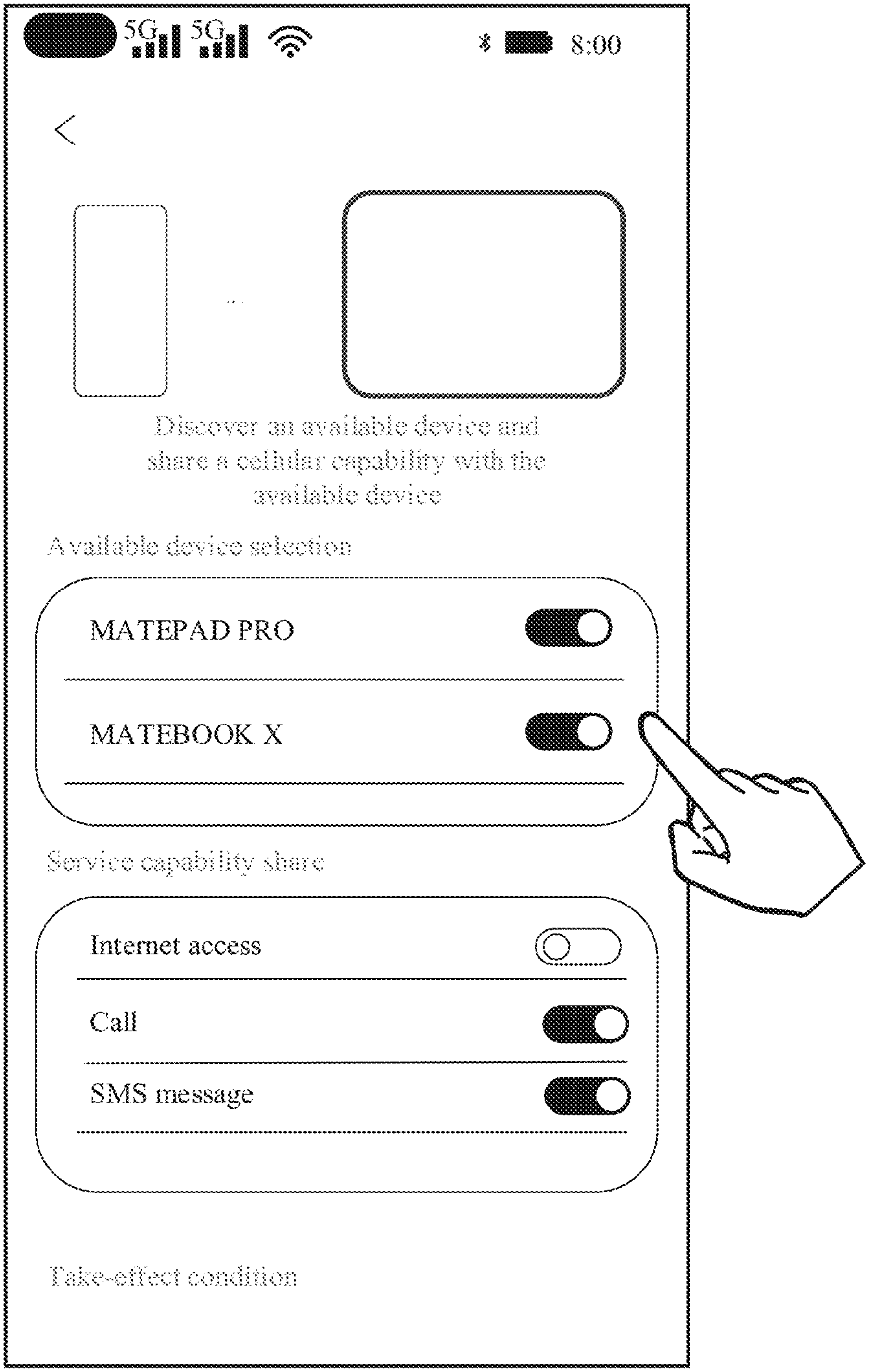
Figures 2, 15A:
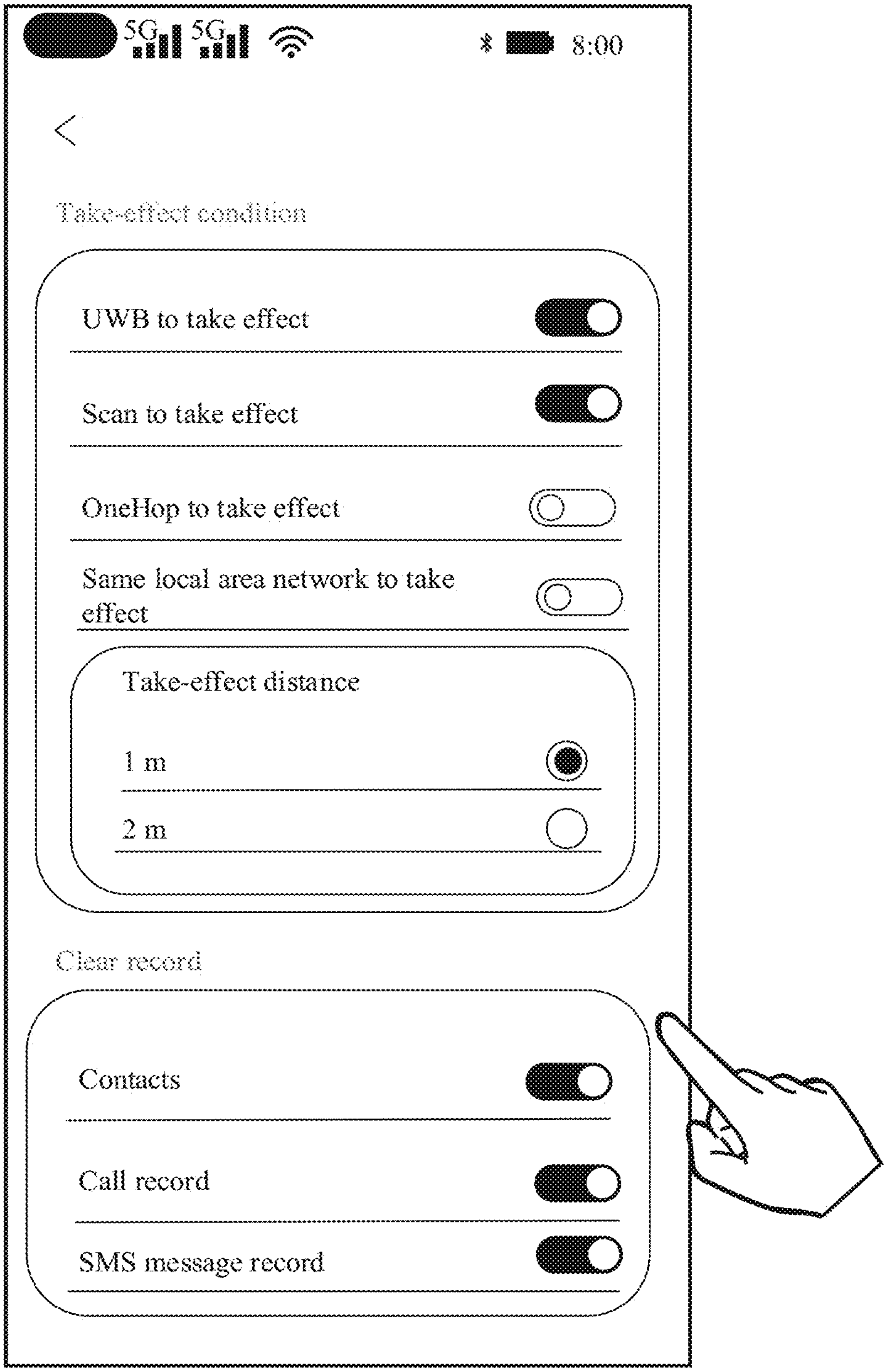
Figure 15B:
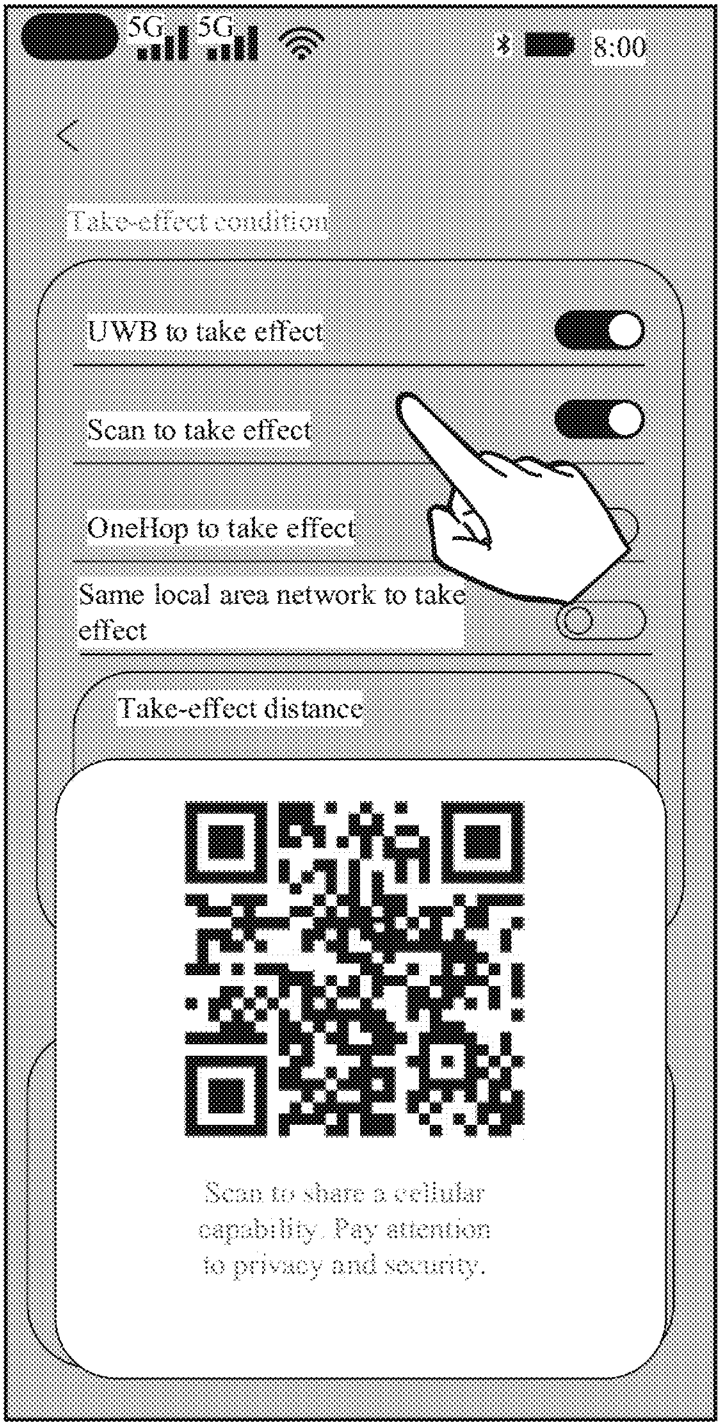
FIG. 15(*a*)-1 to FIG. 15(*b*) and FIG. 16(*a*) to FIG. 16(*b*)-2 are schematic diagrams of setting interfaces for a cellular sharing function according to an embodiment of this application.

For example, the first device provides a setting interface for a cellular sharing function. For example, based on FIG. 4(*a*), when the user taps the "Cellular sharing" column, the first device enters the setting interface for the cellular sharing function. As shown in FIG. 15(*a*)-1 and FIG. 15(*a*)-2, on the setting interface, an "Available device selection" column, a "Take-effect condition" column, a "Clear record" column, and a "Service capability share" column are provided, and these setting columns may be set on a same setting interface (for example, the two figures in FIG. 15 (*a*) show a same interface), and the user may swipe up or down to view a corresponding setting item.

In the "Available device selection" column, a device that is allowed by the first device to share the cellular capability may be set. The "Available device selection" column displays a device that can be currently detected by the first device, for example, a device that shares an account with the first device, a device that shares a Wi-Fi local area network, and/or a device that enables Bluetooth. It is assumed that the first device currently detects devices of two models: MATEPAD PRO and MATEBOOK X, the user may tap, in the "Available device selection" column, selection buttons respectively corresponding to the two devices: MATEPAD PRO and MATEBOOK X, to set a device that is allowed by the first device to share the cellular capability. As shown in FIG. 15(*a*)-1 and FIG. 15(*a*)-2, if buttons corresponding to MATEPAD PRO and MATEBOOK X are both selected, it indicates that both MATEPAD PRO and MATEBOOK X are devices that are allowed by the first device to share the cellular capability. When the first device is connected to the MATEPAD PRO or the MATEBOOK X, the first device may share the cellular capability with the MATEPAD PRO and the MATEBOOK X.

It may be understood that, if the "Available device selection" column is provided in the first device, after detecting an authorized second device, the networking connection management module of the first device may further determine whether the second device is a device that is determined by the first device and that is allowed to share the cellular capability. When the second device is the device that is allowed by the first device to share the cellular capability, the networking connection module of the first device initiates the device connection to the second device.

In the "Take-effect condition" column, a condition under which the first device is allowed to perform cellular capability sharing may be set. That is, a preset condition may be set in the "Take-effect condition" column. For example, as shown in FIG. 15(*a*)-1 and FIG. 15(*a*)-2, a "UWB to take effect" button, a "Same local area network to take effect" button, a "Scan to take effect" button, a "OneHop to take effect" button, and a "take-effect distance" selection box are provided in the "Take-effect condition" column.

The "Take-effect distance" selection box provides a plurality of distance buttons, such as a "1 m" button and a "2 m" button. In the "Take-effect distance" selection box, when the user taps to turn on any distance button, the remaining distance buttons are automatically turned off. For example, when the user taps to turn on the "1 m" button, if the "2 m" button is originally in an On state, the button automatically switches to an Off state. After the user taps to turn on the "1 m" button, the first device may share the cellular capability with the second device when detecting the second device whose distance from the first device is less than 1 m.

For "Scan to take effect", a QR code including the authorization information may be provided in the first device. As shown in FIG. 15(*b*), when the user taps the "Scan to take effect" column, the first device may display a QR code, so that the second device scans the QR code.

The use may select one or more take-effect conditions for a cellular capability sharing function. For example, when the user turns on the "UWB to take effect" button, the "Same local area network to take effect" button, the "Scan to take effect" button, the "OneHop to take effect" button, and the "1 m" button, when the first device detects a second device that meets any one of the conditions, the first device may share the cellular capability with the second device.

The "Service capability share" column may provide a cellular communication function that is allowed to be shared by the first device, for example, a call function, an SMS message function, or an Internet access function. The user may tap a selection button corresponding to each cellular communication function, to set sharing permissions of cellular communication functions to be opened.

The "Clear record" column may set record information that needs to be deleted by the second device when the cellular capability sharing ends. For example, when an "Address book" button is turned on, it indicates that the second device needs to delete the address book stored on the second device when the sharing ends. When an "SMS message record" button is turned on, it indicates that the second device needs to delete the SMS message record stored on the second device when the sharing ends.

Figure 16A:
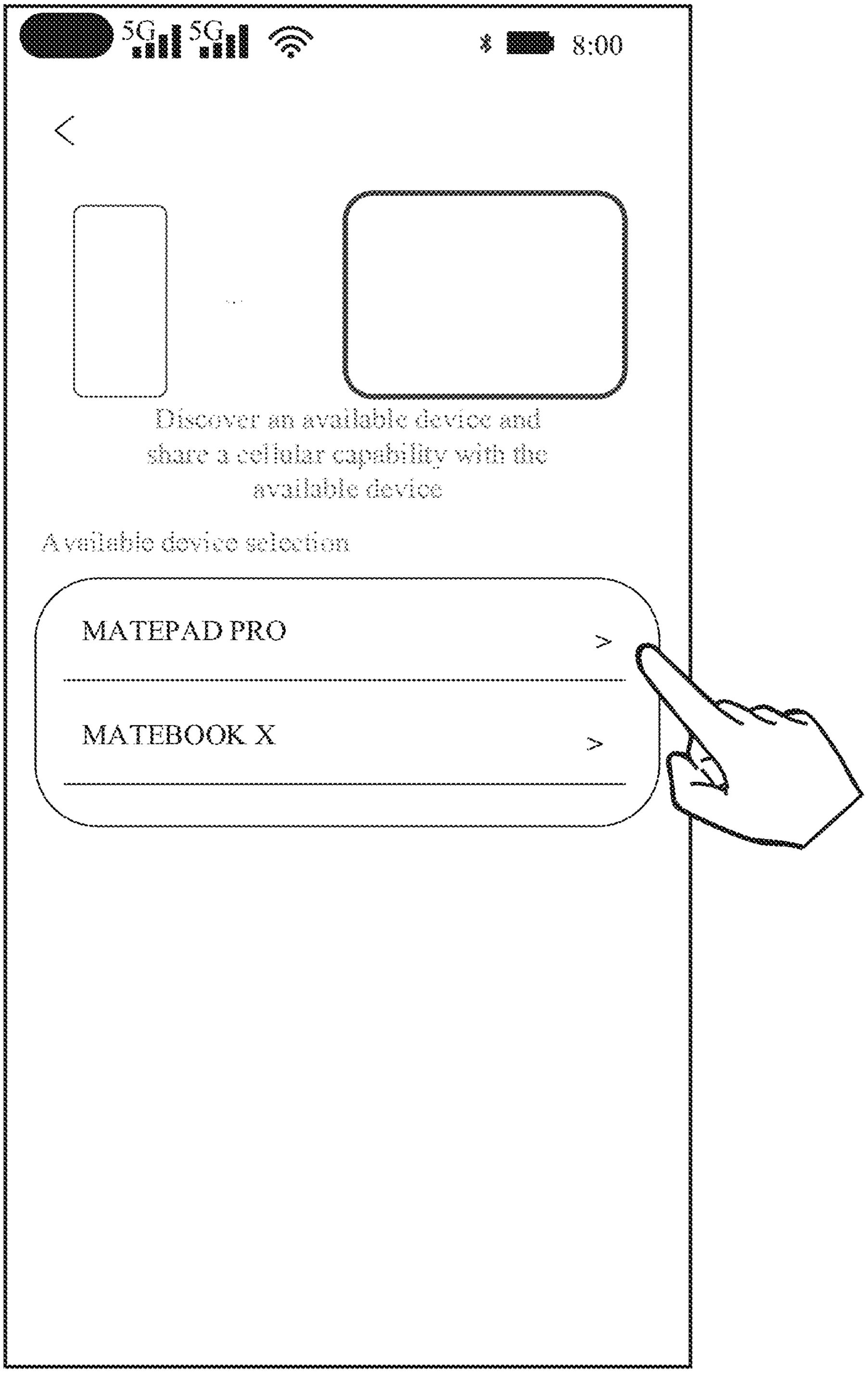
Figures 1, 16B:
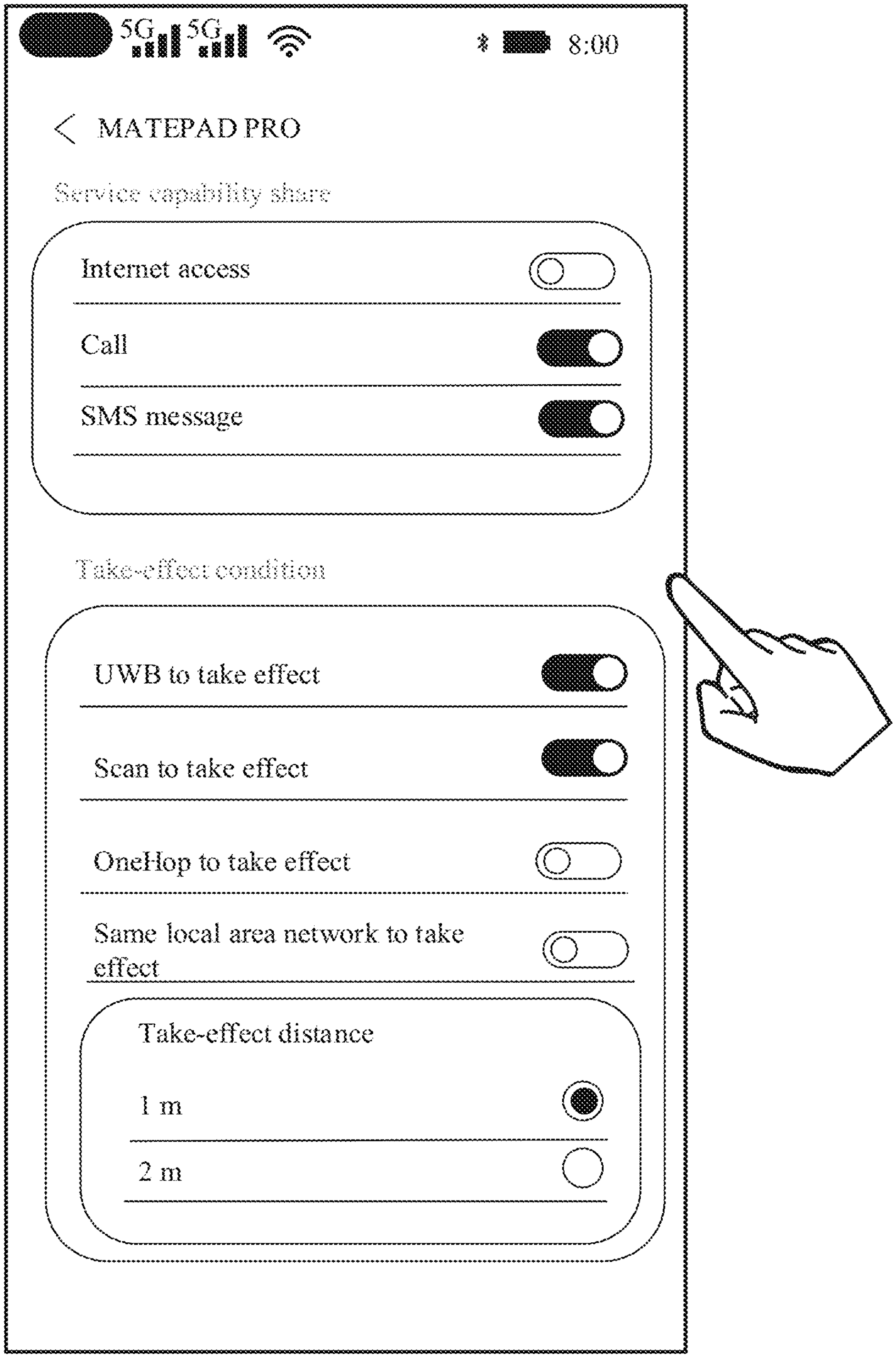
Figures 2, 16B:
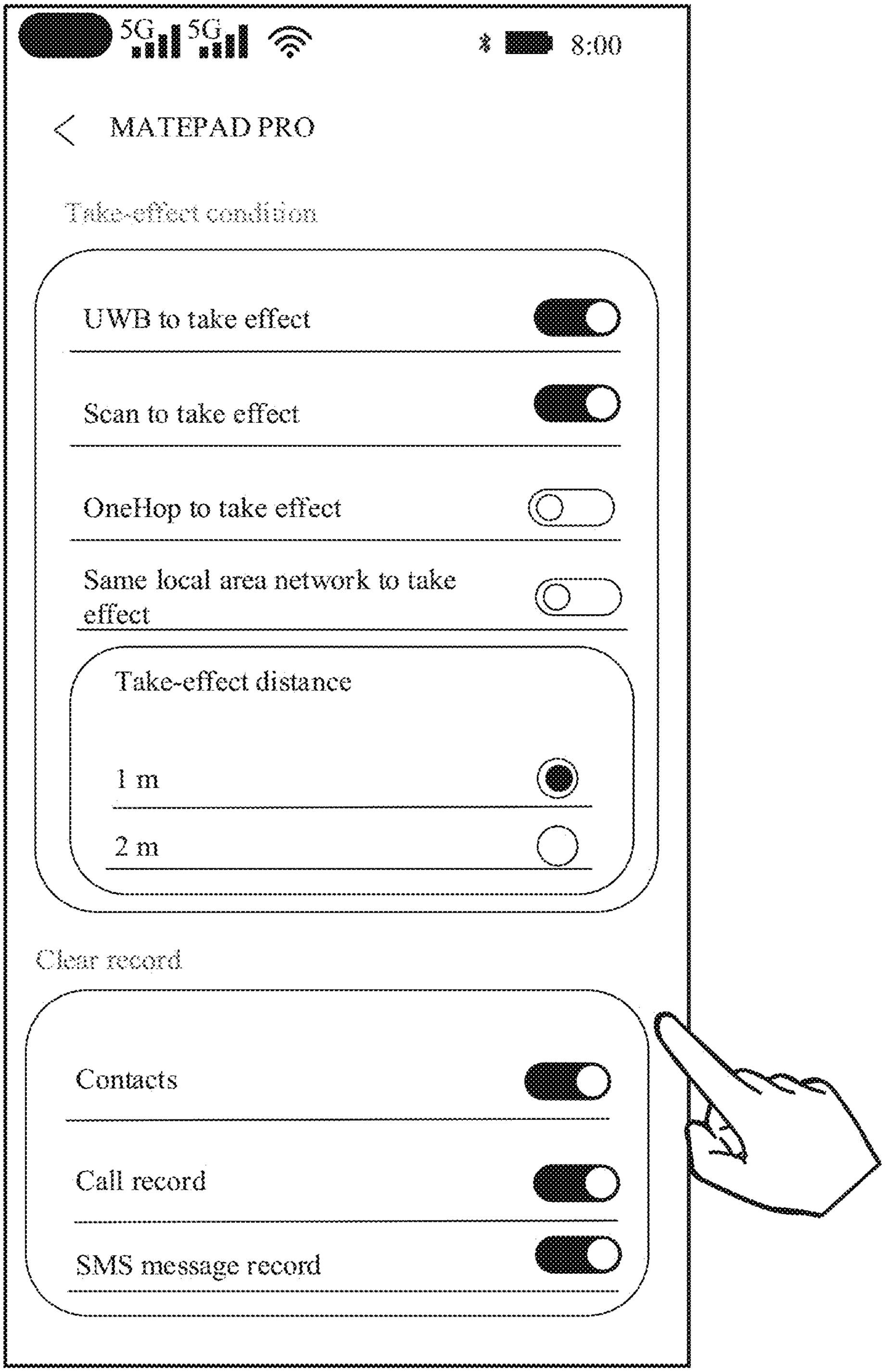

Optionally, the setting interface may alternatively be shown in FIG. 16(*a*), and an "Available device selection" column is displayed on the setting interface. After the user selects, in the "Available device selection" column, a device that is allowed to share the cellular capability, the corresponding setting interface is displayed. For example, if the user taps "MATEPAD PRO", as shown in FIG. 16(*b*)-1 and FIG. 16(*b*)-2, the first device switches the setting interface to a setting interface corresponding to the "MATEPAD PRO". A "Take-effect condition" column, a "Clear record" column, and a "Service capability share" column are displayed on the setting interface, and are used to set a sharing permission of the "MATEPAD PRO". For example, a take-effect condition of the "MATEPAD PRO" is set in the "Take-effect condition" column. That is, when the first device and the "MATEPAD PRO" are in a specific situation, the first device may share the cellular capability with the "MATEPAD PRO". The sharing permission of the cellular communication function of the "MATEPAD PRO" is set in the "Service capability share" column, that is, which cellular communication functions can be shared by the first device with the "MATEPAD PRO". Information that needs to be deleted is set in the "Clear record" column after cellular capability sharing between the "MATEPAD PRO" and the first device ends.

It may be understood that, by using the setting interface shown in FIG. 16(*b*)-1 and FIG. 16(*b*)-2, the first device may open different sharing permissions to different second devices, to improve flexibility and security of cellular capability sharing.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

The foregoing mainly describes the solutions provided in this application from a perspective of interaction between the electronic devices. It may be understood that, to implement the foregoing functions, the electronic device (for example, the foregoing first device or the foregoing second device) includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional modules of the electronic device may be obtained through division according to the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in this application, module division is an example, and is merely a logical function division. In an actual implementation, another division manner may be used.

Figure 17:
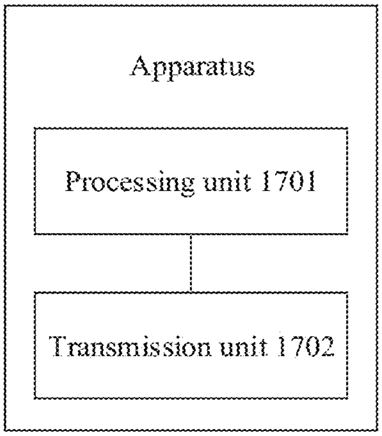
FIG. 17 is a schematic diagram of a structure of an apparatus according to an embodiment of this application.

When each function module is obtained through division based on each corresponding function, FIG. 17 is a schematic diagram of a structure of an apparatus. The apparatus is used in the foregoing first device, for example, may be a chip, a processor, or a functional module in the first device. As shown in FIG. 17, the apparatus includes a processing unit 1701 and a transmission unit 1702.

In an example, the processing unit 1701 is configured to establish a transmission channel to a second device, where the first device shares a cellular capability with the second device through the transmission channel.

The transmission unit 1702 is configured to send function synchronization information to the second device through the transmission channel, where the function synchronization information is used to synchronize, to the second device, a first service function that is allowed to be shared in a cellular communication function.

In an example, the function synchronization information further indicates that the cellular capability of the first device is available or unavailable.

In an example, the transmission unit 1702 is further configured to: after sending the function synchronization information to the second device through the transmission channel, synchronize first record information with the second device through the transmission channel, where the first record information includes a usage record of the first service function on the first device and a usage record of the first service function on the second device.

In an example, the transmission unit 1702 is further configured to exchange, with the second device through a radio interface layer RIL, cellular signaling corresponding to the first service function.

In an example, the processing unit 1701 is configured to establish the transmission channel to the second device when the first device and the second device meet a preset condition, where the first device shares the cellular capability of the first device with the second device through the transmission channel.

The transmission unit 1702 is configured to send cellular status information of the first device to the second device, where the cellular status information is used by the second device to display a cellular status indication icon.

In an example, that the processing unit 1701 establishes the transmission channel to the second device includes: When the processing unit 1701 determines that the first device and the second device meet the preset condition, the processing unit 1701 establishes the transmission channel to the second device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

Figure 18:
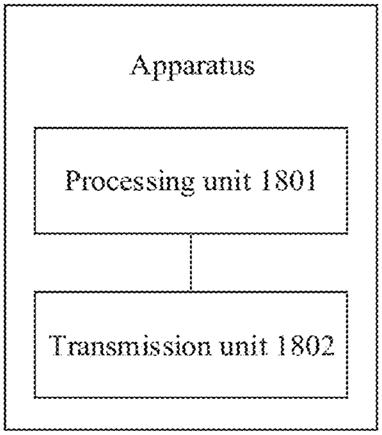
FIG. 18 is a schematic diagram of a structure of another apparatus according to an embodiment of this application.

FIG. 18 is a schematic diagram of a structure of an apparatus. The apparatus is used in the foregoing second device, for example, may be a chip, a processor, or a functional module in the second device. As shown in FIG. 18, the apparatus includes a processing unit 1801 and a transmission unit 1802.

In an example, the processing unit 1801 is configured to establish a transmission channel to a first device, where the second device implements a cellular communication function by using a cellular capability shared by the first device through the transmission channel.

The transmission unit 1802 is configured to receive function synchronization information sent by the first device through the transmission channel, where the function synchronization information is used to synchronize, to the second device, a first service function that is allowed to be shared in the cellular communication function.

The processing unit 1801 is further configured to: set a first icon corresponding to the first service function from an unavailable state to an available state, and when cellular capability sharing between the first device and the second device ends, set the first icon from the available state to the unavailable state.

In an example, the function synchronization information further indicates that the cellular capability of the first device is available or unavailable. That the processing unit 1801 sets the first icon corresponding to the first service function from the unavailable state to the available state specifically includes: When the processing unit 1801 determines, based on the function synchronization information, that the cellular capability of the first device is available, the processing unit 1801 sets the first icon from the unavailable state to the available state.

In an example, the unavailable state is a hidden state or a grayed-out display state, and when the first icon is in the grayed-out display state, the processing unit 1801 does not respond to an operation on the first icon; or the available state is a normal display state, and when the first icon is in the normal display state, the processing unit 1801 responds to an operation on the first icon.

In an example, the transmission unit 1802 is further configured to: after receiving the function synchronization information sent by the first device through the transmission channel, synchronize first record information with the second device through the transmission channel, where the first record information includes a usage record of the first service function on the first device and a usage record of the first service function on the second device.

In an example, the processing unit 1801 is further configured to: when the cellular capability sharing between the first device and the second device ends, delete record information that corresponds to the first service function and that is stored on the second device.

In an example, the transmission unit 1802 is further configured to exchange, with the second device through a radio interface layer RIL, cellular signaling corresponding to the first service function.

In an example, the processing unit 1801 is configured to establish the transmission channel to the first device when the first device and the second device meet a preset condition, where the second device implements the cellular communication function by using the cellular capability shared by the first device through the transmission channel.

The transmission unit 1802 is configured to receive cellular status information of the first device sent by the first device.

The processing unit 1801 is further configured to: display a cellular status indication icon based on the cellular status information, and when the cellular capability sharing between the first device and the second device ends, cancel displaying the cellular status indication icon.

In an example, that the processing unit 1801 establishes the transmission channel to the first device includes: When the processing unit 1801 determines that the first device and the second device meet the preset condition, the processing unit 1801 establishes the transmission channel to the first device. The preset condition is that the second device is a device that is determined by the first device and that is allowed to share the cellular capability, and the first device and the second device are within a preset range; the preset condition is that a OneHop operation is triggered between the first device and the second device; the preset condition is that the first device and the second device determine, in a code scanning manner, that sharing of the cellular capability is allowed; or the preset condition is that the first device establishes UWB communication with the second device.

Figure 19:
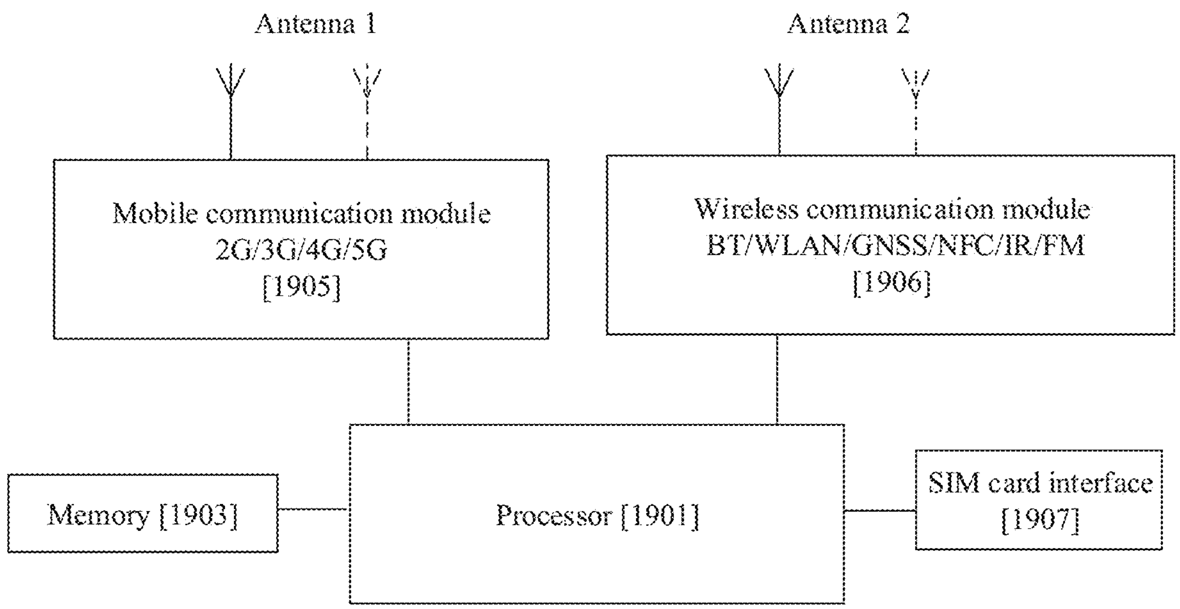
FIG. 19 is a schematic diagram of a structure of an electronic device according to an embodiment of this application.

When an integrated unit is used, FIG. 19 is a schematic diagram of a possible structure of an electronic device. The electronic device has a cellular capability, and is specifically the first device in the foregoing embodiments. FIG. 19 is a schematic diagram of a structure of an electronic device according to this application. The electronic device may include a processor 1901, a memory 1903, an antenna 1, an antenna 2, a mobile communication module 1905, a wireless communication module 1906, a subscriber identification module (subscriber identification module, SIM) banner interface 1907, and the like. It may be understood that the structure shown in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

The processor 1901 may include at least one of the following types: a central processing unit (central processing unit, CPU). Alternatively, the processor 1901 may be another general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, a discrete hardware component, or the like. The general-purpose processor may be a microprocessor, or the processor may be any conventional processor or the like. The processor 1901 may be a nerve center and a command center of the electronic device. The processor 1901 may generate an operation control signal based on an instruction operation code and a time sequence signal, to complete control of instruction reading and instruction execution.

The memory 1903 may be configured to store a software program and a module. The processor 1901 performs various function applications of the mobile phone and data processing by running the software program and the module that are stored in the memory 1903. The memory 1903 may mainly include a program storage area and a data storage area. The program storage area may store an operating system, an application (for example, man-machine dialogue) required by at least one function, or the like. The data storage area may store data (for example, audio data or a phone book) created based on use of the mobile phone, or the like. In addition, the memory 1903 may include a high-speed random access memory, or may include a nonvolatile memory, for example, at least one magnetic disk storage device, a flash memory device, or another volatile solid-state storage device.

A wireless communication function of the electronic device may be implemented by using the antenna 1, the antenna 2, the mobile communication module 1905, the wireless communication module 1906, a modem (Modem) processor, a baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 1905 may provide a wireless communication solution that is applied to the electronic device and that includes 2G/3G/4G/5G. The mobile communication module 1905 may include at least one filter, a switch, a power amplifier, a low noise amplifier (low noise amplifier, LNA), and the like. The mobile communication module 1905 may receive an electromagnetic wave through the antenna 1, perform processing such as filtering or amplification on the received electromagnetic wave, and transmit the electromagnetic wave to the modem processor for demodulation. The mobile communication module 1905 may further amplify a signal modulated by the modem processor, and convert the signal into an electromagnetic wave for radiation through the antenna 1. That is, the mobile communication module 1905, the modem processor, and the antenna 1 provide cellular communication for the electronic device.

In some embodiments, at least some functional modules of the mobile communication module 1905 may be disposed in the processor 1901. In some embodiments, at least some functional modules of the mobile communication module 1905 may be disposed in a same component as at least some modules of the processor 1901.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. In some embodiments, the modem processor may be an independent component. In some other embodiments, the modem processor may be independent of the processor 1901, and is disposed in a same component as the mobile communication module 1905 or another functional module.

The wireless communication module 1906 may provide a wireless communication solution that includes a WLAN (for example, a Wi-Fi network), Bluetooth (Bluetooth, BT), a global navigation satellite system (global navigation satellite system, GNSS), frequency modulation (frequency modulation. FM), a near field communication (near field communication, NFC) technology, an infrared (infrared, IR) technology, and the like and that is applied to the electronic device. The wireless communication module 1906 may be one or more components integrating at least one communication processing module. The wireless communication module 1906 receives an electromagnetic wave through the antenna 2, performs frequency modulation and filtering processing on an electromagnetic wave signal, and sends a processed signal to the processor 1901. The wireless communication module 1906 may further receive a to-be-sent signal from the processor 1901, perform frequency modulation and amplification on the signal, and convert the signal into an electromagnetic wave for radiation through the antenna 2.

In some embodiments, in the electronic device, the antenna 1 is coupled to the mobile communication module 1905, and the antenna 2 is coupled to the wireless communication module 1906, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The SIM banner interface 1907 is configured to connect to a SIM banner. The SIM banner may be inserted into the SIM banner interface 1907 or removed from the SIM banner interface 1907, to implement contact with or separation from the electronic device. The electronic device may support one or N SIM banner interfaces, and N is a positive integer greater than 1. The SIM banner interface 1907 may support a nano-SIM banner, a micro-SIM banner, a SIM banner, and the like. A plurality of cards banners may be inserted into a same SIM banner interface 1907 at the same time. Types of the plurality of cards banners may be the same or may be different. The SIM banner interface 1907 is also compatible with different types of SIM cards banners. The SIM banner interface 1907 may also be compatible with an external storage banner. The electronic device interacts with a network through the SIM banner, to implement functions such as a call and data communication. In some embodiments, the electronic device uses eSIM, that is, an embedded SIM banner. The eSIM banner may be embedded into the electronic device, and cannot be separated from the electronic device.

Based on the electronic device shown in FIG. 19, when the processor 1901 executes a computer program stored in the internal memory 1903, the electronic device is configured to perform the following solutions:

In an example, the electronic device is configured to:

establish a transmission channel to a second device, where the electronic device shares a cellular capability with the second device through the transmission channel; and send function synchronization information to the second device through the transmission channel, where the function synchronization information is used to synchronize, to the second device, a first service function that is allowed to be shared in a cellular communication function.

In an example, the function synchronization information further indicates that the cellular capability of the electronic device is available or unavailable.

In an example, the electronic device is further configured to: after sending the function synchronization information to the second device through the transmission channel, synchronize first record information with the second device through the transmission channel, where the first record information includes a usage record of the first service function on the electronic device and a usage record of the first service function on the second device.

In an example, the electronic device is further configured to exchange, with the second device through a radio interface layer RIL, cellular signaling corresponding to the first service function.

In an example, the electronic device is configured to: establish the transmission channel to the second device, where the electronic device shares the cellular capability of the electronic device with the second device through the transmission channel; and send cellular status information of a first device to the second device, where the cellular status information is used by the second device to display a cellular status indication icon.

In an example, that the electronic device establishes the transmission channel to the second device includes: When the electronic device and the second device meet a preset condition, the electronic device establishes the transmission channel to the second device. The preset condition is that the second device is a device that is determined by the electronic device and that is allowed to share the cellular capability, and the electronic device and the second device are within a preset range; the preset condition is that a OneHop operation is triggered between the electronic device and the second device; the preset condition is that the electronic device and the second device determine, in a code scanning manner, that sharing of the cellular capability is allowed; or the preset condition is that the electronic device establishes UWB communication with the second device.

Figure 20:
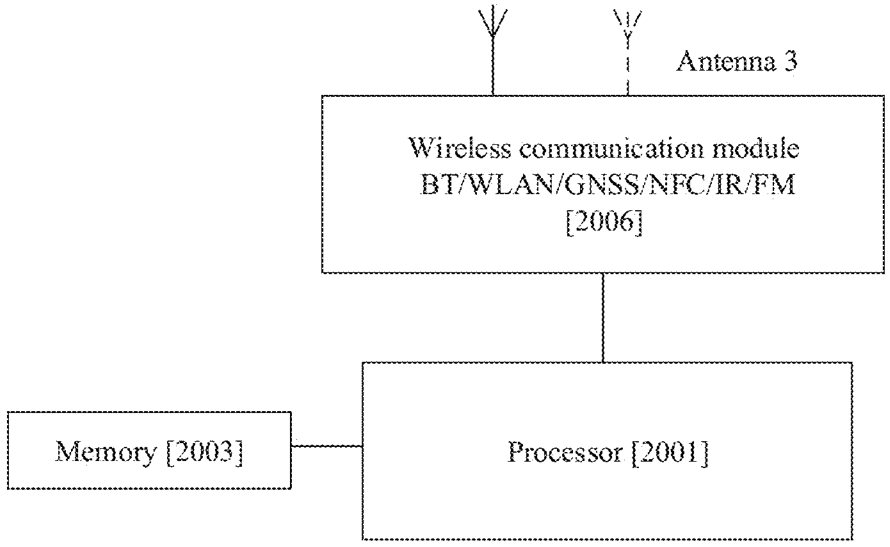
FIG. 20 is a schematic diagram of a structure of another electronic device according to an embodiment of this application.

When an integrated unit is used, FIG. 20 is a schematic diagram of a possible structure of an electronic device. The electronic device does not have a cellular capability (that is, the electronic device does not have a modem, or the electronic device has a modem but does not have a SIM banner), and is specifically the second device in the foregoing embodiments. FIG. 20 is a schematic diagram of a structure of an electronic device according to this application. The electronic device may include a processor 2001, a memory 2003, an antenna 3, a wireless communication module 2006, and the like. It may be understood that the structure shown in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

The processor 2001 may include at least one of the following types: a CPU. Alternatively, the processor 2001 may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like. The processor 2001 may be a nerve center and a command center of the electronic device. The processor 2001 may generate an operation control signal based on an instruction operation code and a time sequence signal, to complete control of instruction reading and instruction execution.

The memory 2003 may be configured to store a software program and a module. The processor 2001 performs various function applications of the mobile phone and data processing by running the software program and the module that are stored in the memory 2003. The memory 2003 may mainly include a program storage area and a data storage area. The program storage area may store an operating system, an application (for example, man-machine dialogue) required by at least one function, or the like. The data storage area may store data (for example, audio data or a phone book) created based on use of the mobile phone, or the like. In addition, the memory 2003 may include a high-speed random access memory, or may include a nonvolatile memory, for example, at least one magnetic disk storage device, a flash memory device, or another volatile solid-state storage device.

A wireless communication function of the electronic device may be implemented by using the antenna 3, the wireless communication module 2006, and the like.

The antenna 3 is configured to transmit and receive an electromagnetic wave signal. Each antenna of the electronic device may be configured to cover one or more communication frequency bands. Different antennas may be further multiplexed, to improve antenna utilization. For example, the antenna 3 may be multiplexed as a diversity antenna of a wireless local area network. In some other embodiments, the antenna may be used in combination with a tuning switch.

The wireless communication module 2006 may provide a wireless communication solution that is applied to the electronic device and that includes a WLAN (for example, Wi-Fi), BT, BLE, a GNSS, FM, NFC, IR, and the like. The GNSS may include GPS, GLONASS, BDS, QZSS, and/or SBAS. The wireless communication module 2006 may be one or more components integrating at least one communication processing module. The wireless communication module 2006 receives an electromagnetic wave through the antenna 3, performs frequency modulation and filtering processing on an electromagnetic wave signal, and sends a processed signal to the processor 2001. The wireless communication module 2006 may further receive a to-be-sent signal from the processor 2001, perform frequency modulation and amplification on the signal, and convert the signal into an electromagnetic wave for radiation through the antenna 3. In some embodiments, in the electronic device, the antenna 3 is coupled to the wireless communication module 2006, so that the electronic device can communicate with a network and another device by using a wireless communication technology.

Based on the electronic device shown in FIG. 20, when the processor 2001 executes a computer program stored in the internal memory 2003, the electronic device is configured to perform the following solutions:

In an example, the electronic device is configured to:

establish a transmission channel to a first device, where the electronic device implements a cellular communication function by using a cellular capability shared by the first device through the transmission channel, receive function synchronization information sent by the first device through the transmission channel, where the function synchronization information is used to synchronize, to the electronic device, a first service function that is allowed to be shared in the cellular communication function; set a first icon corresponding to the first service function from an unavailable state to an available state, and set the first icon from the available state to the unavailable state when cellular capability sharing between the first device and the electronic device ends.

In an example, the function synchronization information further indicates that the cellular capability of the first device is available or unavailable. That the electronic device sets the first icon corresponding to the first service function from the unavailable state to the available state specifically includes: When determining, based on the function synchronization information, that the cellular capability of the first device is available, the electronic device sets the first icon from the unavailable state to the available state.

In an example, the unavailable state is a hidden state or a grayed-out display state, and when the first icon is in the grayed-out display state, the electronic device does not respond to an operation on the first icon; or the available state is a normal display state, and when the first icon is in the normal display state, the electronic device responds to an operation on the first icon.

In an example, the electronic device is further configured to: after receiving the function synchronization information sent by the first device through the transmission channel, synchronize first record information with the first device through the transmission channel, where the first record information includes a usage record of the first service function on the first device and a usage record of the first service function on the electronic device.

In an example, the electronic device is further configured to: when the cellular capability sharing between the first device and the electronic device ends, delete record information that corresponds to the first service function and that is stored on the second device.

In an example, the electronic device is further configured to exchange, with the first device through a radio interface layer RIL, cellular signaling corresponding to the first service function.

In an example, the electronic device is configured to: establish the transmission channel to the first device, where the electronic device implements the cellular communication function by using the cellular capability shared by the first device through the transmission channel; receive cellular status information of the first device sent by the first device; display a cellular status indication icon based on the cellular status information; and when the cellular capability sharing between the first device and the electronic device ends, cancel displaying the cellular status indication icon.

In an example, that the electronic device establishes the transmission channel to the first device includes: When the electronic device and the first device meet a preset condition, the electronic device establishes the transmission channel to the first device. The preset condition is that the electronic device is a device that is determined by the first device and that is allowed to share the cellular capability, and the first device and the electronic device are within a preset range; the preset condition is that a OneHop operation is triggered between the first device and the electronic device; the preset condition is that the first device and the electronic device determine, in a code scanning manner, that sharing of the cellular capability is allowed; or the preset condition is that the first device establishes UWB communication with the electronic device.

It may be understood that the structure shown in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

This application further provides a communication system, including the apparatus shown in FIG. 17 and the apparatus shown in FIG. 18, or including the electronic device shown in FIG. 19 and the electronic device shown in FIG. 20.

This application further provides a computer-readable storage medium. The computer-readable storage medium stores a computer program. When the computer program is executed by a processor, the method steps performed by the first device in the foregoing embodiments are implemented.

This application further provides a computer-readable storage medium. The computer-readable storage medium stores a computer program. When the computer program is executed by a processor, the method steps performed by the second device in the foregoing embodiments are implemented.

This application further provides a computer program product. The program product includes a program. When the program is run on an electronic device, the electronic device is enabled to implement the method steps performed by the first device in the foregoing embodiments.

This application further provides a computer program product. The program product includes a program. When the program is run on an electronic device, the electronic device is enabled to implement the method steps performed by the second device in the foregoing embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the descriptions of embodiments of this application, "/" means "or" unless otherwise specified. For example, A/B may represent A or B. In this specification, "and/or" describes only an association relationship between associated objects and represents that three relationships may exist. For example. A and/or B may represent the following three cases: Only A exists, both A and B exist, and only B exists. In addition, in the descriptions of embodiments of this application, "a plurality of" means two or more.

The terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Reference to "one embodiment" or "some embodiments" described in the specification of this application means that one or more embodiments of this application include a specific feature, structure, or feature described with reference to the embodiment. Therefore, statements such as "in an embodiment", "in some embodiments". "in some other embodiments", and "in other embodiments" that appear at different places in this specification do not necessarily mean referring to a same embodiment, but mean "one or more but not all of embodiments", unless otherwise specifically emphasized in another manner. The terms "include", "contain", "have", and their variants all mean "include but are not limited to", unless otherwise specifically emphasized in another manner.

It should be finally noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for sharing a cellular capability, wherein the method comprises:

establishing, by a first device, a transmission channel to a second device, wherein the first device shares a cellular capability with the second device through the transmission channel, and the second device implements a cellular communication function by using the cellular capability of the first device;

displaying, by the first device, a first card, wherein the first card is used to indicate the first device is sharing the cellular capability;

sending, by the first device, cellular status information of the first device to the second device through the transmission channel, wherein the cellular status information comprises information indicating whether a cellular-network High Definition (HD) call is enabled for the first device;

displaying, by the second device, a cellular status indication icon based on the cellular status information of the first device, wherein the cellular status indication icon indicates the cellular-network HD call enablement status of the first device;

cancelling, by the second device, displaying the cellular status indication icon when the cellular capability sharing between the first device and the second device ends.

2. The method according to claim 1, wherein the method further comprises:

receiving, by the first device, a first operation on the first card;

in response to the first operation, displaying, by the first device, a first setting interface, wherein the first setting interface is used to set cellular sharing capability of the first device.

3. The method according to claim 1, wherein before the establishing, by a first device, a transmission channel to a second device, the method further comprises:

receiving, by the first device, a second operation of user;

in response to the second operation, displaying, by the first device, a second setting interface, the second setting interface comprises a first option, a second option, and a third option, wherein the first option is used to turn on or turn off internet access function, the second option is used to turn on or turn off call function, the third option is used to turn on or turn off SMS message function.

4. The method according to claim 3, wherein when the first option is in an off state and the second option and the third option are in an on state, the first device does not share the internet access function with the second device, and the first device shares the call function and the SMS message function with the second device.

5. The method according to claim 1, wherein the first card is in a notification center.

6. The method according to claim 1, wherein the method further comprises:

setting, by the second device, a first icon corresponding to a first service function from an unavailable state to an available state; and setting, by the second device, the first icon from the available state to the unavailable state when cellular capability sharing between the first device and the second device ends.

7. The method according to claim 6, wherein before setting, by the second device, a first icon corresponding to a first service function from an unavailable state to an available state, the method further comprises:

sending, by the first device, function synchronization information to the second device through the transmission channel, wherein the function synchronization information is used to synchronize, to the second device, the first service function that is allowed to be shared in the cellular communication function.

8. The method according to claim 7, wherein the function synchronization information further indicates that the cellular capability of the first device is available or unavailable.

9. The method according to claim 7, wherein the setting, by the second device, a first icon corresponding to a first service function from an unavailable state to an available state comprises:

when the second device determines, based on the function synchronization information, that the cellular capability of the first device is available, setting, by the second device, the first icon from the unavailable state to the available state.

10. The method according to claim 7, wherein after the sending, by the first device, function synchronization information to the second device through the transmission channel, the method further comprises:

synchronizing, by the first device, first record information with the second device through the transmission channel, wherein the first record information comprises a usage record of the first service function on the first device and a usage record of the first service function on the second device.

11. The method according to claim 6, wherein the unavailable state is a hidden state or a grayed-out display state, and when the first icon is in the grayed-out display state, the second device does not respond to an operation on the first icon; or the available state is a normal display state, and when the first icon is in the normal display state, the second device responds to an operation on the first icon.

12. The method according to claim 6, wherein when the cellular capability sharing between the first device and the second device ends, the second device deletes record information that corresponds to the first service function and that is stored on the second device.

13. The method according to claim 6, wherein the first device exchanges, with the second device through a radio interface layer RIL, cellular signaling corresponding to the first service function.

14. The method according to claim 1, wherein the cellular status information is a signal radio interface layer RIL command.

15. The method according to claim 1, wherein the establishing, by a first device, a transmission channel to a second device comprises:

when the first device and the second device meet a preset condition, establishing, by the first device, the transmission channel to the second device, wherein the preset condition is that the second device is a device that is determined by the first device and that is allowed to share the cellular capability, and the first device and the second device are within a preset range;

the preset condition is that a OneHop operation is triggered between the first device and the second device;

the preset condition is that the first device and the second device determine, in a code scanning manner, that sharing of the cellular capability is allowed; or the preset condition is that the first device establishes UWB communication with the second device.

16. The method according to claim 1, wherein the first card comprises an Off button for ending the cellular capability sharing between the first device and the second device.

17. The method according to claim 16, wherein the method further comprises: receiving, by the first device, a user operation on the Off button; and ending, by the first device, the cellular capability sharing between the first device and the second device in response to the user operation on the Off button.

18. The method according to claim 1, wherein the cellular status indication icon comprises indication icons for indicating cellular statuses of a primary card and a secondary card of the first device.

19. The method according to claim 1, wherein the cellular status indication icon indicates a cellular communication standard and cellular signal strength of the first device.

20. A method for sharing a cellular capability, applied to a second device, wherein the method comprises:

establishing, by the second device, a transmission channel to a first device, wherein the second device implements a cellular communication function by using a cellular capability shared by the first device through the transmission channel;

receiving, by the second device, cellular status information of the first device from the first device through the transmission channel, wherein the cellular status information comprises information indicating whether a cellular-network High Definition (HD) call is enabled for the first device;

displaying, by the second device, a cellular status indication icon based on a cellular status information of the first device, wherein the cellular status indication icon indicates the cellular-network HD call enablement status of the first device;

cancelling, by the second device, displaying the cellular status indication icon when the cellular capability sharing between the first device and the second device ends.

21. The method according to claim 20, wherein the method further comprises:

setting, by the second device, a first icon corresponding to a first service function from an unavailable state to an available state; and setting, by the second device, the first icon from the available state to the unavailable state when cellular capability sharing between the first device and the second device ends.

22. The method according to claim 21, wherein before setting, by the second device, a first icon corresponding to a first service function from an unavailable state to an available state, the method further comprises:

receiving, by the second device, function synchronization information from the first device through the transmission channel, wherein the function synchronization information is used to synchronize, to the second device, the first service function that is allowed to be shared in the cellular communication function.

23. The method according to claim 22, wherein the function synchronization information further indicates that the cellular capability of the first device is available or unavailable.

24. The method according to claim 22, wherein the setting, by the second device, a first icon corresponding to a first service function from an unavailable state to an available state comprises:

when the second device determines, based on the function synchronization information, that the cellular capability of the first device is available, setting, by the second device, the first icon from the unavailable state to the available state.

25. The method according to claim 21, wherein the unavailable state is a hidden state or a grayed-out display state, and when the first icon is in the grayed-out display state, the second device does not respond to an operation on the first icon; or the available state is a normal display state, and when the first icon is in the normal display state, the second device responds to an operation on the first icon.

* * * * *